United States Patent
Hashimoto

(10) Patent No.: US 9,501,230 B2
(45) Date of Patent: Nov. 22, 2016

(54) STORAGE MEDIUM STORING CONTROL PROGRAM, METHOD OF CONTROLLING INFORMATION PROCESSING DEVICE, INFORMATION PROCESSING SYSTEM, AND INFORMATION PROCESSING DEVICE

(71) Applicant: Kabushiki Kaisha Toshiba, Minato-ku (JP)

(72) Inventor: Daisuke Hashimoto, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/408,220

(22) PCT Filed: Mar. 25, 2013

(86) PCT No.: PCT/JP2013/059792
§ 371 (c)(1),
(2) Date: Dec. 15, 2014

(87) PCT Pub. No.: WO2013/190878
PCT Pub. Date: Dec. 27, 2013

(65) Prior Publication Data
US 2015/0143032 A1 May 21, 2015

(30) Foreign Application Priority Data

Jun. 19, 2012 (JP) .................................. 2012-137765
Feb. 5, 2013 (JP) .................................. 2013-020765

(51) Int. Cl.
*G06F 12/10* (2016.01)
*G06F 3/06* (2006.01)
(Continued)

(52) U.S. Cl.
CPC ............. *G06F 3/0619* (2013.01); *G06F 3/061* (2013.01); *G06F 3/0652* (2013.01);
(Continued)

(58) Field of Classification Search
CPC ............ G06F 3/0619; G06F 11/1458; G06F 12/0246
USPC ........................................................ 711/103
See application file for complete search history.

(56) References Cited

U.S. PATENT DOCUMENTS 6,073,221 A    6/2000 Beal et al.
7,934,068 B2   4/2011 Abe et al.
(Continued)

FOREIGN PATENT DOCUMENTS

JP    2010 157133    7/2010
JP    2010 161199    7/2010
(Continued)

OTHER PUBLICATIONS

"Information technology—ATA/ATAPI Command Set-2 (ACS-2)", Working Draft Project American National Standard, URL: http://www.t13.org/, pp. 1-523, (Feb. 22, 2011).
(Continued)

*Primary Examiner* — Jae Yu
(74) *Attorney, Agent, or Firm* — Oblon, McClelland, Maier & Neustadt, L.L.P.

(57) ABSTRACT

According to an embodiment, when data read from a first storage unit which is a backup source is not identical with data indicated by a first function, the read data is written to a second storage unit which is a backup destination. When the data read from the first storage unit is identical with the data indicated by the first function, the read data is not written to the second storage unit and a deletion notification is sent to the second storage unit.

27 Claims, 45 Drawing Sheets

(51) Int. Cl.
*G06F 12/02* (2006.01)
*G06F 11/14* (2006.01)
(52) U.S. Cl.
CPC ........ *G06F 3/0679* (2013.01); *G06F 11/1456* (2013.01); *G06F 11/1458* (2013.01); *G06F 12/0246* (2013.01); *G06F 2206/1014* (2013.01); *G06F 2212/1016* (2013.01); *G06F 2212/7201* (2013.01); *G06F 2212/7205* (2013.01); *G06F 2212/7207* (2013.01)

(56) References Cited

U.S. PATENT DOCUMENTS

| | | | |
|---|---|---|---|
| 8,189,391 | B2 | 5/2012 | Itagaki et al. |
| 8,209,505 | B2 | 6/2012 | Abe et al. |
| 8,327,065 | B2 | 12/2012 | Yano et al. |
| 8,539,315 | B2 | 9/2013 | Hashimoto |
| 8,605,508 | B2 | 12/2013 | Itagaki et al. |
| 8,631,191 | B2 | 1/2014 | Hashimoto |
| 8,667,216 | B2 | 3/2014 | Hashimoto |
| 8,683,117 | B2 | 3/2014 | Hashimoto |
| 8,756,367 | B2 | 6/2014 | Hashimoto |
| 2002/0073278 | A1 | 6/2002 | McDowell |
| 2004/0088505 | A1 | 5/2004 | Watanabe |
| 2008/0263305 | A1 | 10/2008 | Shu et al. |
| 2010/0121937 | A1 | 5/2010 | Aszmann et al. |
| 2010/0205354 | A1 | 8/2010 | Suzuki |
| 2010/0217927 | A1 | 8/2010 | Song et al. |
| 2011/0145306 | A1 | 6/2011 | Boyd et al. |
| 2012/0054465 | A1 | 3/2012 | Post et al. |
| 2012/0144097 | A1 | 6/2012 | Hashimoto |
| 2012/0221776 | A1 | 8/2012 | Yoshihashi et al. |
| 2012/0246388 | A1 | 9/2012 | Hashimoto |
| 2012/0260025 | A1 | 10/2012 | Hida et al. |
| 2014/0006689 | A1 | 1/2014 | Hashimoto |
| 2014/0075097 | A1 | 3/2014 | Nagai |
| 2014/0173268 | A1 | 6/2014 | Hashimoto |
| 2014/0223088 | A1 | 8/2014 | Hashimoto |

FOREIGN PATENT DOCUMENTS

| | | |
|---|---|---|
| JP | 2011 29586 | 2/2011 |
| JP | 2011 128998 | 6/2011 |
| JP | 5002719 | 8/2012 |
| JP | 2012 198811 | 10/2012 |
| JP | 5052376 | 10/2012 |
| KR | 10-2010-0077118 A | 7/2010 |
| KR | 10-2012-0045422 A | 5/2012 |
| WO | 2010 054297 | 5/2010 |

OTHER PUBLICATIONS

"NVM Express Revision 1.1", URL: http://www.nvmexpress.org/, pp. 1-163 , (Oct. 11, 2012).

"Information technology—SCSI Block Commands-3 (SBC-3)", ) , Working Draft Project American National Standard , URL:http://www.t10.org/, pp. 1-299, (Dec. 7, 2012).

"Serial ATA International Organization: Serial ATA Revision 3.1", URL: http://www.serialata.org/, pp. 1-717, (Jul. 18, 2011).

"PCI Express Base Specification Revision 3.0", URL: http://www.pcisig.com/, pp. 1-860, (Nov. 10, 2010).

"Device Sleep", Serial ATA Technical Proposal: SATA31_TPR_C108, Serial ATA International Organization, URL: http://www.serialata.org/, pp. 1-16, (Oct. 24, 2011).

Kitsuregawa, M., "Well-known Storage Network", 1$^{st}$ Edition, Ohmsha, Ltd., Total 33 pages, (May 20, 2011), with English abstract.

International Search Report and Written Opinion of the International Searching Authority Issued Jul. 30, 2013 in PCT/JP13/059792 Filed Mar. 25, 2013.

Office Action issued Oct. 16, 2015 in Korean Patent Application No. 10-2014-7033999 (with English language translation).

Office Action issued on Apr. 26, 2016 in Korean Patent Application No. 10-2014-7033999 with English translation.

Combined Office Action and Search Report issued Sep. 6, 2016, in Chinese Patent Application No. 201380032155.7 (w.English-language Translation).

FIG.20

| LBA | DATA |
|---|---|
| 0000h | 5ab543cd3763··· |
| 0001h | e564a641b763··· |
| 0002h | 000000000000··· |
| 0003h | 348957987908··· |
| 0004h | 000000000000··· |
| 0005h | 000000000000··· |
| 0006h | 000000000000··· |
| 0007h | 349058349058··· |
| ⋮ | ⋮ |
| ba02h | 954683f5484c··· |
| ba03h | 000000000000··· |
| ba04h | 000000000000··· |
| ba05h | 000000000000··· |
| ⋮ | ⋮ |
| ffffh | 000000000000··· | ba03h–ffffh: ALL ZERO

1 SECTOR (= 512 BYTES)

FIG.22

| LBA | DATA | |
|---|---|---|
| 0000h | 5ab543cd3763··· | ⎫ |
| 0001h | e564a641b763··· | ⎪ |
| 0002h | 000000000000··· | ⎪ |
| 0003h | 348957987908··· | ⎬ HIGH EXISTENCE PROBABILITY OF 0-fill SECTORS IS HIGH |
| 0004h | 000000000000··· | ⎪ |
| 0005h | 348957987908··· | ⎪ |
| 0006h | 000000000000··· | ⎪ |
| 0007h | 349058349058··· | ⎪ |
| ⋮ | ⋮ | ⎪ |
| c000h | 954683f5484c··· | ⎭ |
| c001h | ffffffffffffff··· | ⎫ |
| c002h | ffffffffffffff··· | ⎪ |
| c003h | 349058349058··· | ⎬ HIGH EXISTENCE PROBABILITY OF 1-fill SECTORS IS HIGH |
| ⋮ | ⋮ | ⎪ |
| ffffh | ffffffffffffff··· | ⎭ |

FIG.24

| LBA | DATA | |
|---|---|---|
| 0000h | 5ab543cd3763··· | ⎫ |
| 0001h | e564a641b763··· | |
| 0002h | 000000000000··· | |
| 0003h | 348957987908··· | |
| 0004h | 000000000000··· | ⎬ HIGH EXISTENCE PROBABILITY OF 0-fill SECTORS IS HIGH |
| 0005h | 348957987908··· | |
| 0006h | 000000000000··· | |
| 0007h | 349058349058··· | |
| ⋮ | ⋮ | ⎭ |
| 8000h | 954683f5484c··· | ⎫ |
| 8001h | 320a320a320a··· | |
| 8002h | 320a320a320a··· | ⎬ HIGH EXISTENCE PROBABILITY OF 320a-fill SECTORS IS HIGH |
| 8003h | 320a320a320a··· | |
| ⋮ | ⋮ | ⎭ |
| c000h | 954683f5484c··· | ⎫ |
| c001h | ffffffffffff··· | |
| c002h | ffffffffffff··· | |
| c003h | 349058349058··· | ⎬ HIGH EXISTENCE PROBABILITY OF 1-fill SECTORS IS HIGH |
| ⋮ | ⋮ | |
| ffffh | ffffffffffff··· | ⎭ |

FIG.26

| LBA | DATA | |
|---|---|---|
| 0000h | 5ab543cd3763···65183 | |
| 0001h | e564a641b763···ab552 | |
| 0002h | 000000000000···00002 | CORRELATION |
| 0003h | 000000000000···00003 | CORRELATION |
| 0004h | 000000000000···00004 | CORRELATION |
| 0005h | 000000000000···00005 | CORRELATION |
| 0006h | 000000000000···00006 | CORRELATION |
| 0007h | 349058349058··· | |
| ⋮ | ⋮ | |
| ba02h | 954683f5484c···86213 | |
| ba03h | 000000000000···0ba03 | CORRELATION |
| ba04h | 000000000000···0ba04 | CORRELATION |
| ba05h | 000000000000···0ba05 | CORRELATION |
| ⋮ | ⋮ | |
| ffffh | 000000000000···0ffff | CORRELATION |

FIG.35

MAIN MEMORY (6)

OS FILE MANAGEMENT TABLE (300)

| FILE IDENTIFICATION ID | MAIN MEMORY ADDRESS | SECTOR COUNT |
|---|---|---|
| ... | ... | ... |
| ... | ... | ... |
| ... | ... | ... |
| ... | ... | ... |
| ... | ... | ... |

(2B)

OS FILE MANAGEMENT TABLE (300b)

| FILE IDENTIFICATION ID | LBA | SECTOR COUNT |
|---|---|---|
| ... | ... | ... |
| ... | ... | ... |
| ... | ... | ... |
| ... | ... | ... |
| ... | ... | ... |

FIG.46

| | | | | | | ⌐300 |
|---|---|---|---|---|---|---|
| METADATA | | | | | | |
| FILE IDENTIFI-CATION ID | STORAGE UNIT IDENTIFI-CATION ID | LBA | SECTOR COUNT | OWNER | UPDATE TIME | OTHER ATTRIBUTE INFORMATION |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |

FIG.48

| ID of FILE 0 |
|---|
| ID of FILE 1 |
| ID of FILE 2 |
| ID of FILE 3 |
| ID of FILE 4 |
| ID of FILE 5 |
| ID of FILE 6 |
| ... |

STORAGE MEDIUM STORING CONTROL PROGRAM, METHOD OF CONTROLLING INFORMATION PROCESSING DEVICE, INFORMATION PROCESSING SYSTEM, AND INFORMATION PROCESSING DEVICE

CROSS-REFERENCE TO RELATED APPLICATIONS

This application is based upon and claims the benefit of priority from Japanese Patent Application No. 2012-137765, filed on Jun. 19, 2012 and Japanese Patent Application No. 2013-020765, filed on Feb. 5, 2013; the entire contents of all of which are incorporated herein by reference.

FIELD

Embodiments described herein relate generally to a storage medium storing a control program used to back up data of a first memory to a non-volatile second memory, a method of controlling an information processing device, an information processing system, and the information processing device.

BACKGROUND

On an operating system (OS), when file data of a non-volatile storage device (for example, a hard disk or a solid state drive (SSD)) is deleted, the data is not actually deleted from the non-volatile storage device only by deleting management information corresponding to the data on the OS. Since a deleting process on the non-volatile storage device is not performed at every time when the data on the OS is deleted, operation performance is improved to the degree that the deleting process is not performed. This system is effective particularly in a hard disk drive in which access is slow.

On the other hand, since the data clearly deleted on the OS is recognized as data still valid on the non-volatile storage device (host invalid-device valid data), free areas in which no valid data is present on the non-volatile storage device are less than free areas recognized by the OS. In particular, depletion of the free areas on the non-volatile storage device may cause a big problem in an SSD in which logical addresses do not have a one-to-one relation with physical addresses of the non-volatile storage device in some cases.

The following problems may occur:

a problem of considerable deterioration in writing performance, since there is load on a process of ensuring new free blocks by retrieving invalid data areas in physical blocks (active blocks) of NAND flash memory recognized to have valid data by an SSD controller and performing garbage collection on valid data (NAND garbage collection) at the time of writing data to an SSD when free areas of the SSD are depleted, that is, physical blocks (free blocks) of the NAND flash memory recognized not to have valid data by the SSD controller are depleted; and a problem of considerable deterioration in reliability of an SSD, when write access range is limited to specific areas or extra blocks are deleted due to frequent occurrence of NAND garbage collection when the writing is performed in a state where free areas on the SSD are depleted due to a lot of invalid data.

The above-mentioned problems can be avoided by performing deletion notification from a host (an information processing device) to an SSD when data is deleted on the host. Examples of the data deletion notification include data set management command (commonly called a trim command) described in INCITS ATA/ATAPI Command Set-2 (ACS-2) and Deallocate (AD) of 11h Dataset Management command described in NVM Express Revision 1.1. When data is deleted on a host in this system, a host notifies an SSD of logical address spaces in which deleted data is present, and thus the regions are treated as free areas afterward even on the SSD. Thus, the trim command realizes altering host-invalid and device-valid data into host-invalid and device-invalid data, and thus the SSD can newly ensure free areas.

When deletion notification is performed, a SSD controller invalidates a corresponding region by accessing a data management area. In the invalidating process, the corresponding region is recognized to be invalid by rewriting management information of the SSD. Data of the corresponding region may not be actually deleted or may be deleted.

BRIEF DESCRIPTION OF THE DRAWINGS

FIG. 20 is a diagram illustrating an example of a relation between LBA and data;

FIG. 22 is a diagram illustrating another example of the relation between the LBA and the data;

FIG. 24 is a diagram illustrating another example of the relation between the LBA and the data;

FIG. 26 is a diagram illustrating another example of the relation between the LBA and the data;

FIG. 35 is a diagram illustrating an OS file management table;

FIG. 46 is a diagram illustrating an example of metadata used according to the ninth embodiment;

FIG. 48 is a diagram illustrating a data structure of a file ID list; and

DETAILED DESCRIPTION

Figure 1:
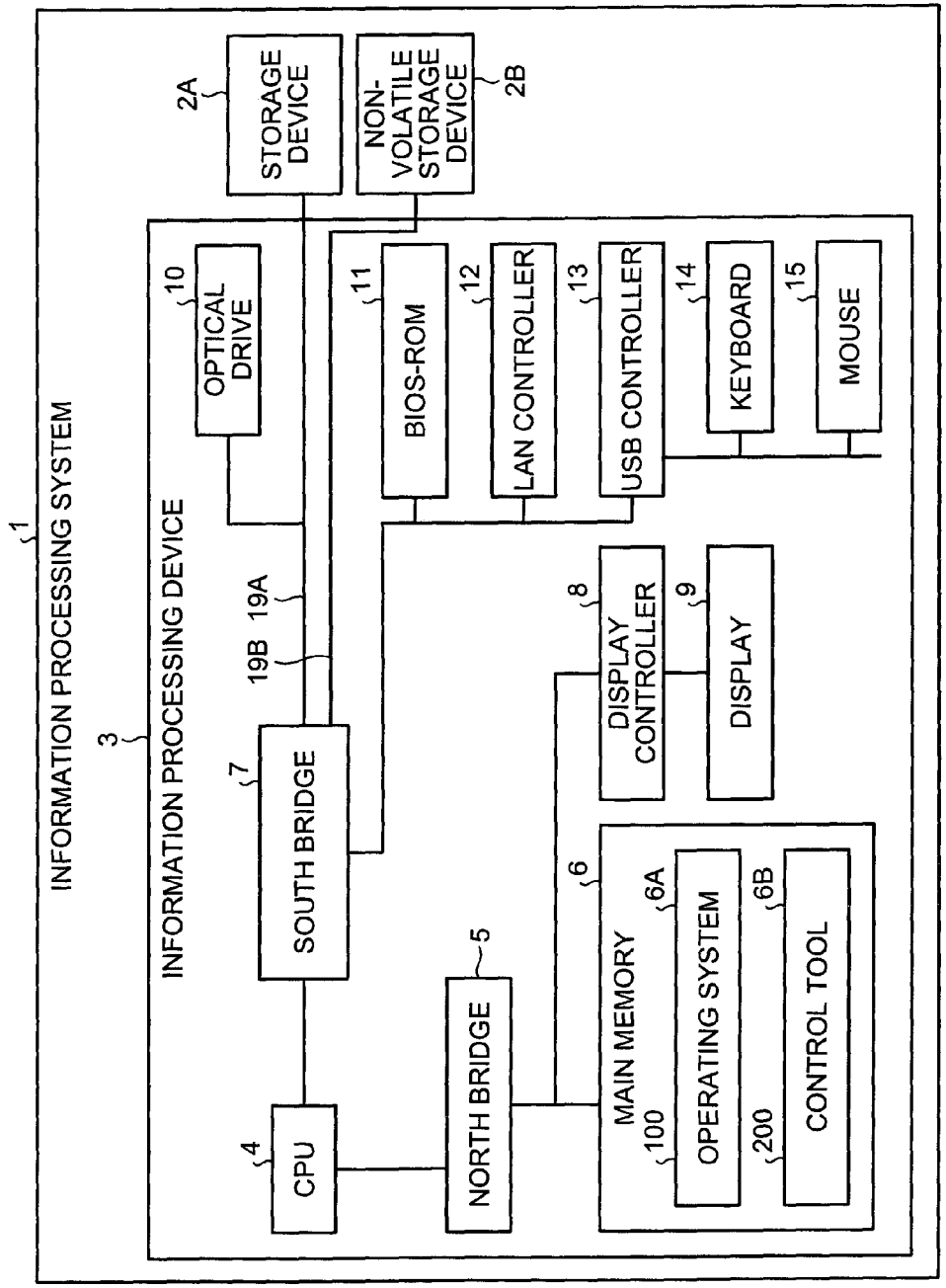
FIG. 1 is a block diagram illustrating an example of the functional configuration of an information processing system according to a first embodiment.

According to an embodiment, a first storage unit that includes a first memory that is at least readable. A second storage unit that includes a readable and writable second non-volatile memory, and a control unit configured to invalidate one or more mappings of a logical address region specified by a received deletion notification to the second non-volatile memory and transmit data indicated by a first function to the information processing device when a logical address region specified by a received read command is not mapped to the second non-volatile memory. A storage medium storing a control program to be loaded to an information processing device to which first and second storage units are connectable. The control program causing the information processing device to perform a first process of reading data from a first logical address region of the first storage unit; a second process of determining whether data read from the first logical address region is identical with the data indicated by the first function; a third process of writing the read data to a second logical address region of the second storage unit when the read data is not identical with the data indicated by the first function; and a fourth process of sending the deletion notification to the second storage unit to invalidate one or more mappings of the second logical address region to the second non-volatile memory without sending the read data to the second storage unit when the read data is identical with the data indicated by the first function.

In the embodiment, host-valid and device-valid data is processed as host-valid and device-invalid data, by using a trim command in the backup process. Accordingly, backup of data of a SSD at high speed, an increase of the number of free blocks in the SSD which is a backup destination, and a decrease in an amount of written data in the SSD which is the backup destination are realized.

First, terms used in the specification will be described.

Host-invalid and device-valid data is data that is invalid for a host (an information processing device) or OS and is valid for a device (non-volatile storage device).

Host-valid and device-valid data is data that is valid for not only a host but also a non-volatile storage device.

Host-valid and device-invalid data is data that is valid for a host and is invalid for a non-volatile storage device.

Host-invalid and device-invalid data is data that is invalid for not only a host but also a non-volatile storage device.

Host-valid data is data that is valid at least for a host.

Host-invalid data is data that is invalid at least for a host.

Device-valid data is data that is valid at least for a non-volatile storage device.

Device-invalid data is data that is invalid at least for a non-volatile storage device.

Hereinafter, a storage medium storing a control program, a method of controlling an information processing device, an information processing system, and the information processing device according to embodiments will be described in detail with reference to the appended drawings. The invention is not limited to the embodiment.

First Embodiment

FIG. 1 is a diagram illustrating a first configuration of an information processing system 1 which is an example of an information processing system according to a first embodiment. The information processing system 1 includes a storage device 2A, an information processing device 3 (a host 3), a memory interface 19A connecting the non-volatile storage device 2A to the information processing device 3, and a memory interface 19B on which the non-volatile storage device 2B for backup of the storage device 2A can be mounted. In this embodiment, the storage device 2A is configured as the non-volatile storage device 2A. SSDs (Solid State Drive) are used as the non-volatile storage devices 2A and 2B. However, for example, other non-volatile storage devices such as hard disk drives, hybrid hard disk drives, SD cards, USB memories, NAND-type flash memories, ReRAMs (Resistance Random Access Memories), or magnetic tapes may be used. The non-volatile storage devices 2A and 2B may be different kinds of non-volatile storage devices. The maximum value (LBA Count) of LBA (Logical Block Addressing) which is a logical address which is addressable in the non-volatile storage device 2B is preferably the same as an LBA count of the non-volatile storage device 2A or is preferably greater than the LBA count of the non-volatile storage device 2A. As the storage device 2A, a volatile storage device such as a DRAM (Dynamic Random Access Memory) or a SRAM (Static Random Access Memory) may be used rather than the non-volatile storage device. Further, the storage device 2A may be a storage device that can perform only read operations of read operations and write operations.

In this embodiment, SATA (Serial Advanced Technology Attachment) interfaces are used as the interfaces 19A and 19B. Other interfaces such as a USB (Universal Serial Bus), SAS (Serial Attached SCSI), Thunderbolt (registered trademark), PCI Express, a LAN (Local Area Network), a fiber channel, and Ethernet may be used. The interfaces 19A and 19B may be different kinds of interfaces. For example, the interface 19A and the interface 19B may be a SATA interface and a USB interface respectively.

The non-volatile storage device 2B which is a backup destination may be installed in a place physically distant from the information processing device 3 and may be mounted on the information processing device 3 as a network drive or a cloud storage via a network.

In this embodiment, for example, a case in which the SATA interface is used for the interface 19B will be described.

A CPU (control circuit) 4 is a central processing unit of the information processing device 3. Various kinds of calculation and control in the information processing device 3 are performed by the CPU 4. The CPU 4 controls the non-volatile storage devices 2A and 2B or an optical drive 10 such as a DVD-ROM via a south bridge 7. The CPU 4 controls a main memory 6 via a north bridge 5. For example, DRAM may be used as the main memory 6.

A user controls the information processing device 3 through an input device such as a keyboard 14 or a mouse 15. A signal from the keyboard 14 or the mouse 15 is processed by the CPU 4 via a USB (Universal Serial Bus) controller 13 and the south bridge 7. The CPU 4 transmits image data, text data, or the like to a display (display device) 9 via the north bridge 5 and a display controller 8. The user can recognize the image data, the text data, or the like from the information processing device 3 through the display 9.

The CPU 4 is a processor that is installed to control a process of the information processing system 1 and executes an operating system (OS) 100 loaded from the non-volatile storage device 2A to the main memory 6. When the optical drive 10 enables at least one process of reading and writing processes in a loaded optical disc to be performed, the CPU 4 performs the process. The CPU 4 also executes a system BIOS stored in a BIOS (Basic Input/Output System)-ROM 11. The system BIOS is a program used for hardware control in the information processing system 1. In the ROM 11, UEFI (Unified Extensible Firmware Interface) firmware may be stored and may be executed by the CPU 4, instead of the system BIOS. The CPU 4 also controls a LAN (Local Area Network) controller 12 via the south bridge 7.

The north bridge 5 is a bridge device connected to a local bus of the CPU 4. The north bridge 5 also includes a memory controller performing access and control of the main memory 6. Further, the north bridge 5 has a function of executing communication or the like with the display controller 8.

The main memory 6 temporarily stores a program or data and functions as work memory of the CPU 4. For example, DRAM (Dynamic Random Access Memory), MRAM (Magnetoresistive Random Access Memory), ReRAM (Resistance Random Access Memory), or SRAM (Static Random Access Memory) is used as the main memory 6. The main memory 6 includes a storage region 6A storing an OS 100 and a storage area 6B storing a control tool (control program) 200. As generally known, the OS 100 is a program that manages the entire information processing device 3, for example, by managing an input/output device of the information processing device 3, managing a disc or memory, and performing control such that software can use hardware of the information processing device 3. The control program 200 is a program that has a backup function of data from the storage device 2A to the non-volatile storage device 2B. In this embodiment, the OS 100 and the control program 200 are distinguished from each other, but the control program 200 may be a part of the OS 100.

The display controller 8 is a graphics processing unit that controls the display 9 of the information processing system 1. The south bridge 7 is a bridge device connected to the local bus of the CPU 4. The south bridge 7 controls the non-volatile storage device 2A which is a storage device storing various kinds of software and data through the SATA interface 19A. The non-volatile storage device 2A may be connected directly to the CPU 4 without passing through the south bridge 7.

In the information processing system 1, access to the non-volatile storage devices 2A and 2B are performed in units of logical sectors which are the minimum units of LBAs. For example, a write command (write request), a read command (read request), a flash command, and the like are output to the non-volatile storage devices 2A and 2B via the SATA interfaces 19A and 19B.

The south bridge 7 has a function of performing access and control of the BIOS-ROM 11, the optical drive 10, the LAN controller 12, and the USB controller 13. The keyboard 14 and the mouse 15 are connected to the USB controller 13.

[SSD]

Figure 2:
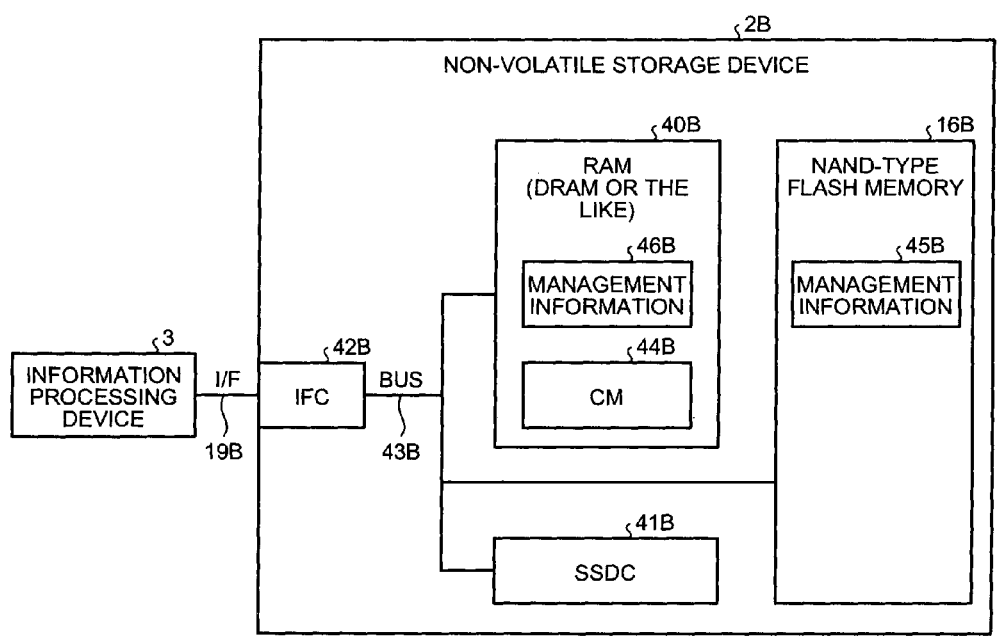
FIG. 2 is a functional block diagram illustrating an example of the internal configuration of an SSD.

FIG. 2 is a block diagram illustrating the non-volatile storage device 2B which is a backup destination. In this embodiment, an example will be described in which a solid state drive (SSD) is used as the non-volatile storage device 2B. The non-volatile storage device 2A which is a backup source may have the same configuration as the non-volatile storage device 2B. The non-volatile storage device 2A itself which is a backup source does not receive a trim command. Therefore, the invention can be applied, even when the non-volatile storage device 2A does not satisfy a condition indicated here, for example, when the non-volatile storage device 2A does not support a trim command. In this embodiment, the non-volatile storage device 2B includes a NAND-type flash memory (hereinafter, abbreviated to NAND memory) 16B that is non-volatile semiconductor memory, an interface controller (IFC) 42B that transmits and receives a signal to and from the information processing device 3 via the SATA interface 19B, a RAM (Random Access Memory) 40B that is semiconductor memory and includes management information area 46B storing management information including a logical-physical conversion table (Lookup table (LUT)) having mappings of LBAs to physical addresses of the NAND memory 16B and a cache memory (CM) 44B functioning as an intermediate buffer between the IFC 42B and the NAND memory 16B, an SSD controller (SSDC) 41B that performs management and control of the NAND memory 16B and the RAM 40B and control of the IFC 42B, and a bus 43B that connects the constituent units to each other.

As the RAM 40B, DRAM (Dynamic Random Access Memory), SRAM (Static Random Access Memory), FeRAM (Ferroelectric Random Access Memory), MRAM (Magnetoresistive Random Access Memory), PRAM (Phase Change Random Access Memory), ReRAM (Resistance Random Access Memory), or the like can be used. The RAM 40B may be included in the SSDC 41B.

The NAND memory 16B stores user data designated by the information processing device 3 and stores the management information in the management information area 46B in the management information area 45B as backup information. The NAND memory 16B includes a memory cell array in which a plurality of memory cells are arrayed in a matrix form, and the individual memory cell can store multiple bits using a upper page and a lower page. The NAND memory 16B is configured to include a plurality of memory chips and each memory chip is configured such that a plurality of blocks which are units of erase operations are arrayed. The NAND memory 16B writes data and reads data for each page. The block is configured to include a plurality of pages.

The RAM 40B includes the cache memory (CM) 44B that functions as a data transmission cache between the information processing device 3 and the NAND memory 16. The RAM 40 functions as memory storing the management information and memory for other work areas. For example, the SSDC 41B loads the management information from the management information area 45B to the management information area 46B when the non-volatile storage device 2B is powered on. The management information in the management information area 46B is saved and stored in the management information area 45B of the NAND memory 16B periodically, at the time of shutting down power or at the time of receiving a stand-by command or a flush cache command from the information processing device 3.

Figure 3:
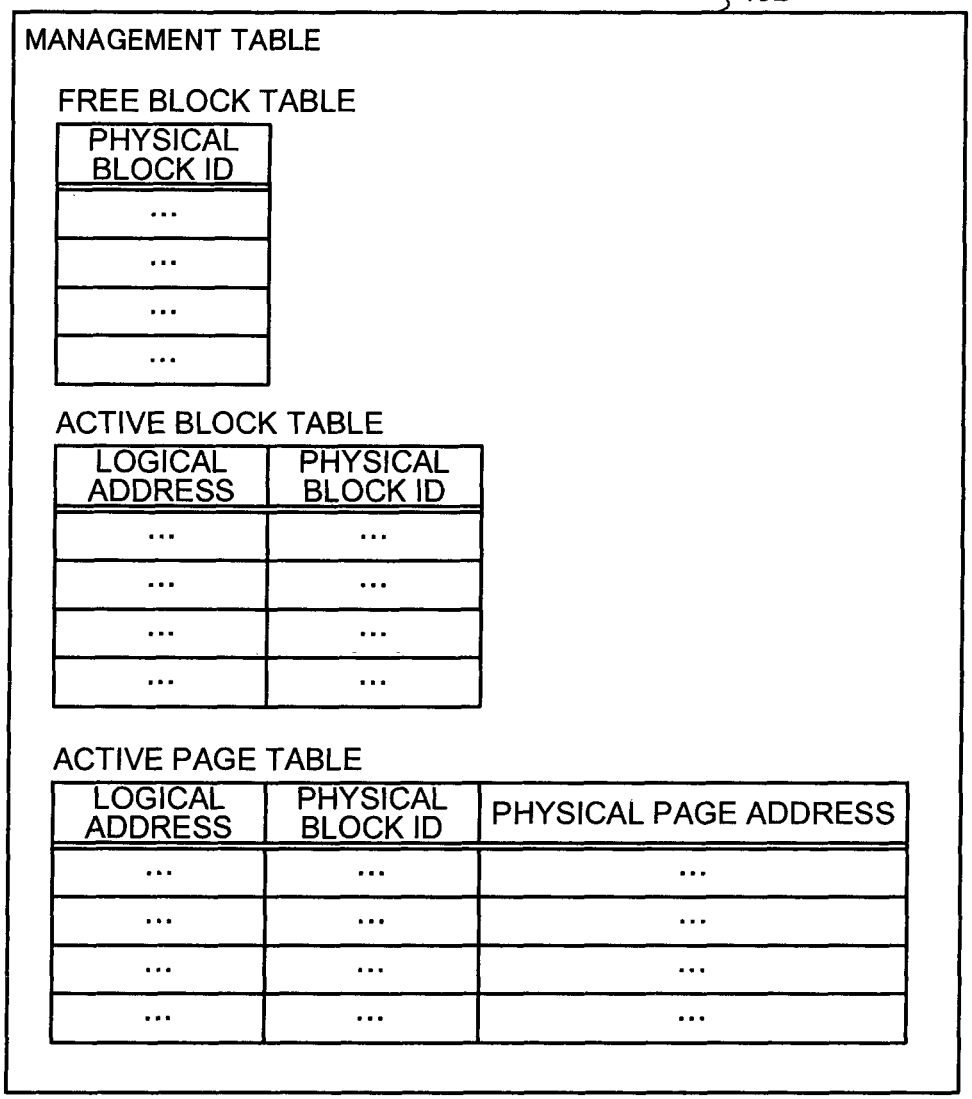
FIG. 3 is a diagram illustrating management information of the SSD.

As illustrated in FIG. 3, the management table 46B includes a free block table, an active block table, and an active page table. A physical block ID and a physical page address are included in a physical address. The active block table has mappings of logical addresses (LBA) to physical block IDs (physical block addresses). A physical block (active block) registered in the active block table is configured to stores valid data at least for the SSDC 41B. The free block table manages a physical block which is not mapped from an LBA. Since the physical block (free block) registered in the free block table is not mapped from the LBA, the physical block does not stores valid data.

The active page table has mappings of LBAs to the physical page addresses. A physical page (an active page) registered in the active page table stores valid data at least for the SSDC 41B. The physical page registered in the active page table is associated with the physical block ID (physical block address) belonging to the physical page. The LBA managed in the management table is preferably an address with the minimum data size manageable by the non-volatile storage device 2B or a data size greater than the minimum data size. To decrease the data size of the management table 46B, an address obtained by performing right shift calculation on the LBA may be used as a logical address stored in the active block table or the active page table by predetermined bits.

A function of the SSDC 41B serving as the controller of the non-volatile storage device 2B is realized by a processor that executes a system program (firmware) stored in the NAND memory 16B, various hardware circuits, and the like. When the SSDC 41B receives various commands of a write request, a cache flash request, a read request, and the like, the SSDC 41B transmits data between the information processing device 3 and the NAND memory 16B, updates the management information stored in the area 46B and the area 44B, ECC encoding of data written in the NAND memory 16B, ECC decoding of data read from the NAND memory 16B, and the like.

When the information processing device 3 issues a read request or a write request to the non-volatile storage device 2B, the information processing device 3 sends information of a logical address region to the non-volatile storage device 2B via the SATA interface 19B. The information of the logical address region includes a LBA and a sector size.

The IFC 42B has a function of receiving a read request, a write request, or other requests and data from the information processing device 3 and transmitting the received request and the data to the SSDC 41B or transmitting data to the RAM 40B under the control of the SSDC 41B.

<Writing Process>

Figure 4:
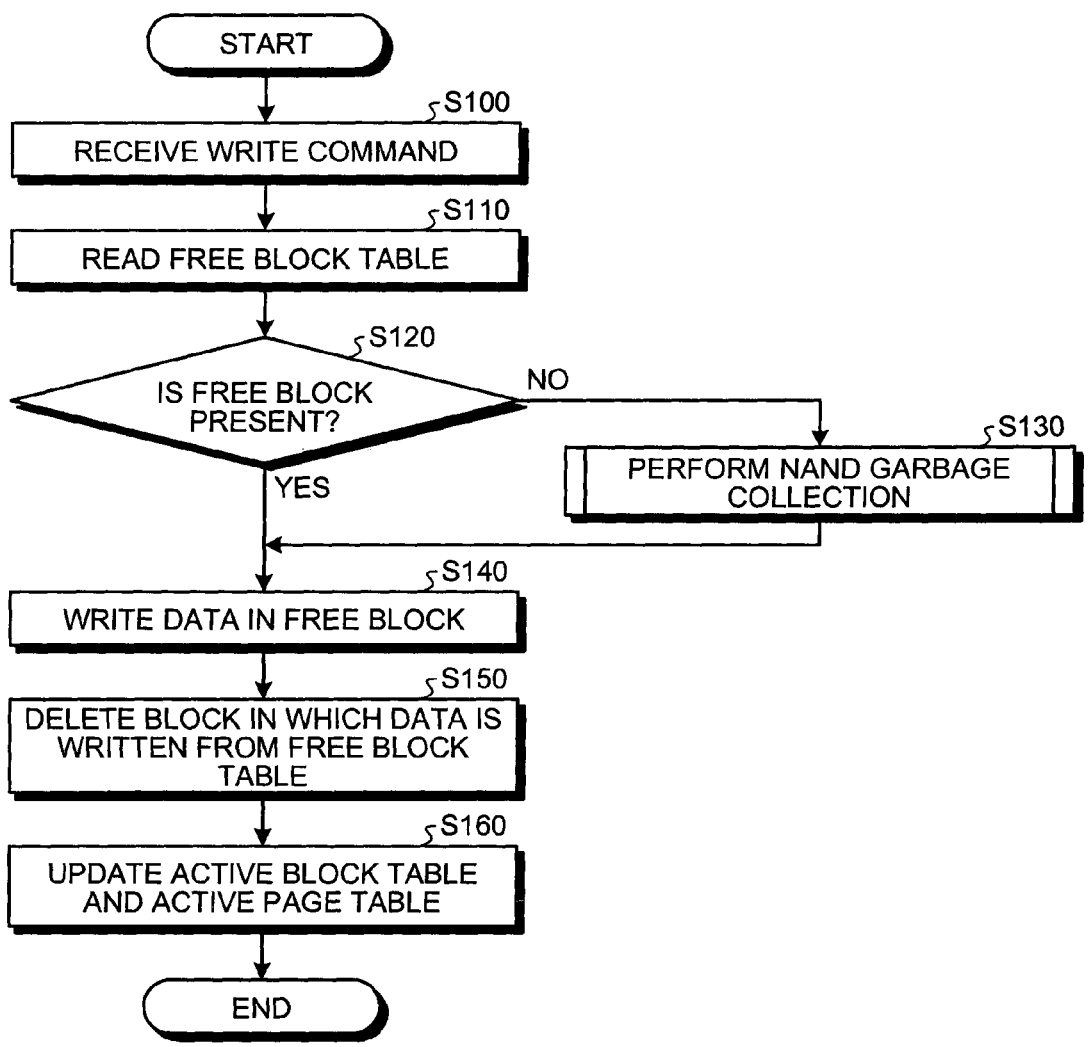
FIG. 4 is a flowchart illustrating an example of a writing process of the SSD.

FIG. 4 is a flowchart illustrating a writing process of the non-volatile storage device 2B which is a backup destination. The non-volatile storage device 2B receives a write command from the information processing device 3 (step S100). The write command includes a write command, an LBA, a sector count, and data.

The SSDC 41B reads the free block table from the DRAM 40B (step S110) and selects a physical block ID from the free block table. When a free block is not registered in the free block table, the SSDC 41B performs NAND garbage collection (NAND GC) to be described below, create a free block, add the free block to the free block table and selects the physical block ID of the free block (step S120 and step S130).

The SSDC 41B programs data (writes data) in the free block corresponding to the selected physical block ID (step S140). Subsequently, the SSDC 41B deletes the programmed physical block ID from the free block table (step S150). The SSDC 41B updates the active block table and the active page table (step S160). That is, the LBA and the physical block ID corresponding to the programmed block are added to the active block table, and the LBA, the physical block ID, and the physical page address are added to the active page table. The SSDC 41B may erase the physical block to be written before the programming process of step S140.

<NAND Garbage Collection>

Figure 5:
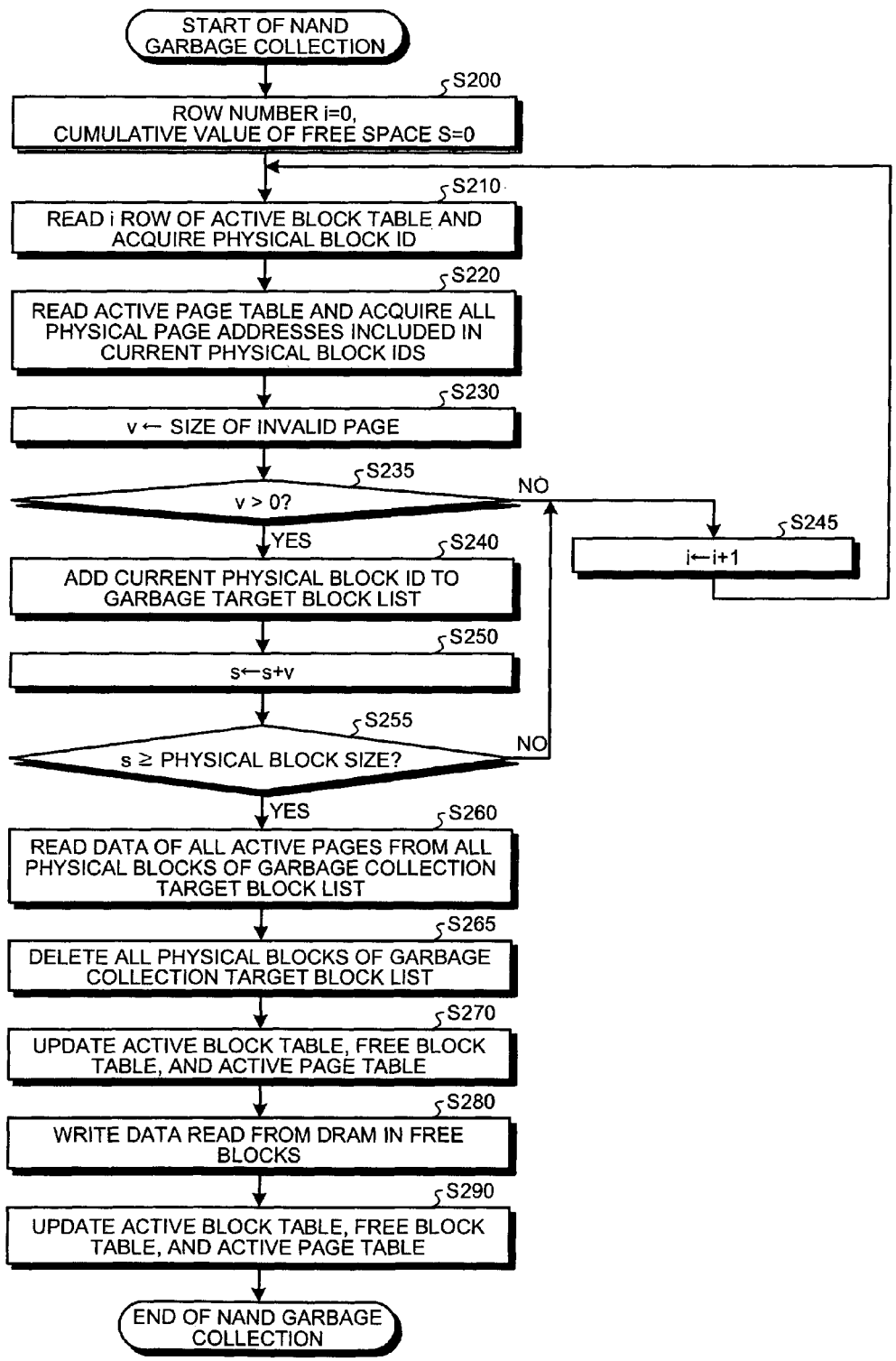
FIG. 5 is a flowchart illustrating an example of a garbage collection process of NAND memory of the SSD.

Next, a NAND garbage collection process (GC) of the non-volatile storage device 2B will be described. FIG. 5 is a flowchart illustrating the NAND garbage collection process of the non-volatile storage device 2B. Active pages (valid page) registered in the active page table among all of the pages included in the physical blocks are mapped from the LBA. All of the pages included in the physical blocks are not always valid pages. Invalid pages which are not the valid pages are not mapped from the LBAs. The physical block has free spaces by the amount of invalid pages, and the free blocks can be created by collecting the invalid pages and the valid pages.

First, the SSDC 41B sets a row number i=0 and a cumulative value of free space s=0 (step S200). Subsequently, the SSDC 41B reads the first row of the active block table from the DRAM 40B and selects the physical block ID (step S210). The physical block ID selected in step S210 is referred to as a current physical block ID. Subsequently, the SSDC 41B reads the active page table from the DRAM 40B and selects all of the physical page addresses corresponding to the current physical block IDs (step S220).

Subsequently, the SSDC 41B calculates the size of the invalid page among the current physical blocks and substitutes the size of the invalid page into a variable v (step S230). Subsequently, the SSDC 41B determines whether v>0 (step S235). When v>0, the SSDC 41B adds the current physical block ID to a garbage collection target block list (step S240). On the other hand, when the SSDC 41B determines that the invalid page is not present in step S235 (No in step S235), the SSDC 41B increments the row number i to select a next physical block ID as the processing target (step S245).

The SSDC 41B adds the variable v to the cumulative value of free space s (step S250). The SSDC 41B determines whether the cumulative value of free space s reaches a physical block size, that is, a total amount of the sizes of the invalid pages acquired until now reaches the physical block size (step S255). When the cumulative value of free space s does not reach the physical block size, the SSDC 41B increments the row number i (step S245) and then repeats the processes subsequent to step S210.

Conversely, when the cumulative value of free space s reaches the physical block size, the SSDC 41B reads the data of all the active pages from all of the physical blocks of the garbage collection target block list and stores the read data in the DRAM 40B (step S260). The SSDC 41B erases all of the physical blocks of the garbage collection target block list (step S265). The SSDC 41B updates the active block table, the free block table, and the active page table (step S270). That is, the erased physical blocks are deleted from the active block table and are added to the free block table, and the active pages from which the data is read are deleted from the active page table.

The SSDC 41B writes the data of all the active pages stored in the DRAM 40B in the free blocks (step S280). The SSDC 41B updates the active block table, the free block table, and the active page table (step S290). That is, the programmed physical block is deleted from the free block table and is added to the active block table, and the programmed physical page is added to the active page table.

Thus, since the NAND GC performs the reading process, the deleting process, and the programming process of the NAND memory 16B numerously and takes a lot of time. Accordingly, when there are not enough many free blocks in the non-volatile storage device 2B, the SSDC 41B performs the NAND garbage collection. Then the write speed for the information processing device 3 is decreased. Furthermore, the reliability of the NAND memory 16B deteriorates due to the write process and erase process of the NAND GC.

The deleting process of step S265 may not be performed during the NAND GC of step S130 in FIG. 4 and may be performed immediately before the writing process of step S140.

<Deletion Notifying Process>

Next, a deletion notifying process of the non-volatile storage device 2B will be described. An example of a command for deletion notification includes Data Set Management Command (commonly called a trim command) described in INCITS ATA/ATAPI Command Set-2 (ACS-2). The deletion notifying process is a process capable of notifying the non-volatile storage device of LBA regions (LBA Range) when data of the LBA region is deleted on the OS 100. In this embodiment, the deletion notification includes the information of the LBA region including LBA and sector count. Then, the LBA regions can be treated as free areas on the non-volatile storage device 2B. The non-volatile storage device 2B can create free blocks through the deletion notifying process. The function of a trim command may be realized by not only Data Set Management Command but also, for example, another command such as a vendor-specific command using an SCT command described in ACS2. When an interface other than the SATA interface is used as the interface 19B, a command for the deletion notifying process intrinsic to the interface may be used as the trim command. For example, Deallocate (AD) of an 11h Dataset Management command described in NVM Express Revision 1.1, Oct. 11, 2012 (http://www.nvmexpress.org/) may be used as the trim command. For example, when the non-volatile storage device 2B has a Deterministic Zeroing TRIM function to be described below, the function of the trim command may be realized by not only the above-described command but also a 08h Write Zeroes command described in NVM Express Revision 1.1. Furthermore, a 42h UNMAP command described in SCSI Block Commands-3 (SBC-3), Revision 35, Dec. 7, 2012 (http://www.t10.org/) may be used as the trim command. In this embodiment, the trim command is used not only when data is deleted, but also when data is backed up and copied.

Figure 6:
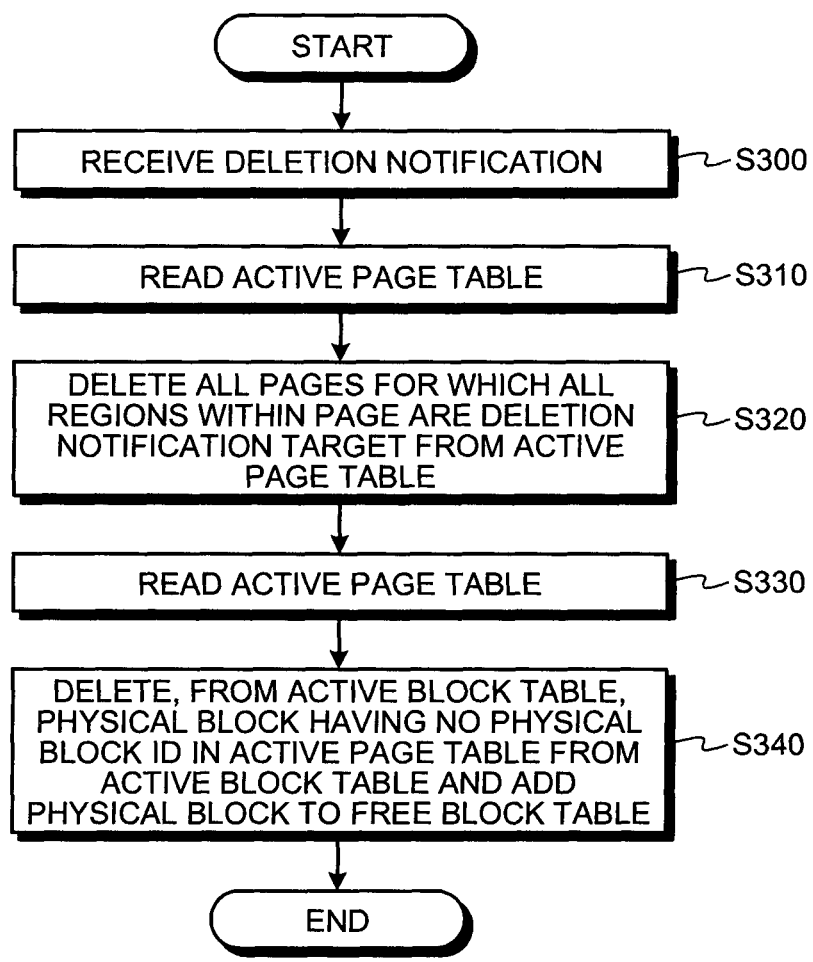
FIG. 6 is a flowchart illustrating an example of a process when the SSD receives a deletion notification.

FIG. 6 is a flowchart illustrating the deletion notifying process of the non-volatile storage device 2B. The non-volatile storage device 2B receives a deletion notification from the information processing device 3 (step S300). The deletion notification includes a deletion command and LBA range information. The LBA range information includes an LBA and a sector count (a sector size). The SSDC 41B reads the active page table from the DRAM 40B (step S310). The SSDC 41B deletes, from the active page table, all of the pages whose overall areas are mapped from the LBA regions which are specified by the deletion notification (step S320).

Thus, data in the pages of the deletion notification target are changed from device-valid data to device-invalid data.

The SSDC 41B reads the active block table from the DRAM 40B (step S330). The SSDC 41B deletes the physical block having no physical block ID in the active page table from the active block table and adds the physical block to the free block table (step S340).

Thus, the SSDC 41B delete the mappings of the LBA regions specified by the deletion notification to physical addresses of the NAND memory 16B. The SSDC 41B can create the free blocks by the deletion notification process as well as the NAND GC. Data on the NAND regions which is mapped from the LBA regions specified by the deletion notification process is changed from the device-valid data to the device-invalid data. The data size of the LBA regions specified by the deletion notification may be a size equal to, greater or smaller than the minimum data size managed in the management table by the non-volatile storage device 2B.

As described above, the non-volatile storage device can create the free blocks by processing the deletion notification received from the information processing device 3. Thus, the device-valid data of the LBA regions specified by the deletion notification is changed to the device-invalid data. The SSDC 41B changes only the management information in the deletion notifying process. Then, the deletion notifying process can be processed at high speed compared to processing of a write command sent from the information processing device 3 to the SSD in which both of changing of the management information and writing of user data to the NAND memory are processed by SSDC 41B.

<Reading Process>

Figure 7:
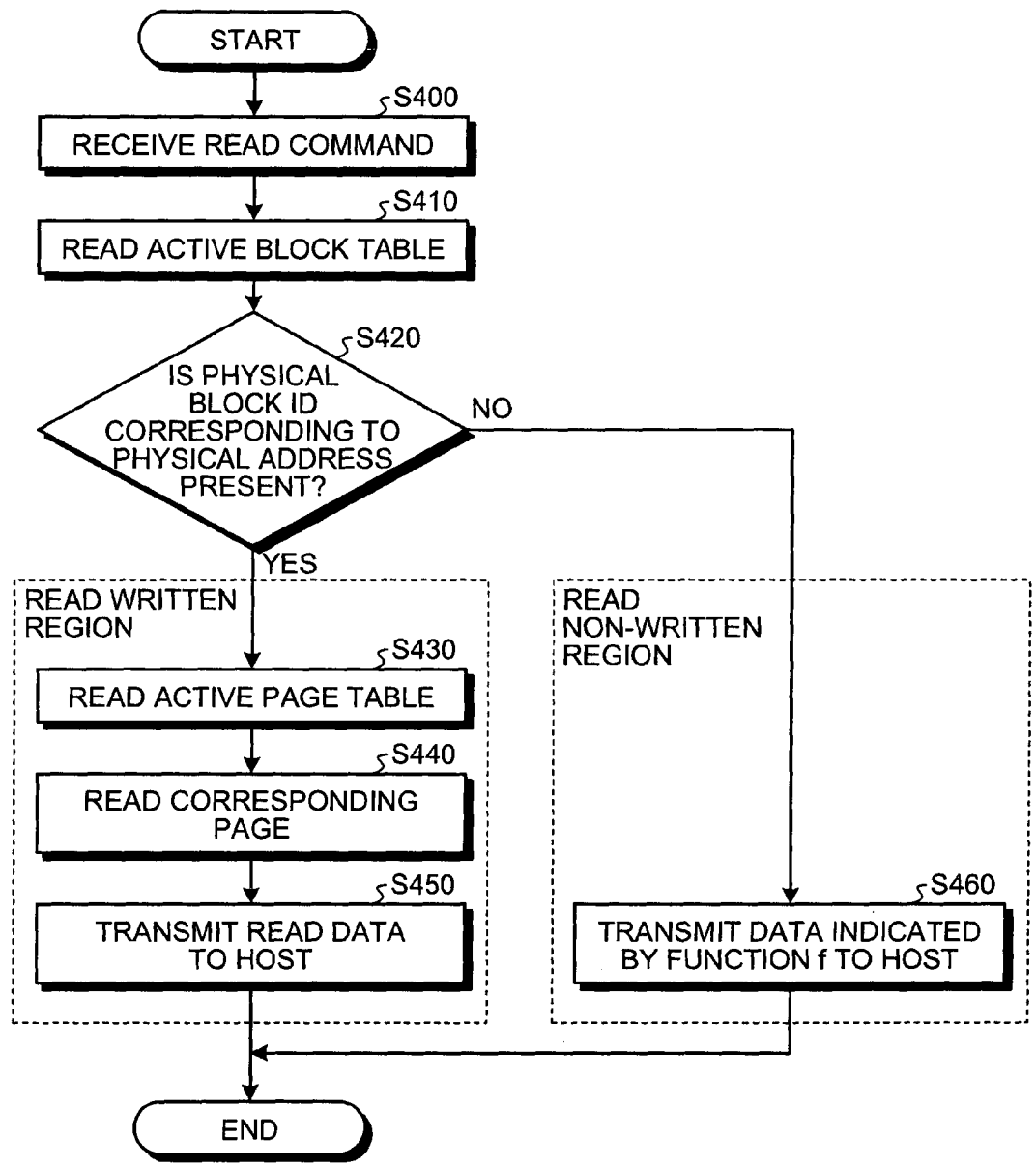
FIG. 7 is a flowchart illustrating an example of a reading process of the SSD.

Next, a reading process of the non-volatile storage device 2B which is a backup destination will be described. FIG. 7 is a flowchart illustrating the reading process of the non-volatile storage device 2B. After completing a backup process of the non-volatile storage device 2A which is a backup source, the information processing device 3 may read backup data from the non-volatile storage device 2B which is the backup destination. In this case, the non-volatile storage device 2B receives a read command from the information processing device 3 (step S400). The read command includes information of LBA regions to be read. For example, the information of the LBA regions includes a LBA and a sector count.

The SSDC 41B reads the active block table from the DRAM 40B (step S410). The SSDC 41B selects the physical block IDs mapped from the LBA regions (step S420). When the physical block IDs exist in the active block table (S420:Yes), the SSDC 41B reads data from blocks of the block IDs. That is, the SSDC 41B reads the active page table (step S430), searches physical page addresses mapped from the LBA regions from the active page table and reads data from the physical addresses of the NAND memory 16B (step S440). The SSDC 41B transmits the read data to the information processing device 3 (step S450).

When a LBA region is not mapped to a valid physical block ID in the active block table (S420:No), the SSDC 41B performs a process of reading a non-written region. That is, the SSDC 41B does not read data from the NAND memory 16B and transmits data calculated by a function f to the information processing device 3 (step S460). In other words, the SSDC 41B transmits output data from the function f to the information processing device 3. In other words, the SSDC 41B transmits output data indicated by the function f to the information processing device 3. The data length of the data is equal to the size of the LBA region. Specifically, when it is assumed that Ai is an address and Di is data, the data indicated by the function f satisfies:

$$f(Ai)=Di \text{ (where } i \text{ is an integer equal to or greater than 0).}$$

The function f can be configured arbitrarily. For example, when LBA is set as an independent variable for a function f and the function f is defined as:

$$f(LBA)=0,$$

the SSDC 41B transmits data filled with "0" of the data length of the LBA region in response to the read request from the information processing device 3. The function f may be stored in the SSDC 41B, may be stored in the NAND memory 16B, or may be stored in the RAM 40B. To improve the speed of the process of reading the non-written region, it is preferable to store the function f in the SSDC 41B or the RAM 40B. The function f may be stored in the NAND memory 16B while the non-volatile storage device 2B is powered off, and the SSDC 41B may read the function f from the NAND memory 16B to the RAM 40B when the non-volatile storage device 2B is powered on.

In the process of reading the non-written region, the SSDC 41B doesn't read data from the NAND memory 16B or read substantially little data from NAND memory 16B. Therefore, the process of reading the non-written region is performed at higher speed than the process of reading the written region in which the SSDC 41B reads both of the active page table and the NAND memory 16B.

Thus, when the information processing device 3 reads the LBA region including the device-invalid data in the non-volatile storage device 2B which is a backup destination, the SSDC 41B may not read the NAND memory 16B of the non-volatile storage device 2B. As a result, the SSDC 41B can read the device-invalid data at the higher speed than the device-valid data. When a LBA region having device-invalid data is read, data transmitted from the non-volatile storage device 2B to the information processing device 3 may be any data. In this embodiment, however, the data is required to be at least deterministic data for each LBA. Further, to notify data to be backed up to the information processing device 3 more clearly, the non-volatile storage device 2B preferably notifies the information processing device 3 that the read data of the device-invalid data of the non-volatile storage device 2B is deterministic when the non-volatile storage device 2B is activated or is connected to the information processing device 3. For example, as described in ACS-2 in Non-Patent Document, bit14 of IDENTIFY DEVICE data word 169 is set to 1. Thus, the non-volatile storage device 2B can notify the information processing device 3 in advance that the value of the device-invalid data is deterministic. Thus, the data deterministic at least for each LBA is expressed as follows using the function f(LBA) in the invention:

$$data=f(LBA).$$

In particular, when f(LBA)=0, bit5 of IDENTIFY DEVICE data word 169 is preferably set to 1, and thus the non-volatile storage device 2B can notify the information processing device 3 in advance that a read data of the device-invalid data is the fixed value of 0 (that the non-volatile storage device 2B supports the Deterministic Zeroing TRIM feature). When f(LBA)=0, particularly, when a logical sector size is 512 bytes, the function f outputs data filled with 0 such as "f(LBA)=00000 . . . 0" (0-fill) of 512 byte length.

[Method of Storing Control Program]

Figure 8:
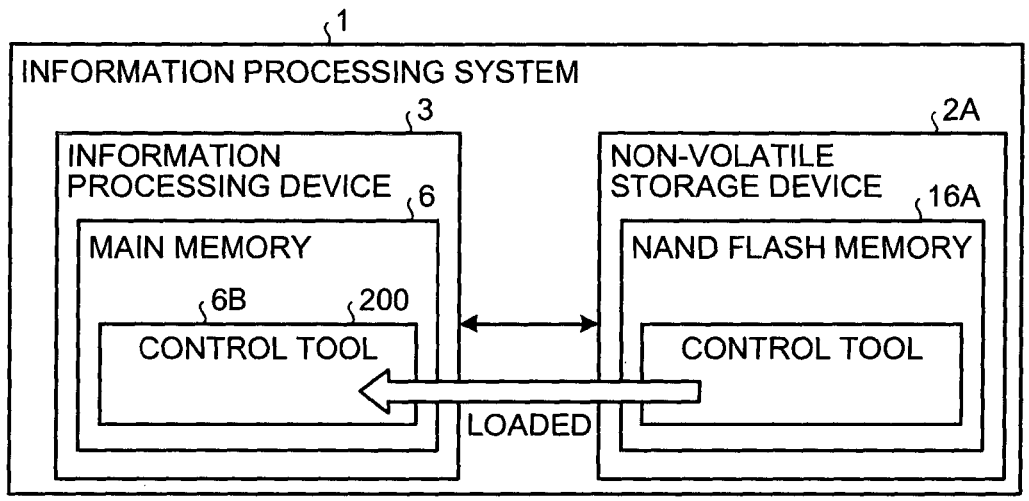
FIG. 8 is a block diagram illustrating an example of the functional configuration of an information processing system when a control tool is stored in the SSD.
Figure 9:
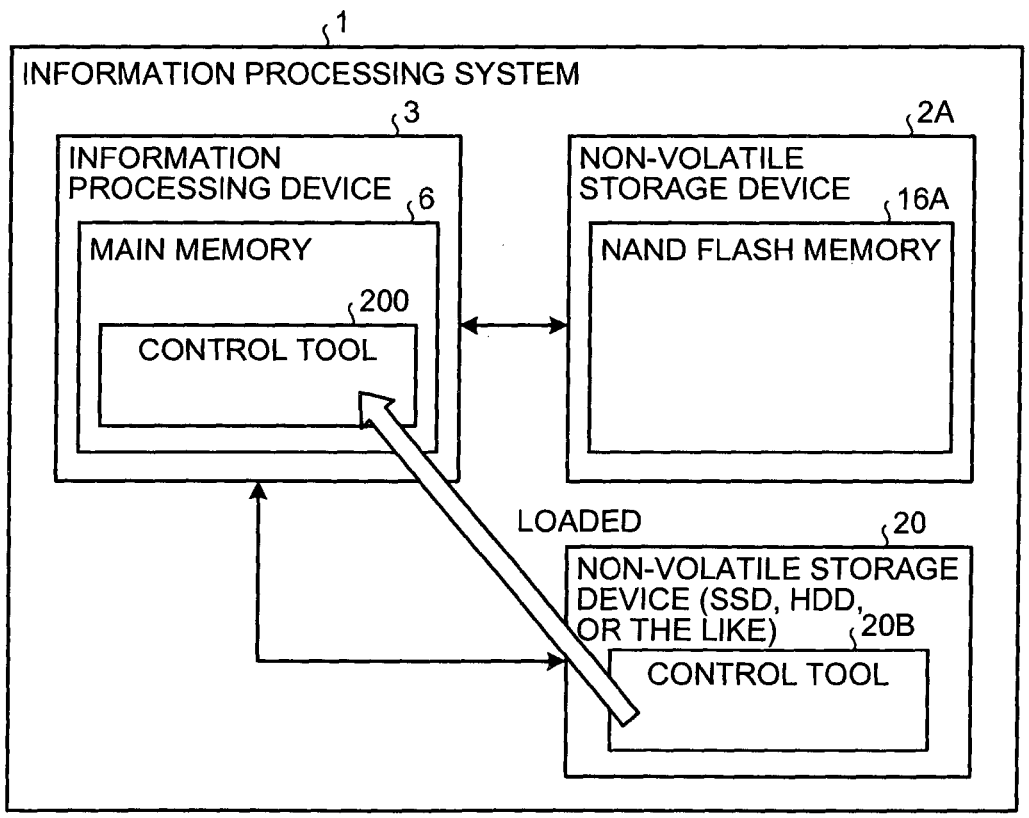
FIG. 9 is a block diagram illustrating an example of the functional configuration of the information processing system when the control tool is stored in another external storage device.

Next, a method of storing the control program (control tool) 200 operated on the information processing device 3 will be described. For example, as illustrated in FIG. 8, the control tool 200 is stored in the NAND memory 16A of the non-volatile storage device 2A which is a backup source while the information processing device 3 is powered off. However, when the information processing device 3 is powered on or when the OS 100 receives a message to activate the control program 200, the CPU 4 loads the control tool 200 from the NAND memory 16 to the region 6B on the main memory 6. On the other hand, when a non-volatile storage device 20 different from the non-volatile storage device 2A and the non-volatile storage device 2B is connected to the information processing device 3, as illustrated in FIG. 9, the control program 200 may be stored in a region 20B of the non-volatile storage device 20. When the information processing device 3 is activated or a program is activated, the control program 200 may be loaded from the region 20B to the region 6B. In particular, when the non-volatile storage device 20 is used as a system drive storing an OS and the non-volatile storage device 2A is used as a data drive storing user data such as a document, still image data, or moving image data, the control program is preferably stored in the non-volatile storage device 20 serving as the system drive from the viewpoint of the fact that the roles of the drives 2A and 20 are clearly separated such that the system drive 20 is used as a drive that mainly stores the OS or an application program and the data drive 2A is used as a drive that stores the user data. Alternatively, when a USB memory is used as the drive 20 storing the control program 200, the USB memory may be disconnected from the information processing device 3 at a normal use time. Only when the control program 200 is used, for example, the non-volatile storage device 2A is backed up, the USB memory may be connected to the information processing device 3. The control program may be stored in the non-volatile storage device 2B which is a backup destination.

From the viewpoint of the fact that an effort for a user to set up the control program is omitted, for example, as illustrated in FIG. 8 or 9, the information processing system 1 is preferably shipped in a state (pre-installed state) in which the control program is stored in the non-volatile storage device 2A or the non-volatile storage device 20, and thus the information processing system 1 is sold at a store and is handed to the hand of a user. On the other hand, from the viewpoint of the fact that a user can select installation or non-installation of the control program and the viewpoint of the fact that the latest control program is provided to a user, the control program 200 is preferably downloaded from WEB or may be installed from an external storage medium such as a DVD-ROM or USB memory and is stored in the non-volatile storage device 2A or the non-volatile storage device 20.

Figure 10:
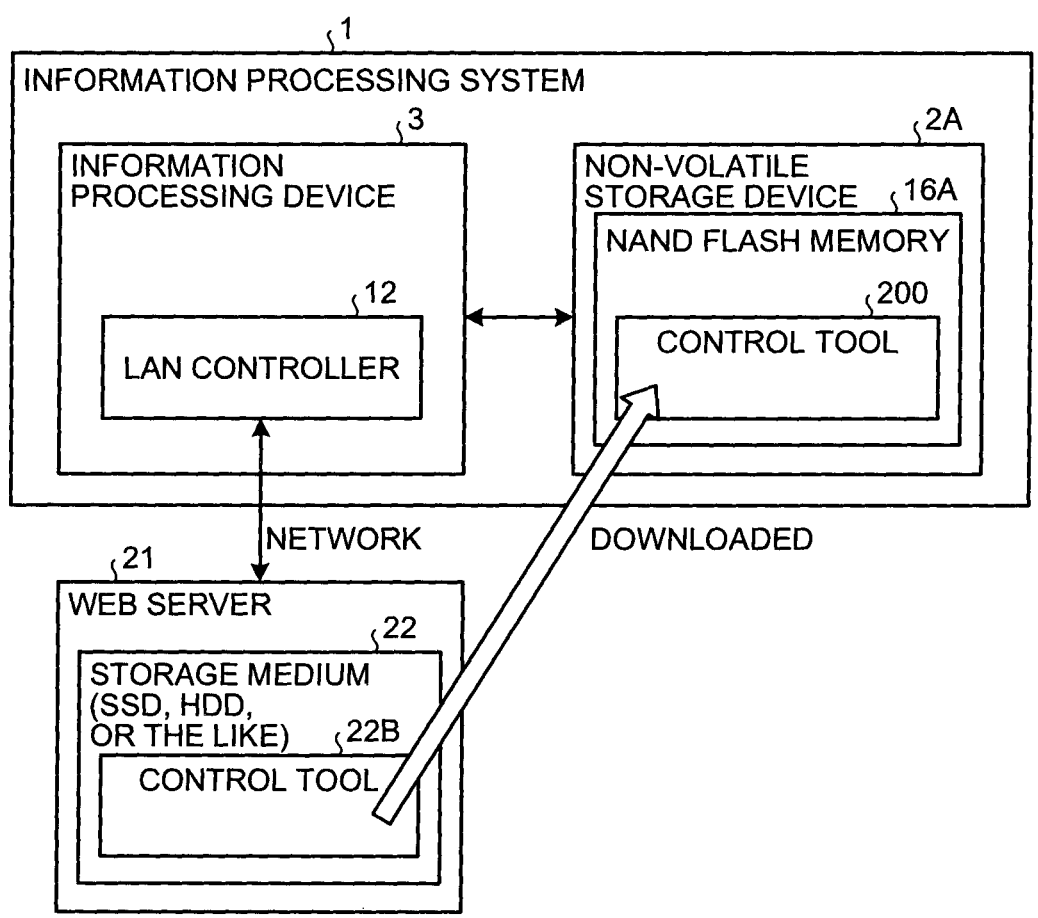
FIG. 10 is a block diagram illustrating an example of the functional configuration of the information processing system when the control tool is installed from WEB.

FIG. 10 is diagram illustrating an example of download from WEB. The control program 200 is stored in a region 22B of a storage medium 22 in a web server 21, and thus the control program 200 passes through, for example, a network device connected to the LAN controller 12 or the USB controller 12 via a network such as the Internet, a local network, or a wireless LAN and is downloaded (or installed) to the NAND memory 16B. In the case of FIG. 9, the control tool 200 is downloaded or installed to the region 20B on the non-volatile storage device 20.

Figure 11:
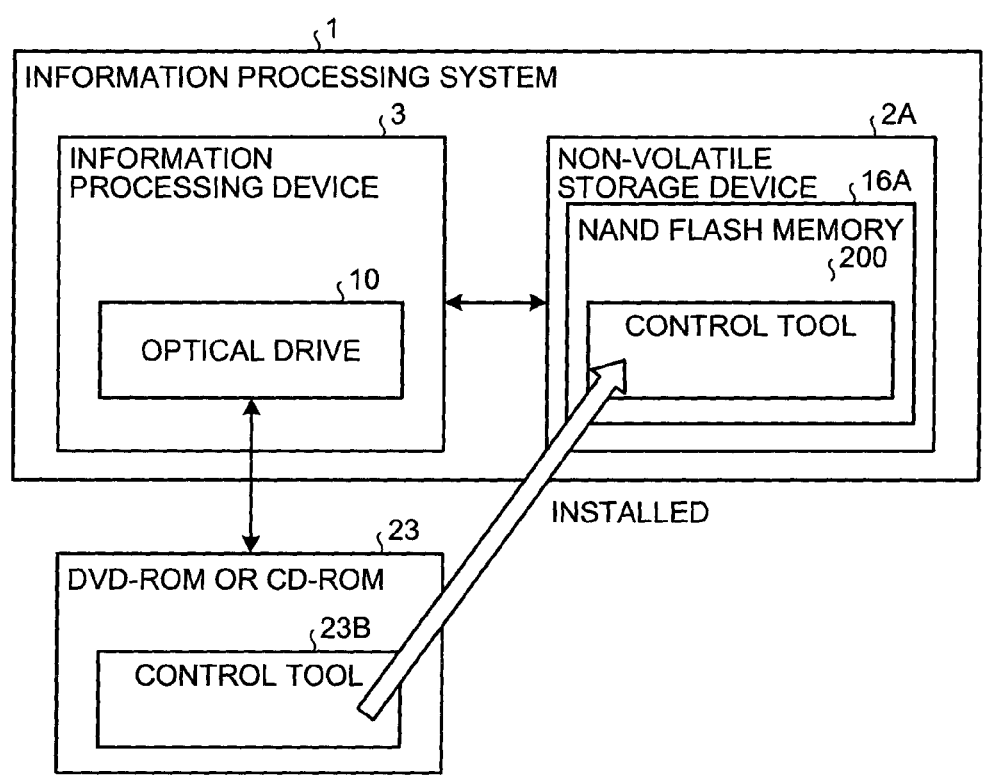
FIG. 11 is a block diagram illustrating an example of the functional configuration of the information processing system when the control tool is installed from an optical drive.
Figure 12:
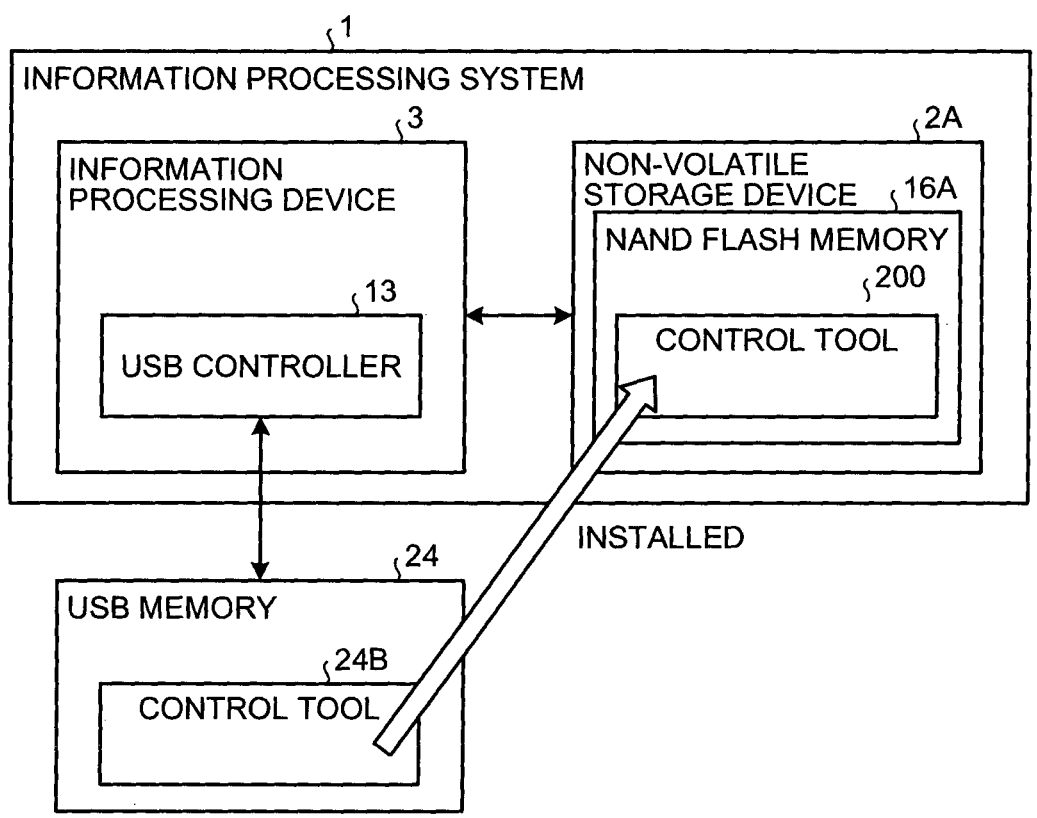
FIG. 12 is a block diagram illustrating an example of the functional configuration of the information processing system when the control tool is installed from USB memory.

FIG. 11 is a diagram illustrating an example of installation from an optical medium such as a DVD-ROM or a CD-ROM. The control tool 200 is stored in a region 23B of an optical medium 23 such as a DVD-ROM or a CD-ROM, and thus the optical medium 23 is set in the optical drive 10 so that the control tool 200 is installed on the NAND memory 16A of the non-volatile storage device 2A via the optical drive 10. FIG. 12 is a diagram illustrating an example of installation from a USB memory 24. The control tool 200 is stored in a region 24B of the USB memory 24, and thus the USB memory 24 is connected to the USB controller 13 so that the control tool 200 is installed on the NAND memory 16A of the non-volatile storage device 2A via the USB controller 13. Instead of the USB memory 24, external memory such as an SD card may be used. From the viewpoint of easy purchase of a user, the optical medium 23 or the USB memory 24 is preferably packed and is sold as an accessory together with the SSD 2 at the time of shipment of the SSD 2. On the other hand, the optical medium 23 or the USB memory 24 may be sold uniquely as a software product or may be attached as a supplement of a magazine or a book.

Figure 13:
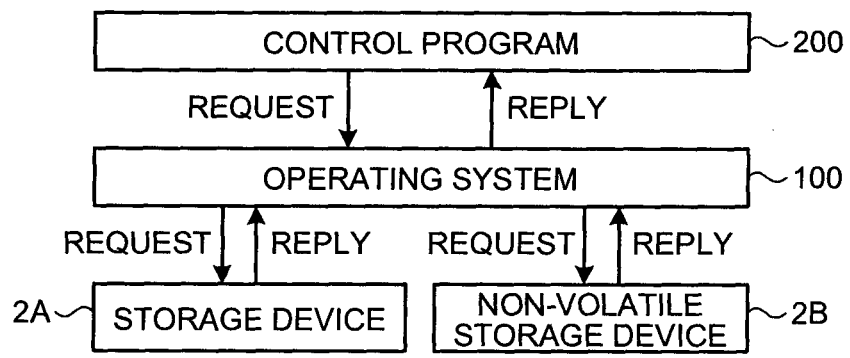
FIG. 13 is a block diagram illustrating an example of the hierarchical functional configuration of an information processing device.

FIG. 13 is a diagram illustrating a hierarchical structure at a software level of the information processing system 1. Various kinds of software such as the control program 200 loaded to the main memory 6 are normally not communicated directly with the non-volatile storage device 2A or the non-volatile storage device 2B, but are communicated with the non-volatile storage device 2A or the non-volatile storage device 2B via the OS 100 loaded to the main memory 6. When various kinds of software need to transmit a command such as a read request or a write request to the non-volatile storage device 2A, the various kinds of software transmit an access request of units of files to the OS 100. The OS 100 specifies the logical address (LEA) of the non-volatile storage device 2A or the non-volatile storage device 2B corresponding to a file for which the access request is made with reference to a file management table (an OS file system) embedded in the OS 100, converts the logical address into a corresponding interface-intrinsic command such as a 60h READ FPDMA QUEUED command and a 61h WRITE FPDMA QUEUED command described in ACS-2 of Non-Patent Document 1, and transmits the interface-intrinsic command to the non-volatile storage device 2A or the non-volatile storage device 2B.

When the OS 100 receives a reply from the non-volatile storage device 2A or the non-volatile storage device 2B, the OS 100 specifies for which software this reply is made and returns the reply to the specified software. Further, the control program 200 may be configured to directly access the LBA of the non-volatile storage device 2A or the non-volatile storage device 2B via the OS 100 without using the file management table of the OS 100 or may be configured to directly access the LBA of the non-volatile storage device 2A or the non-volatile storage device 2B without the path via the OS 100.

[Physical Configuration of Information Processing Device]

Figure 14:
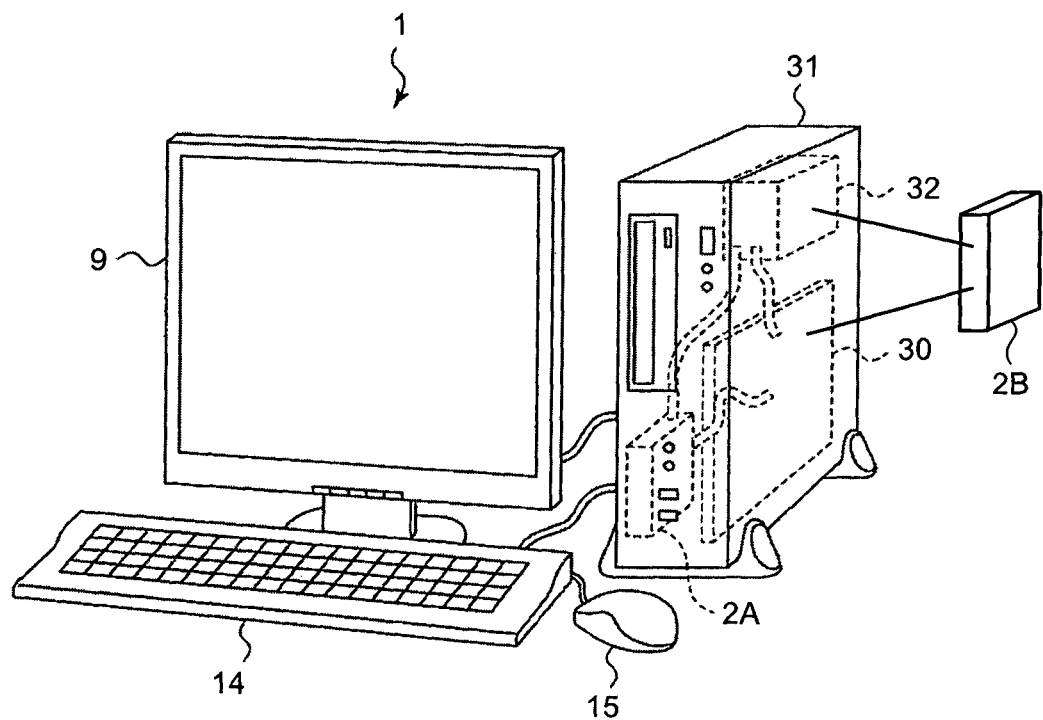
FIG. 14 is a diagram illustrating the outer appearance configuration of the information processing system.

Next, an example of the configuration of the information processing system 1 will be described. The information processing system 1 can be realized as, for example, a desktop computer or a notebook-type portable computer. FIG. 14 is a schematic diagram illustrating a desktop computer serving as the information processing system 1.

The desktop computer includes a computer body 31, a display 9, a keyboard 14, and a mouse 15. The computer body 31 includes a mother board 30 on which main hardware units are mounted, the non-volatile storage device 2A, and a power device 32. The non-volatile storage device 2A is connected physically to the main body 30 via a SATA cable and is connected electrically to a CPU 4 mounted on the same mother board 30 via a south bridge 7 mounted on the mother board 30. The power device 32 produces various kinds of power used in the desktop computer and supplies the power to the mother board 30, the non-volatile storage device 2A, and the like via power cables.

Figure 15:
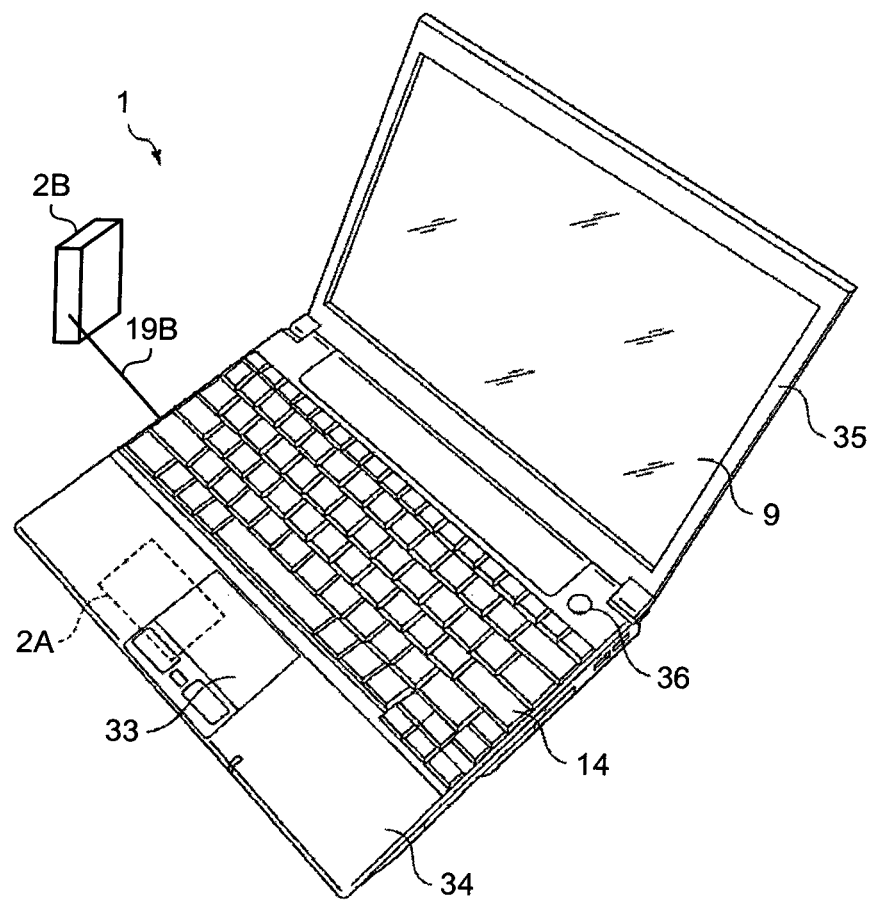
FIG. 15 is a diagram illustrating another outer appearance configuration of the information processing system.

FIG. 15 is a schematic diagram illustrating a portable computer serving as the information processing system 1. The portable computer includes a computer body 34 and a display unit 35. For example, a display device 9 including an LCD (Liquid Crystal Display) is embedded into the display unit 35. The display unit 35 is mounted to be rotatable between an opened position at which the upper surface of the computer body 34 is exposed and a closed position at which the upper surface of the body 34 is folded. The body 34 includes a thin box-type casing. A power switch 36, a keyboard 14, a touch pad 33, and the like are disposed on the upper surface. The body 34 includes the non-volatile storage device 2A, a mother board, and a power device, as in the desktop computer.

The information processing system 1 to which this embodiment is applied may be not only the information processing system described above but also an imaging device such as a still camera or a video camera, a tablet computer, a smartphone, a game device, a car navigation system, a storage drive duplicator, and the like.

In this embodiment, the non-volatile storage device 2B is used as a backup destination of the non-volatile storage device 2A as a backup source. While the reliability of the storage device 2A is not deteriorated, the non-volatile storage device 2B is preferably not connected to the information processing device 3 from the viewpoint of lightweight, power-saving, and space-saving of the information processing system 1. In this case, when the reliability of the non-volatile storage device 2A deteriorates, a message of "PLEASE CONNECT A BACKUP STORAGE DEVICE" is preferably displayed from the control program to a user through the display 9 so that the user can connect the backup non-volatile storage device 2B to the information processing device 3. For example, when the information processing system 1 is a desktop computer, the non-volatile storage device 2B may be connected to the mother board 30 via a SATA cable or an USB cable, for example, as illustrated in FIG. 14. The non-volatile storage device 2B may be installed inside the computer body 31. Further, when the information processing system 1 is a portable computer, the non-volatile storage device 2B may be connected to the computer body 34 via an SATA cable or a USB cable, for example, as illustrated in FIG. 15. In this case, from the viewpoint of easy attachment and detachment, the interface 19B is preferably an eSATA interface. The non-volatile storage device 2B may be installed inside the computer body 34. After the non-volatile storage device 2B is mounted, the control program 200 performs backup of user data from the non-volatile storage device 2A to the non-volatile storage device 2B.

Figure 16:
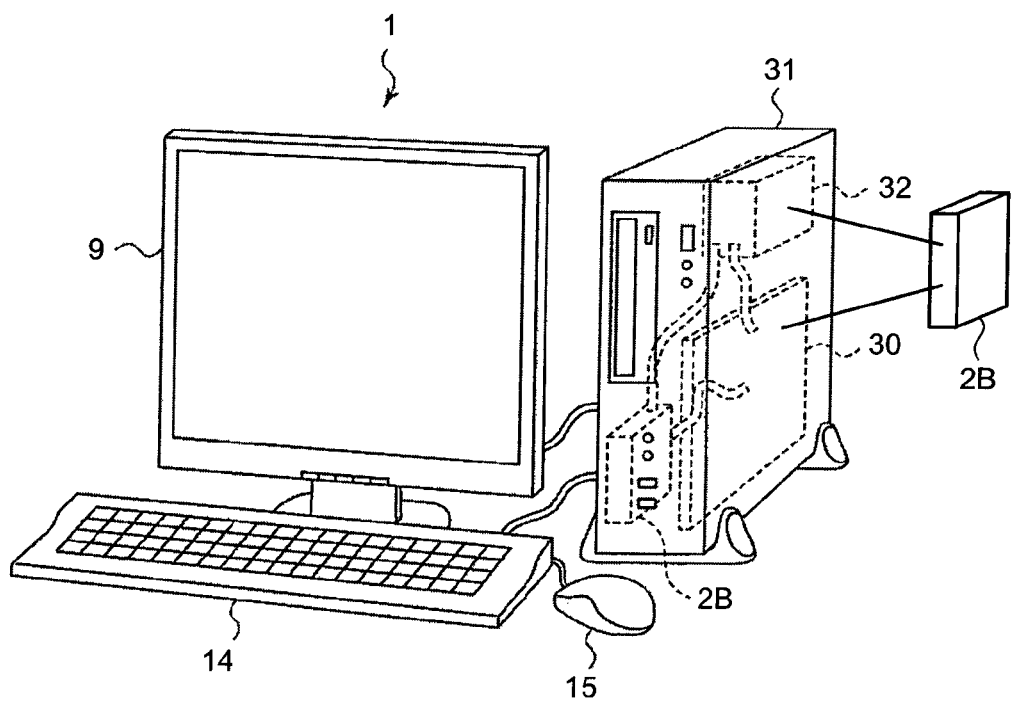
FIG. 16 is a diagram illustrating the outer appearance configuration of a information processing system.
Figure 17:
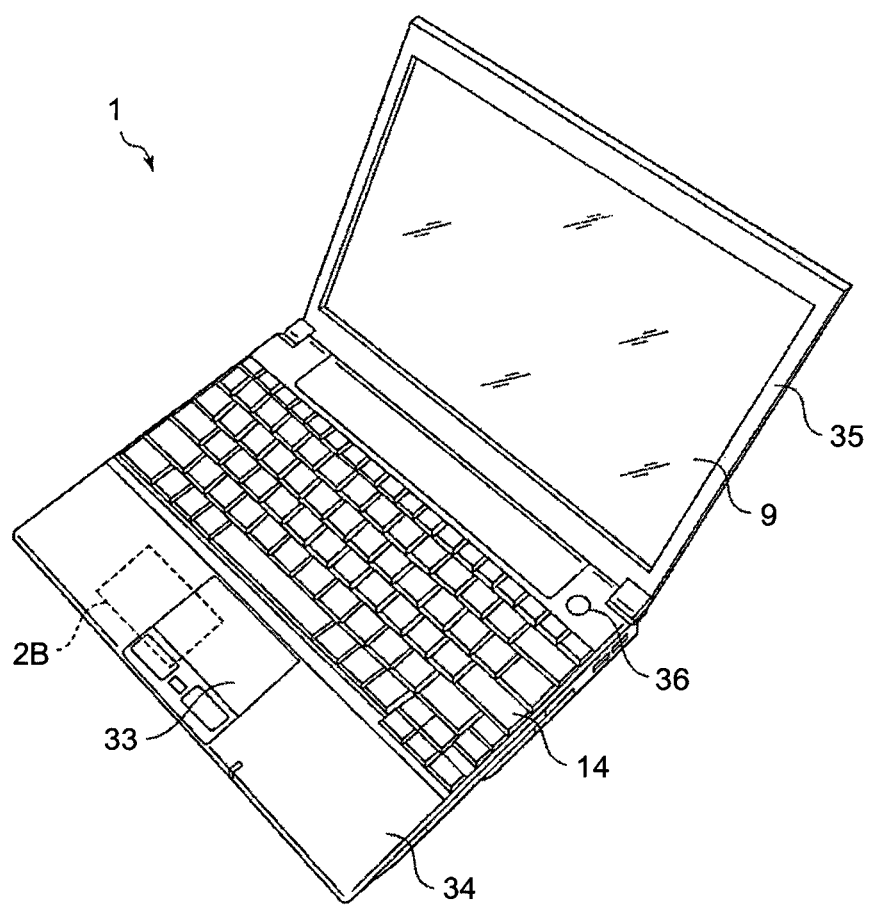
FIG. 17 is a diagram illustrating another outer appearance configuration of the information processing system.

When the backup of the data by the control program 200 ends, as illustrated in FIGS. 16 and 17, it is preferable to detach the non-volatile storage device 2A from the information processing system 1, mount the non-volatile storage device 2B to the mounted position of the non-volatile storage device 2A, and substitute the non-volatile storage device 2A with the non-volatile storage device 2B from the viewpoint of power-saving, lightweight, and space-saving of the information processing system 1.

[Backup Process]

Figure 18:
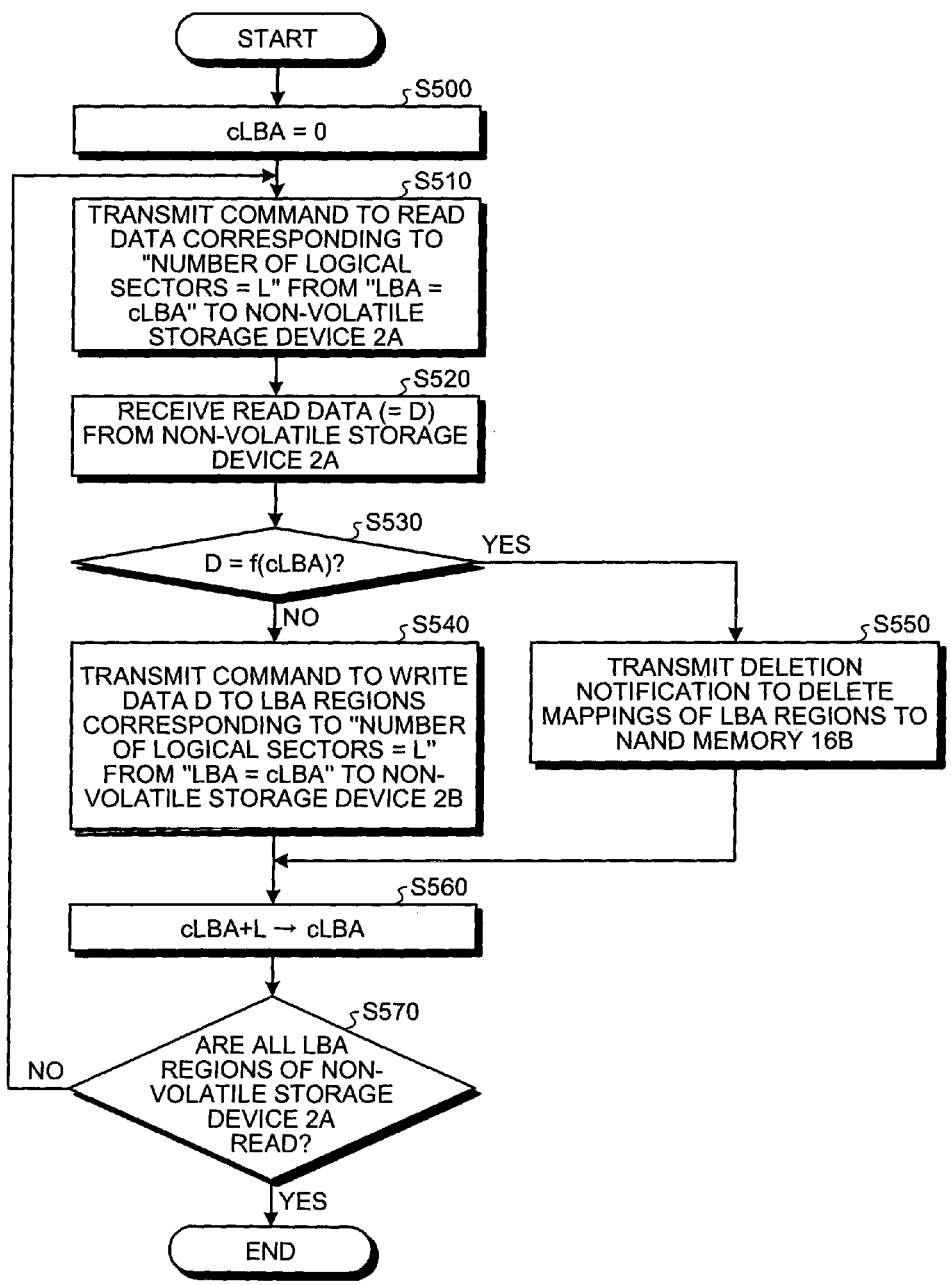
FIG. 18 is a flowchart illustrating a processing order of backup by a control program according to the first embodiment.

FIG. 18 is a flowchart illustrating a processing flow of a backup process by the control program 200. The control program 200 is loaded to the control program area 6B by CPU 4 and functions of the control program 200 are processed by CPU 4. The control program 200 is a program that has a backup function of data from the non-volatile storage device 2A to the non-volatile storage device 2B. The backup function of the control program 200 may be started manually by a user through the keyboard 14 or the mouse 15 or may be started automatically by the CPU 4. In the flow illustrated in FIG. 18, the backup target LBA region is divided into small regions with a length L and a subroutine of the backup process for each small region is performed. A cLBA which is a pointer of the LBA can be used for reference of the small region, and the data of all the LBA regions are backed up by incrementing the cLBA by L from 0. The length L of the small region is an integer equal to or greater than 1.

When the backup function is started, the control program 200 sets the cLBA which is a pointer of the data copy target LBA to zero (step S500). The control program 200 transmits a command to read data of a LBA region starting from cLBA of the length L to the non-volatile storage device 2A (step S510). For example, a 60h READ FPDMA QUEUED command, a 25h READ DMA EXT command, or the like described in ACS-2 of Non-Patent Document 1 is used as the read command. The storage device 2A receiving the read command transmits read data (D) of the LBA region to the information processing device 3 and the information processing device 3 receives the data D (step S520). The control program 200 compares the data D to output data of a function f(cLBA) stored in the main memory 6 (step S530). The function f( ) in the main memory 6 is identical with the function f( ) stored in the non-volatile storage device 2B. In this embodiment, the CPU 4 loads the function f( ) from the non-volatile storage device 2B to the main memory 6 when the CPU 4 loads the control tool 200. The process is branched into a case in which the data D is not identical with the output data of the function f(cLBA) (No in step S530) and a case in which the data D is identical with the output data of the function f(cLBA) (Yes in step S530).

When D is not identical with the output data of the f(cLBA) (No in step S530), the control program 200 transmits the command to write the data D to the LBA regions starting from cLBA of the length L to the non-volatile storage device 2B, the control program 200 transmits the data D to the non-volatile storage device 2B, and the SSDC 41B writes the data D in the NAND memory 16B (step S540). For example, a 61h WRITE FPDMA QUEUED command, a 35h WRITE DMA EXT command, or the like described in ACS-2 of Non-Patent Document 1 is used as the write command.

When D is identical with the output data of the f(cLBA) (Yes in step S530), the control program 200 transmits a deletion notification to unmap the LBA regions starting from cLBA of the length L to the non-volatile storage device 2B. The SSDC 41B of the non-volatile storage device 2B changes the management information 46B to delete (invalidate) mappings of the LBA regions to the NAND memory 45B so that the data of the LBA regions becomes the device-invalid data (step S550). For example, a 06h DATA SET MANAGEMENT command or an SCT command described in ACS-2 of Non-Patent Document 1, Deallocate (AD) of an 11h Dataset Management command described in NVM Express Revision 1.1, or the like is used as a deletion notification command.

When step S540 or step S550 is completed, the control program 200 increases the cLBA by L (step S560) and the subroutines of step S500 to step S550 are performed on all of the small regions. When the cLBAs exceed the maximum accessible LBAs of the non-volatile storage device 2B, the reading of all the LBA regions is assumed to be completed (Yes in step S570), and thus the backup process is completed.

When the control program 200 finishes the backup process, the control program 200 preferably forces the non-volatile storage device 2B to transit to a standby state, for example, by issuing a standby state and sleep state transition command such as an E0h Standby Immediate command or an E6h SLEEP command described in ACS-2 of Non-Patent Document 1 to the non-volatile storage device 2B. As a result, the data written to the non-volatile storage device 2B in step S540 is reliably stored in the NAND-type flash memory and the latest management information 46B changed by the deletion notification process in step S550 is reliably stored in the NAND-type flash memory so that data loss is prevented when the non-volatile storage device 2B is shut down unintentionally. The power consumption of the information processing system 1 is saved after the non-volatile storage device 2B transit to the standby state. The control program 200 may issue a flush cache command such as an E7h FLUSH CACHE command or an EAh FLUSH CACHE EXT command described in ACS-2 of Non-Patent Document 1 to the non-volatile storage device 2B to save and store the management information 46B of the RAM 40B and the data of the CM 44B in the NAND-type flash memory 16B.

When the control program 200 finishes the backup process, the control program 200 may forces the storage device 2A to transit to a power saving mode in order to save the power consumption of the information processing system 1. For example, the control program may issue an E0h Standby Immediate command, an E6h SLEEP command, or the like described in Information technology ATA/ATAPI Command Set-3 (ACS-3) to the storage device 2A. For example, the control program 200 may shut down a power supply to the non-volatile storage device 2A. For example, the control program 200 may force the non-volatile storage device 2A to transit to a Partial state or a Slumber state described in Serial ATA Revision 3.1 Gold Revision. For example, the control program 200 may force the non-volatile storage device 2A to transit to a DevSleep state by activating a DEVSLP signal described in "Serial ATA Technical Proposal: SATA31_TPR_C 108 Title: Device Sleep." For example, the control tool 200 may force the non-volatile storage device 2A to transit to a D1 state, a D2 state, or a D3 state described in PCI Express Base Specification Revision 3.0. For example, the control tool 200 may force the non-volatile storage device 2A to transit to an L1 state, an L2 state, and an L3 state described in PCI Express Base Specification Revision 3.0.

As described above, the deletion notification process on the non-volatile storage device 2B can be performed at higher speed than the writing process to the non-volatile storage device 2B. Further, the writing process to the non-volatile storage device 2B consumes free blocks generally, but the deletion notification process on the non-volatile storage device 2B rarely consumes free blocks. Therefore, the processing speed of the non-volatile storage device 2B is improved by this embodiment. Further, NAND memory blocks are erased by the writing process to the non-volatile storage device 2B generally, and thus reliability of the NAND memory deteriorates. However, since a process of deleting the NAND memory block is rarely performed in the deletion notification process on the non-volatile storage device 2B, the deterioration in the reliability of the NAND memory can be reduced by this embodiment.

In a comparison example, since the writing process of step S540 is performed to every LBA region of the backup destination target, the backup speed is low, the process speed of the non-volatile storage device 2B deteriorates, and reliability of the NAND memory 16B deteriorates. On the other hand, when the backup is performed using the control tool 200 according to this embodiment, not step S540 but step S550 is performed on data identical with the output data of the function f(LBA). Therefore, the backup can be performed at high speed compared to the backup system of the comparison example, the deterioration of the process speed of the non-volatile storage device 2B can be suppressed, and thus the deterioration in the reliability of the NAND memory 16B can be suppressed.

In this embodiment, a SSD is used as the non-volatile storage device 2B, but another non-volatile storage device such as a hard disk drive (HDD) and a hybrid HDD may be used as the non-volatile storage device 2B. For example, when an HDD is used as the non-volatile storage device 2B, the amount of writing to the non-volatile storage device 2B is reduced in step S550, and thus the deterioration in the reliability of the non-volatile storage device 2B is reduced. Thus, an amount of data transmitted from the information processing device 3 to the non-volatile storage device 2B decreases, and the backup process is performed at high speed.

In this embodiment, a SSD is used as the non-volatile storage device 2A, but another storage device such as a HDD, a hybrid HDD, a volatile RAM and the like may be used as the storage device 2A.

In this embodiment, the case in which all of the LBAs of the non-volatile storage device 2A are backed up has been described. However, the backup target LBA regions may be limited to some of all the LBA regions.

In this embodiment, different storage devices are used as the non-volatile storage device 2A which is a backup source and the non-volatile storage device 2B which is a backup destination. However, the non-volatile storage device 2A which is a backup source and the non-volatile storage device 2B which is a backup destination may be the same SSD (2A=2B). That is, for example, an SSD is partitioned into two partitions, a partition A (starting LBA=0) and a partition B (starting LBA=X), and the control program 200 may perform the backup process from the partition A to the partition B. In this case, for example, the backup process may be performed between a backup source LBA regions starting from cLBA and a backup destination LBA regions starting from X+cLBA.

Second Embodiment

Figure 19:
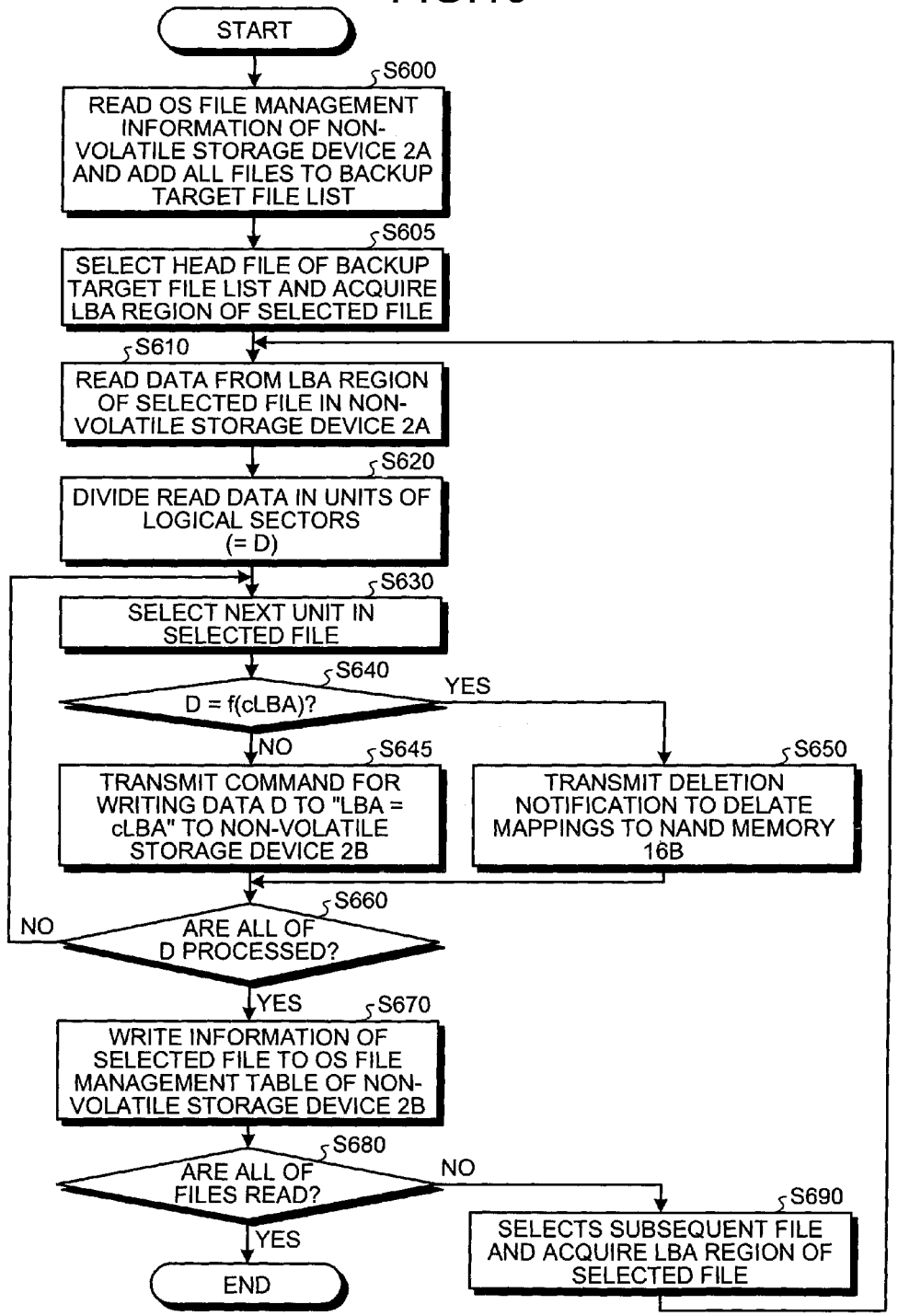
FIG. 19 is a flowchart illustrating a processing order of backup by a control program according to a second embodiment.

In the first embodiment, the case has been described in which the backup process is performed on each logical partition of a fixed sector length L as an unit of the backup process. The backup process may be performed on each partition of a variable length. For example, units of files managed on the OS 100 may be used as the unit of the backup process. FIG. 19 is a flowchart illustrating an example of a process of a control tool 200 according to a second embodiment.

The control program 200 reads an OS file management table (metadata, an OS file system) stored in a NAND memory 16A in a non-volatile storage device 2A which is a backup source and stores all information of the files which are stored in the non-volatile storage device 2A in a main memory 6 as a backup target list (step S600). The backup target list may not be all of the files of the non-volatile storage device 2A, but may be part of the files. The control program 200 searches information of LBA regions in which the data of each file in the backup target list (step S605). The control program 200 reads data of the LBA regions from the non-volatile storage device 2A which is a backup source (step S610). For example, a 60h READ FPDMA QUEUED command, a 25h READ DMA EXT command, or the like described in ACS-2 of Non-Patent Document 1 is used as the reading command.

The read data of the file is preferably divided to data D in logical units before determining the data read in step S610 (step S620). The logical unit may be a logical sector or may be a plurality of logical sectors. The control program 200 processes the step S630-660 on each logical unit in the file. cLBA is used as a pointer of a selected logical unit, is equal to the starting LBA of the LBA regions initially and is incremented when the step S630 is processed after step S660. The control program 200 selects one a logical unit starting from cLBA (step S630) and determines whether the data D is identical with output data from a function f(cLBA) (step S640). When the data D is not identical with output from the function f(cLBA), the control program 200 writes the data D in the non-volatile storage device 2B which is the backup destination by using a write command such as a 61h WRITE FPDMA QUEUED command, a 35h WRITE DMA EXT command, or the like described in ACS-2 of Non-Patent Document 1 (step S645). When the data D is identical with the output data from the function f(LBA), the control program 200 doesn't transmit the write command to the non-volatile storage device 2B which is a backup destination and transmits a deletion notification command to delete mappings of the logical unit to the NAND memory 16B (step S650). For example, a 06h DATA SET MANAGEMENT command or an SCT command described in ACS-2 of Non-Patent Document 1, Deallocate (AD) of an 11h Dataset Management command described in NVM Express Revision 1.1, or the like may used as the deletion notification command. The control program 200 repeats the processes of step S630 to step S650 on all of the logical units.

The control program 200 may change the OS file management table (metadata) in the non-volatile storage device 2B to update the information of the selected file to which is a backup destination so that the backed-up file can be recognized by the OS 6A. The control program 200 determines whether the control program 200 finished the processing of all of the files (step S680). When the control program 200 did not finish all of the files, the control program 200 selects a next file, gets the LBA information of the selected file (step S690), and moves to the process to step S610. When the control program 200 finished all of the files, the process thus ends. In this embodiment, the case in which all of the files of the non-volatile storage device 2A are backed up has been described. However, the backup target files may be limited to part of the files among all of the files.

Thus, in the second embodiment, the data of the backup source is read and the writing is performed in units of files of a variable data size. In this embodiment, the processes of the reading, the writing, and the deletion notification can be skipped on LBA regions in which no file data is stored. Accordingly, the backup process can be performed at higher speed.

Third Embodiment

In the first and second embodiments, the backup process is performed using the function f(LBA) in the control program 200. The SSDC 41B of the non-volatile storage device 2B which is a backup destination restores data of LBA region to be read by calculating a function f(LBA) in the non-volatile storage device 2B and transmits the restored data to the information processing device 3 when the data after the backup is read.

In a third embodiment, a method of implementing the function f(LBA) will be described at the time of design of the control program 200, at the time of design of a product, before factory shipment, or after factory shipment. In particular, when an OS or a system configuration to be installed in an SSD is determined, the function f(LBA) optimum for the system is preferably configured at the time of design of the control program 200, at the time of design of a product, or before factory shipment. For example, the function f(LBA) may be stored as table data mapping LBA to data in the SSDC 41B, the NAND memory 16B, or the RAM 40B of the storage device 2B or the main memory 6 of the information processing device 3. For example, the function f(LBA) may be implemented as software data or firmware data realized by realizing the function f(LBA) as an algorithm in the SSDC 41B, the NAND memory 16B, or the RAM 40B of the storage device 2B or the main memory 6 of the information processing device 3. For example, the function f(LBA) may be embedded on the SSDC 41B of the storage device 2B as an electronic circuit realized by using the function f(LBA) as an algorithm.

Alternatively, for example, the output data from function f(LBA) may be stored as information of the function f(LBA) in a storage unit as a trim data storage unit in the nonvolatile storage device 3. The trim data storage unit may be a NAND-type flash memory and a RAM. In this case, when the SSDC 41B receives a deletion notification from the information processing device 3, the SSDC 41B changes the management information 46B to delete mappings of LBA regions specified by the deletion notification to the NAND memory 16B, and the SSDC 41B changes the management information 46B to map the LBA regions to the trim data storage unit. When the information processing device sends a read command to read data from the LBA regions to the non-volatile storage device 2B, the SSDC 41B reads the management information 46B, reads data from the trim storage unit mapped from the LBA regions and sends the read data to the information processing device 3.

When the function f(LBA) is stored in the NAND memory 16B of the storage device 2B and the control program 200 of the main memory 6 of the information processing device 3, the function f(LBA) in the control program 200 is required to be the same as the function f(LBA) in the non-volatile storage device 2B. For example, the control program 200 and the non-volatile storage device 2B may be designed using the same function f(LBA) individually. Alternatively, for example, the latest information of the function f(LBA) may be stored only in the non-volatile storage device 2B. In this case, the control program 200 loads information of the function f(LBA) from the non-volatile storage device 2B to the main memory 6. When an initial function f(LBA) or a prior function f(LBA) is stored in the main memory 6, the control program 200 overrides the initial or prior function f(LBA) with the loaded function f(LBA) in the main memory 6. Conversely, the SSDC 41B may load information of the function f(LBA) from the control program 200 to the NAND-type flash memory 16B or the RAM 40B and may override a prior function f(LBA) with the loaded function f(LBA).

FIG. 20 is a diagram illustrating an example of logical addresses and data. The logical address region of an SSD is specified using the logical address (LBA) by the information processing device 3. In the logical address, one logical sector is the minimum management unit and one logical sector has, for example, 512 bytes. In FIG. 20, logical addresses (0000h, 0001h, 0002h, . . . , ba02h, . . . ) are assigned to each sector. "h" suffixed to numbers indicates that the numbers are expressed in hexadecimal.

Figure 21:
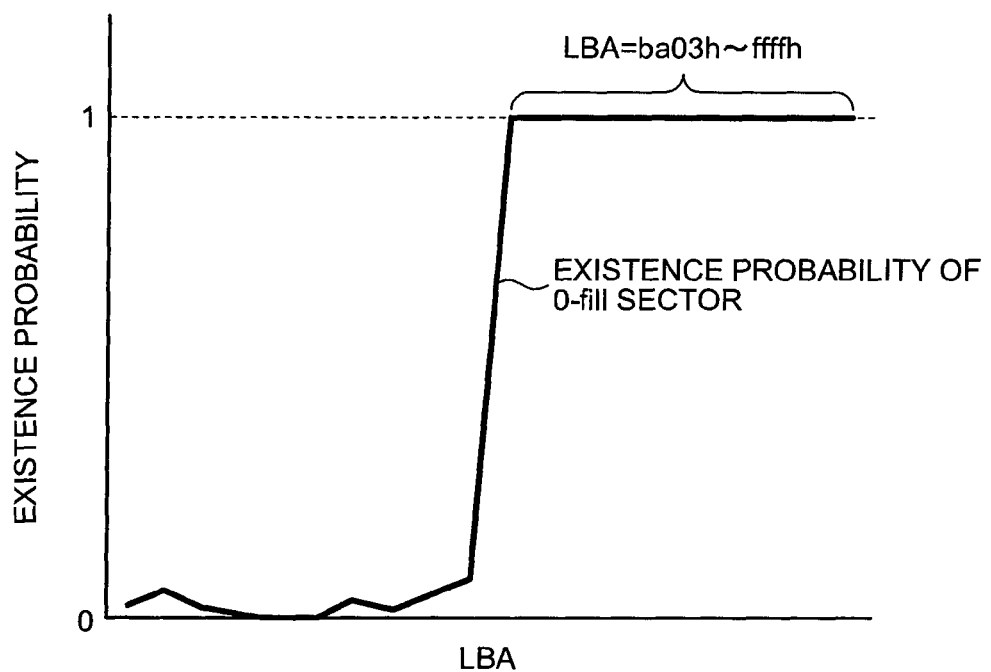
FIG. 21 is a diagram illustrating an example of an existence probability distribution of 0-fill sectors in the case of the data in FIG. 20.

In the example of FIG. 20, a f(LBA) is configured assuming (simulating) a typical data model that an end user may back up. A designer of the non-volatile storage device 2B and the control program 200 can calculate an existence probability distribution (a histogram) of a 0-fill sector illustrated in FIG. 21 by analyzing data of all of the logical addresses based on a model that represents typical user data in a typical use environment, and comparing the data of the logical addresses to the 0-fill sector when he or she designs the non-volatile storage device 2B and the control program 200. An exact ratio of the 0-fill sector can be calculated by dividing the total count of the sectors which are identical with 0-fill sector by a total LBA capacity of all the logical address regions at the time of the comparison. When "the function f(LBA)=000 . . . 0h (a fixed value and 0 is repeated by 512 bytes)" is configured, free blocks can be saved by unmapping LBA regions of the total sector count size of logical sectors which are the 0-fill sector at maximum at the time of backup. In this case, for example, information of the function f(LBA) may be stored as data 000 . . . 0h of 512 bytes, table data mapping all of the LBAs to data 000 . . . 0h of 512 bytes, or software data or firmware data realized as an algorithm generating data 000 . . . 0h of 512 bytes for all of the LBAs in the SSDC 41B, the NAND memory 16B, or the RAM 40B of the storage device 2B or the main memory 6 of the information processing device 3.

Figure 23:
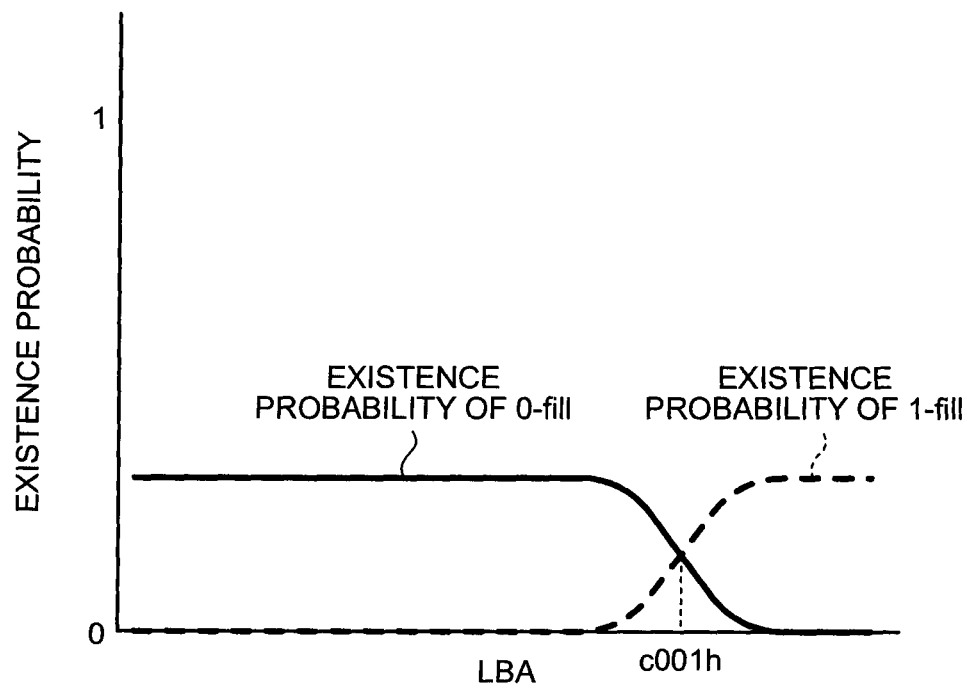
FIG. 23 is a diagram illustrating an example of an existence probability distribution of 0-fill sectors and 1-fill sectors in the case of the data in FIG. 22.

FIG. 22 is a diagram illustrating an example in which the function f(LBA) does not output a constant fixed value. Typical data pattern which is used frequently may be different depending on logical address regions in some cases, as in a case in which a given data pattern is frequently used in given logical address regions and another data pattern is frequently used in other given logical address regions. As illustrated in FIG. 22, a case is considered that 0-fill data is frequently used in the first half of the logical address regions and 1-fill data (data in which all bits are "1" and data filled with Fh when expressed in hexadecimal) is frequently used in the second half of the logical address regions. The existence probability distribution of the 0-fill sectors and the existence probability distribution of the 1-fill sectors are illustrated in FIG. 23. In this case, the function f(LBA) preferably outputs different values in two logical address regions, as in "the function f(LBA)=000 . . . 0h (where LBA≤c000h) and the function f(LBA)=fff . . . fh (where LBA>c000h)" rather than "the function f(LBA)=000 . . . 0h (fixed value)" and "the function f(LBA)=fff . . . fh (fixed value)." As a result, the number of free blocks after the backup is saved. In this case, for example, the function f(LBA) is stored as table data which maps LBAs less than c000h to data 000 . . . 0h of 512 bytes and maps LBAs equal to or greater than c000h to data fff . . . fh in the SSDC 41B, the NAND memory 16B, or the RAM 40B of the storage device 2B or the main memory 6 of the information processing device 3. The function f(LBA) may be stored as an algorithm, software data or firmware data which generate data 000 . . . 0h of 512 bytes to LBAs less than c000h and generates data fff . . . fh of 512 bytes to LBAs equal to or greater than c000h in the SSDC 41B, the NAND memory 16B, or the RAM 40B of the storage device 2B or the main memory 6 of the information processing device 3.

Figure 25:
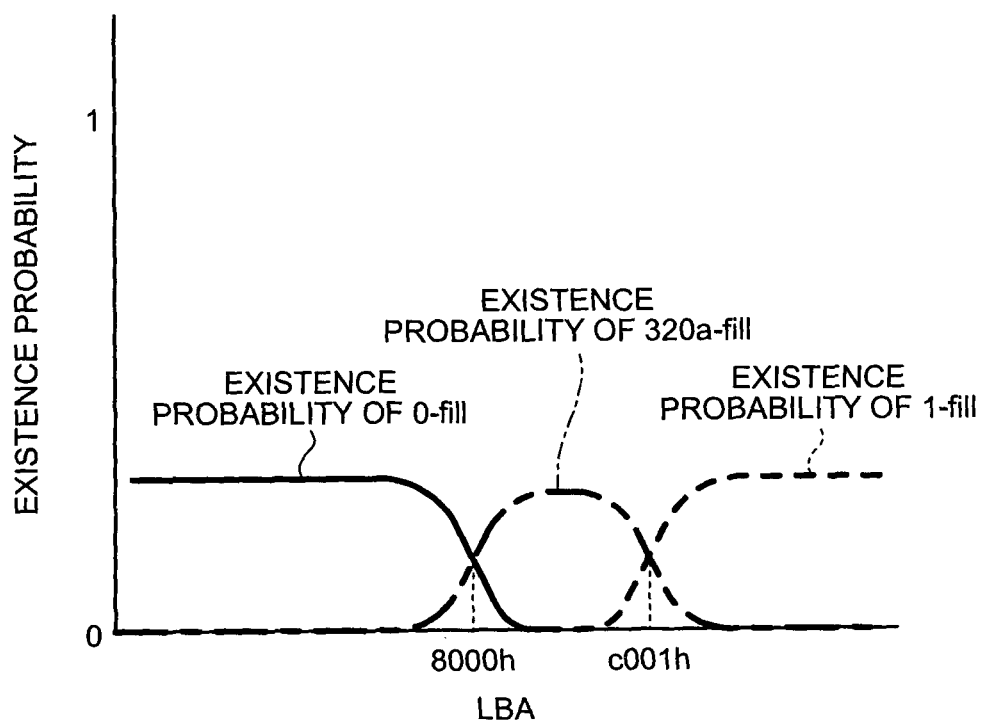
FIG. 25 is a diagram illustrating an example of an existence probability distribution of 0-fill sectors, 320a-fill sectors, and 1-fill sectors in the case of the data in FIG. 24.

FIG. 24 is a diagram illustrating a case in which data frequently used in three logical address regions are different. FIG. 25 illustrates an existence probability distribution of 0-fill sectors, an existence probability distribution of 320a-fill sector (data with one sector length filled with repeating 320a data), and an existence probability distribution of 1-fill sector. In this case, for example, the function f(LBA) is preferably configured to have different values in three logical address regions, as in "the function f (LBA)=000 . . . 0h (where LBA≤7fffh), the function f(LBA)=320a320a . . . 320ah (where 8000h≤LBA≤c000h), and the function f (LBA)=fff . . . fh (where LBA≥c001h)". As a result, the number of free blocks after the backup is saved. In this case, for example, the function f(LBA) is stored as table data which maps LBAs in a range of "LBA≤7fffh" to data 000 . . . 0h of 512 bytes, maps LBAs in a range of "8000h≤LBA≤c000h" to data 320a320a . . . 320ah of 512 bytes and maps LBAs in a range of "LBA≥c001h" to data fff . . . fh of 512 bytes in the SSDC 41B, the NAND memory 16B, or the RAM 40B of the storage device 2B or the main memory 6 of the information processing device 3. The function f(LBA) may be stored as an algorithm, software data or firmware data which generate data 000 . . . 0h of 512 bytes to LBAs in the range of "LBA≤7fffh", generate data 320a320a . . . 320ah of 512 bytes to LBAs in the range of "8000h≤LBA≤c000h" and generate data fff . . . fh of 512 bytes to LBAs in the range of "LBA≥c001h" in the SSDC 41B, the NAND memory 16B, or the RAM 40B of the storage device 2B or the main memory 6 of the information processing device 3.

The function f(LBA) may be configured to have different values in each management unit obtained by dividing the logical address region for each size L. The size L is preferably equal to or greater than the minimum unit of an LBA. The function f(LBA) output a fixed data in the management unit, but functions f(LBA) may output different data between the different management units. For example, the function f(LBA) outputs D0 (fixed value) in a first region of the management unit, the function f(LBA) outputs D1 (fixed value) in a second region of the management unit, and the like. In this case, the function f(LBA) is expressed as follows.

"$f(LBA)=D0$ (where $0 \leq LBA \leq L-1$), $f(LBA)=D1$ (where $L \leq LBA \leq 2L-1$), $f(LBA)=D2$ (where $2L \leq LBA \leq 3L-1$, . . . ,$Dk$ (where $kL \leq LBA \leq (k+1)L-1$), . . . . "

Dk (where k=0, 1, . . . ) may be any fixed data of a size L such as 8d892a8fd91423 . . . 987ah and 0123456789abcdef0123 . . . defh. In this case, for example, the function f(LBA) may be stored as table data mapping LBAs in a range of "kL≤LBA≤(k+1)L−1" to data Dk of 512 bytes for each k=0, 1, . . . in the SSDC 41B, the NAND memory 16B, or the RAM 40B of the storage device 2B or the main memory 6 of the information processing device 3. Alternatively, for example, the function f(LBA) may be stored as an algorithm, software data or firmware data which generates data Dk of 512 bytes to LBAs in the range of "kL≤LBA≤(k+1)L−1" for each k=0, 1, . . . in the SSDC 41B, the NAND memory 16B, or the RAM 40B of the storage device 2B or the main memory 6 of the information processing device 3.

Dk may be configured arbitrary for each k=0, 1, . . . . An optimum function f(LBA) is preferably configured by selecting optimum Dk. For example, a designer of the non-volatile storage device 2B and the control program 200 may select the most optimized function f(LBA) besed on scores of various candidates of Dk. The scores are calculated by the following method applied to a typical user data model in which an end user may performs backup.

(1) The designers read data of each sector of the model (or data of multiple of sectors of the model or data of each management unit of the model).

(2) The designers determine whether the data read in (1) is identical with data output from the function f(LBA) (when the data is read for each integer multiple of the sectors, the designers determines whether all of the sectors in the data are identical with the data output from the function f(LBA)).

(3) When the data is identical with the output data from the function f(LBA), the designers increments the score of the function f(LBA) by 1. When the data is not identical with the output data from the function f(LBA), the designers don't increment the score of the function f(LBA).

(4) The designers calculates the score for all of the logical address regions of the SSD, and the score is calculated (or representatively only some of the logical address regions may be graded).

Then, the designers can select the best Dk with the highest score is set as the optimum Dk and the optimum function f(LBA) is configured using the Dk. For example, when "L=128 MiB (where MiB=1,048,576 bytes)" wherein all of the logical address regions of the SSD are partitioned by 128 MiB length equally from LBA=0, the designers read each partition and determines whether the data of each partition is identical with output data from the function f(LBA). When the data is identical with the function f(LBA), the designers increment the score of the f(LBA). For example, the designers may calculate the scores of plural candidates of Dk arrays such as "(D0, D1, . . . )=(0000 . . . h, 0000 . . . h, . . . ), (ffff . . . h, ffff . . . h, . . . ), (ffff . . . h, 0000 . . . h, . . . ), (0000 . . . h, ffff . . . h, . . . )," select the best candidate with the highest score as an optimum (D0, D1, . . . ), and configure the optimum function f(LBA) with the optimum (D0, D1, . . . ). The optimum Dk array (where k=0, 1, . . . ) as information of the optimum function f(LBA) is preferably stored in the SSDC 41B, the RAM 40B, or the NAND memory 16B. The optimum Dk array (where k=0, 1, . . . ) may not be stored in the control program 200 nonvolatilely, and the control program 200 may read the Dk array from the non-volatile storage device 2B to the main memory 6 when needed. For example, an ECh IDENTIFY DEVICE command described in ACS-2 of Non-Patent Document 1 may be used to read the optimum Dk array, and the SSDC 41B may output IDENTIFY DEVICE data where the optimum Dk array is stored in a Word129 field assigned to a Vendor Specific field.

The partition may be obtained by dividing the logical address regions by a variable length and may be used as the management unit. In this case, the function f(LBA) is expressed as follows.

"$f(LBA)=D0$ (where $L0=0 \le LBA \le L1-1$), $f(LBA)=D1$ (where $L1 \le LBA \le L2-1$), $f(LBA)=D2$ (where $L2 \le LBA \le L3-1$, . . . ,Dk (where $Lk \le LBA \le L(k+1)-1$), . . . ."

Dk (where k=0, 1, . . . ) is any data pattern with a size L. "$L0<L1<L2< \ldots Lk< \ldots$" is satisfied. In this case, the function f(LBA) is stored as table data mapping LBAs in a range of "$Lk \le LBA \le L(k+1)-1$" to data Dk of 512 bytes for each k=0, 1, . . . in the SSDC 41B, the NAND memory 16B, or the RAM 40B of the storage device 2B or the main memory 6 of the information processing device 3. Alternatively, for example, the function f(LBA) is stored as an algorithm, software data or firmware data which generate data Dk of 512 bytes to LBAs in the range of "$Lk \le LBA \le L(k+1)-1$" for each k=0, 1, . . . in the SSDC 41B, the NAND memory 16B, or the RAM 40B of the storage device 2B or the main memory 6 of the information processing device 3.

Figure 27:
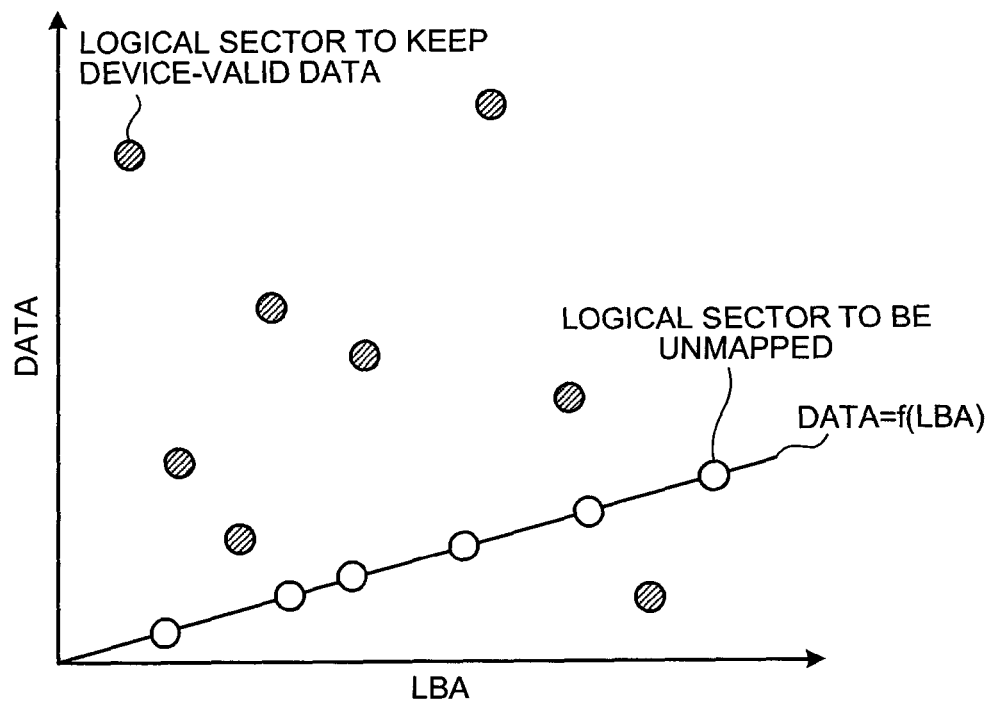
FIG. 27 is a diagram illustrating opened sectors in the case of the data in FIG. 26.

FIG. 26 illustrates a case in which the function f(LBA) may not be optimized sufficiently because there are not so many logical sectors filled with the fixed data is small. In this case, the function which outputs fixed data to partitions obtained by dividing the logical address regions by a fixed length or a variable length may not be the most optimized function. In this case, data and LBAs have correlation relationship and the designers preferably select an optimum function f(LBA) among more general candidates of the functions f(LBA). For example, the designers prepare candidates of a plurality of functions f(LBA) in advance, calculate the score of each candidate applied to a typical user data model in which typical end users perform backup, and select a function f(LBA) with the highest score as an optimum function f(LBA). In this case, as illustrated in FIG. 27, the logical sectors in which the data and the LBA have the constant correlation are unmapped by the backup process with the optimum function f(LBA).

Figure 28:
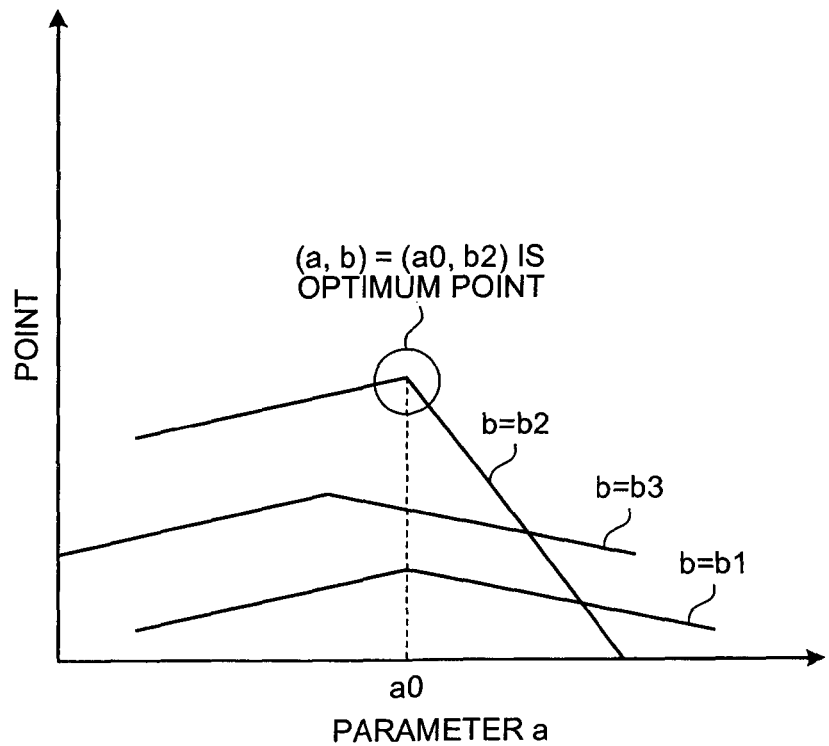
FIG. 28 is a diagram illustrating a method of determining a function f(LBA)

For example, the designers may configure candidates defined by "function f(LBA)=a×LBA+b" having different values of a and b. The designers calculate the score of each parameter set (a, b) based on the general user data model in which an end user performs backup, select the best (a,b) with the highest score among the candidates and configure an optimized function f(LBA) with the best (a, b). FIG. 28 is diagram illustrating a method of selecting the optimum function f(LBA). FIG. 28 illustrates candidates whose parameter b is b1, b2, and b3 respectively and whose parameter a is arbitrary values such as a0. In this case, the score of "(a, b)=(a0, b2)" is the highest. Accordingly, the designers can select a "function f(LBA)=a0×LBA+b2" as an optimized function. For example, the function f(LBA) may be stored as an algorithm, software data or firmware data in which the function f(LBA) is implemented in the SSDC 41B, the NAND memory 16B, or the RAM 40B of the storage device 2B or the main memory 6 of the information processing device 3.

When 48-bit Address feature set described in ACS-2 is supported by SSDC 41B, the function f(LBA) may be configured with matrix operations such as "function f(LBA)=A×LBA+b" where in the LBA is a vector array of 48 columns such as "LBA=(d0, d1, d2, d47)$^t$" (where t is a transposition sign), A is a matrix array of 512×48, b a vector array of 4096 columns (where 1 sector=512 bytes=4096 bits) so that output data from the function f(LBA) is calculated in a vector format of 4096 columns. In this case, for example, the 1st element of the output vector array from f(LBA) represents the 1st bit of the output data, the 2nd thereof represents the 2nd bit of the output data, and the like. More generally, when the LBA comprises n bits, the function f(LBA) may be configured with matrix operations such as "function f(LBA)=A×LBA+b" wherein the LBA is a vector array of n columns such as "LBA=(d0, d1, d2, dn−1)t", A is matrix array of n×m, b is a vector array of m columns. In this case, for example, the function f(LBA) may be stored as array data comprising the matrix A array and the vector b array in the SSDC 41B, the NAND memory 16B, or the RAM 40B of the storage device 2B or the main memory 6 of the information processing device 3. The function f(LBA) may be stored as an algorithm, software data or firmware data in the SSDC 41B, the NAND memory 16B, or the RAM 40B of the storage device 2B or the main memory 6 of the information processing device 3.

In this embodiment, the case in which output data from the function f(LBA) depends on only LBA as an independent variable or the case in which output data from the function f(LBA) is fixed data which does not depend on LBAs has been described. However, the function f may depend on a variable other than the LBA. For example, a function f(LBA, X) may be configured to have two independent variables of the LBA and a parameter X which is specified by the SSDC 41B, or a function f(LBA, Y) may be configured to have two independent variables of the LBA and a parameter Y which is specified by the information processing device 3.

Fourth Embodiment

When output from the function f(LBA) is a fixed data (=Q) which doesn't depend on LBAs, data Q may be stored only in the NAND memory 16B, the SSDC 41B, or the RAM 40B of the non-volatile storage device 2B which is a backup destination and may not be stored in the control program 200. In a fourth embodiment, the control program 200 retrieves the fixed data Q from the non-volatile storage device 2B before the control program 200 compares read data to "f(LBA)=Q" in step S530 of FIG. 18 or step S640 of FIG. 19. For example, an ECh IDENTITY DEVICE command described in ACS-2 of Non-Patent Document 1 may be used as the method of retrieving the fixed data Q from the non-volatile storage device 2B. For example, the data Q may be calculated from data R of a Word129 field assigned as a Vendor Specific field in Identify Device output data of the ECh IDENTITY DEVICE command. In this case, the data R of 2 byte length in Word129 and the control program 200 generates the Q of 512 byte length filled with the data R repeating 256 times as the following:

Q=RRRR . . . R (R is repeated 256 times in series). The data R as information of the function f(LBA) is stored in, for example, the SSDC 41B, the NAND memory 16B, or the RAM 40B of the storage device 2B. Once the control program 200 retrieves the data R from the storage device 2B, the control program may store the data R in the main memory 6 of the information processing device 3.

Figure 29:
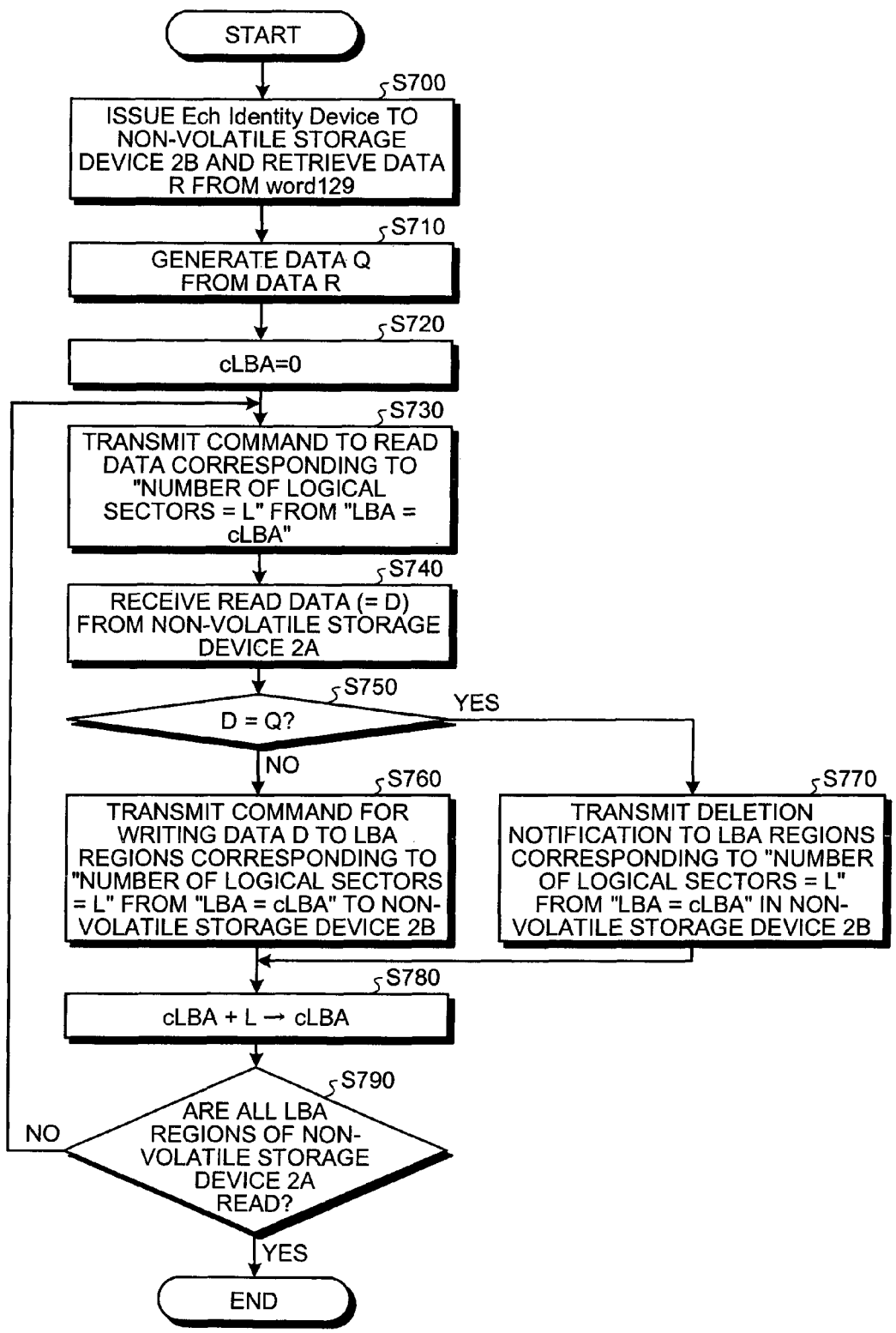
FIG. 29 is a flowchart illustrating a processing order of backup by a control program according to a fourth embodiment.

FIG. 29 is a flowchart illustrating an example of a process according to the fourth embodiment. The control program 200 issues, for example, the ECh IDENTITY DEVICE command to retrieve information of the function f(LBA) to the non-volatile storage device 2B and retrieves the data R in the Word129 field from the non-volatile storage device 2B (step S700). Then, the control program 200 generates the data Q by filling an area of 512 byte length in the main memory 6 with the data R repeating in series (step S710).

The control program 200 substitute 0 for a cLBA as a pointer of a data copy target LBA region (step S720). The control program 200 transmits a command to read data from LBA regions starting from cLBA of L length to the non-volatile storage device 2A (step S730). The non-volatile storage device 2A receiving the read command transmits the data D of the LBA regions to the information processing device 3, and then the information processing device 3 receives the data D (step S740). The control program 200 compares the data D to the fixed data Q (step S750). The process is branched to different steps of cases in which the data D is not identical with the fixed data Q (No in step S750) and the data D is identical with the fixed data Q (Yes in step S750).

When D is not identical with Q (No in step S750), the control program 200 transmits a command to write the data D to the LBA regions starting from cLBA of L length to the non-volatile storage device 2B. The control program 200 transmits the data D to the non-volatile storage device 2B, and the SSDC 41B writes the data D in the NAND memory 16B (step S760).

When D is identical with Q (Yes in step S750), the control program 200 transmits a deletion notification to delete mappings to the NAND memory 16B of the LBA regions starting from cLBA of L length to the non-volatile storage device 2B. The SSDC 41B changes the management information 46B to delete the mappings and the data D becomes device-invalid data (step S770).

When step S760 or step S770 is completed, the control program 200 increments cLBA by L (step S780) and repeatedly performs the processes of step S730 to step S780 until the data of all the LBA regions of the non-volatile storage device 2A is backed up (Yes in step S790).

Figure 30:
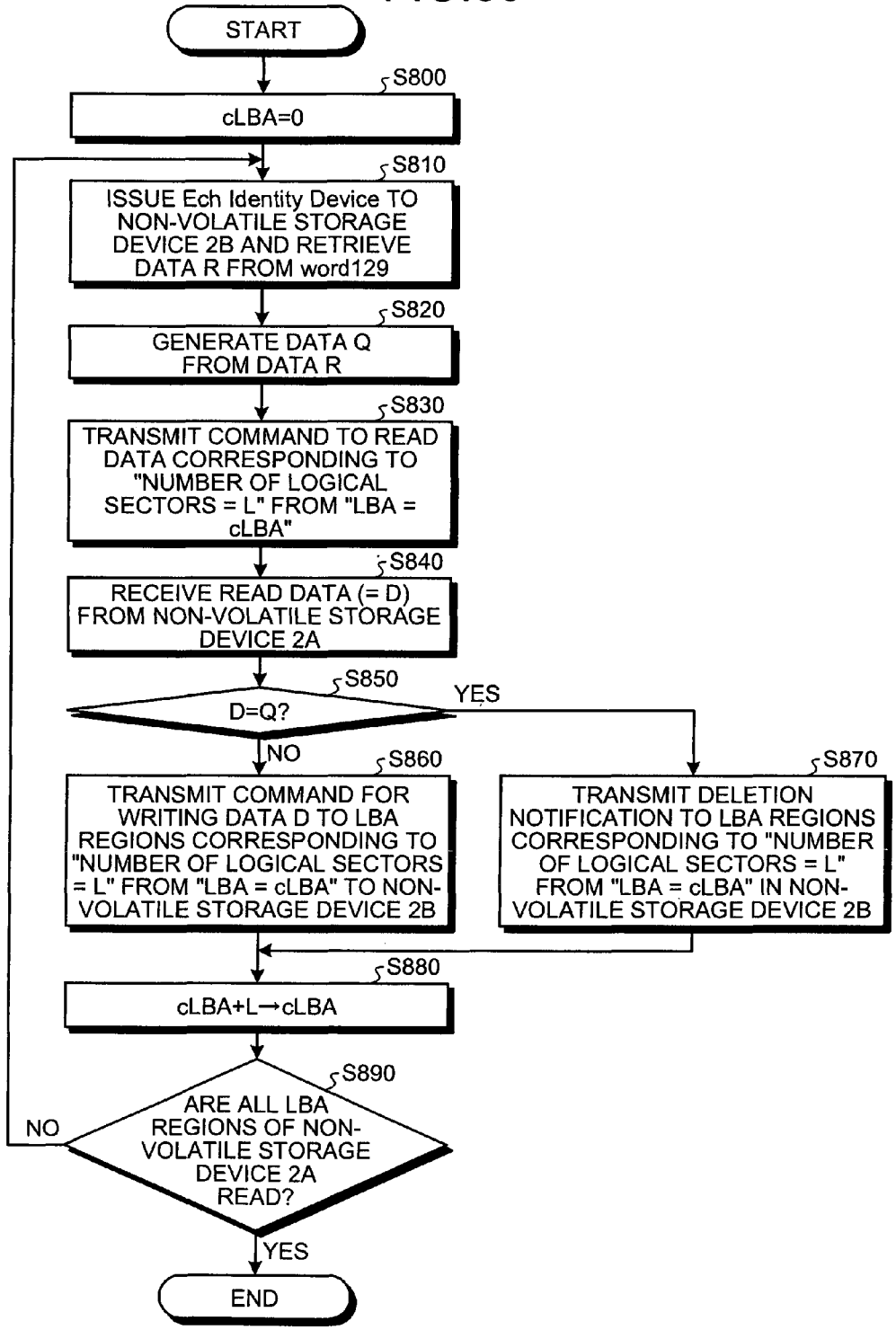
FIG. 30 is a flowchart illustrating another processing order of backup by the control program according to the fourth embodiment.

FIG. 30 is a flowchart illustrating an example of another process according to the fourth embodiment. In the example of the process in FIG. 30, for example, an Identify Device command is issued for each cLBA to the non-volatile storage device 2B which is a backup destination to generate the data Q.

The control program 200 substitutes zero for a cLBA which is a pointer of a data copy target LBA (step S800). The control program 200 issues, for example, an ECh IDENTITY DEVICE command to retrieve information of the function f(LBA) to the non-volatile storage device 2B and retrieves the data R in the Word129 field from the non-volatile storage device 2B (step S810). Then, the control program 200 generates the data Q by filling an area of 512 byte length in the main memory 6 with the data R repeating in series (step S820).

The control program 200 transmits a command to read data from LBA regions starting from cLBA of L length to the non-volatile storage device 2A (step S830). The non-volatile storage device 2A receiving the read command transmits the data D of the LBA regions to the information processing device 3, and then the information processing device 3 receives the data D (step S840). The control program 200 compares the data D to the data Q (step S850). The process is branched to different steps of cases in which the data D is not identical with the fixed data Q (No in step S850) and the data D is identical with the fixed data Q (Yes in step S850).

When D is not identical with Q (No in step S850), the control program 200 transmits a command to write the data D to the LBA regions starting from cLBA of L length to the non-volatile storage device 2B. The control program 200 transmits the data D to the non-volatile storage device 2B, and the SSDC 41B which is the memory controller of the non-volatile storage device 2B writes the data D in the NAND memory 16B (step S860).

When D is identical with Q (Yes in step S850), the control program 200 transmits a deletion notification to delete mappings to the NAND memory 16B of the LBA regions starting from cLBA of L length to the non-volatile storage device 2B. The SSDC 41B changes the management information 46B to delete the mappings and the data D becomes device-invalid data (step S870).

When step S860 or step S870 is completed, the control program 200 increments cLBA by L (step S880) and repeatedly performs the processes of step S810 to step S880 until the data of all the LBA regions of the non-volatile storage device 2A is backed up (Yes in step S790).

This embodiment can be applied a case in which f(LBA) does not output fixed data independent of LBA but output different data depending on LBA. In this case, a command having input parameter LBA to acquire the information of the function f(LBA) may be issued in step S810 alternatively. For example, the control program 200 may receive R=f(LBA) from the non-volatile storage device 2B in step S810 and the control program 200 generates data Q depending on LBA in step S820. For example, an SCT command described in ACS-2 may be used as the command wherein the control program 200 transmits a B0h/D6h SMART WRITE LOG command, a 3Fh WRITE LOG EXT command, or a 57h WRITE LOG DMA EXT command to the storage device 2B for SCT command transfer with written data comprising a target LBA, transmits a B0h/D5h SMART READ LOG command, a 2Fh READ LOG EXT command, or a 47h READ LOG DMA EXT command to the storage device 2B for SCT data transfer and receives the data "R=f(LBA)" from read data received from the storage device 2B.

Thus, in this embodiment, the information processing system 1 can consolidate the information of the function f(LBA) in the non-volatile storage device 2B which is a backup destination, and the information is not required to be managed in the control program 200 independently. Therefore, the management and development of the information processing system 1 is simplified.

Fifth Embodiment

Figure 31:
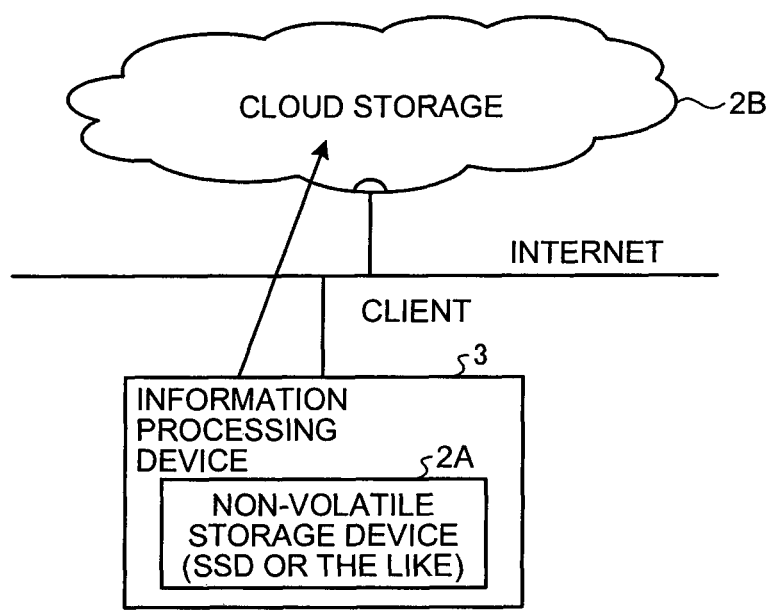
FIG. 31 is diagram conceptually illustrating a case in which a network storage drive or a cloud storage is used as a non-volatile storage device which is a backup destination.

As illustrated in FIG. 31, a network storage drive or a cloud storage can be used as the non-volatile storage device 2B which is a backup destination. For example, an information processing device 3 and a cloud storage 2B are connected to each other via a network such as the Internet or an intranet. Control software 200 can perform a backup process according to this embodiment by transmitting a deletion notification command and a write command to the cloud storage 2B via the network. Since the amount of data transmission of the deletion notification command is smaller than the write command by which a large amount of data transmission is accompanied, the backup process can be performed at high speed and the deterioration in the reliability of the cloud storage 2B by the writing can be suppressed. Further, when an SSD is used as a storage medium of the cloud storage 2B, reduction in the number of free blocks of the cloud storage 2B can be suppressed.

Sixth Embodiment

In the first embodiment and the second embodiment, the case has been described in which the storage device 2A is used as a backup source. In a sixth embodiment, the main memory 6 serves as a data copy source. That is, in the sixth embodiment, an application program 400 copies application program data 500 temporarily stored in the main memory 6 to the non-volatile storage device 2B. The application program data 500 is stored in the application program data area 6E in the main memory 6 while the application program or the OS 100 is running. In this embodiment, for example, the method described in the second embodiment is used to store the application program data 500 in the area 6E. In this embodiment, the storage device 2A is not necessary.

For example, a volatile memory such as DRAM (Dynamic Random Access Memory) and SRAM (Static Random Access Memory) or a non-volatile memory such as MRAM (Magnetoresistive Random Access Memory) and ReRAM (Resistance Random Access Memory) may be used as the main memory 6.

Figure 32:
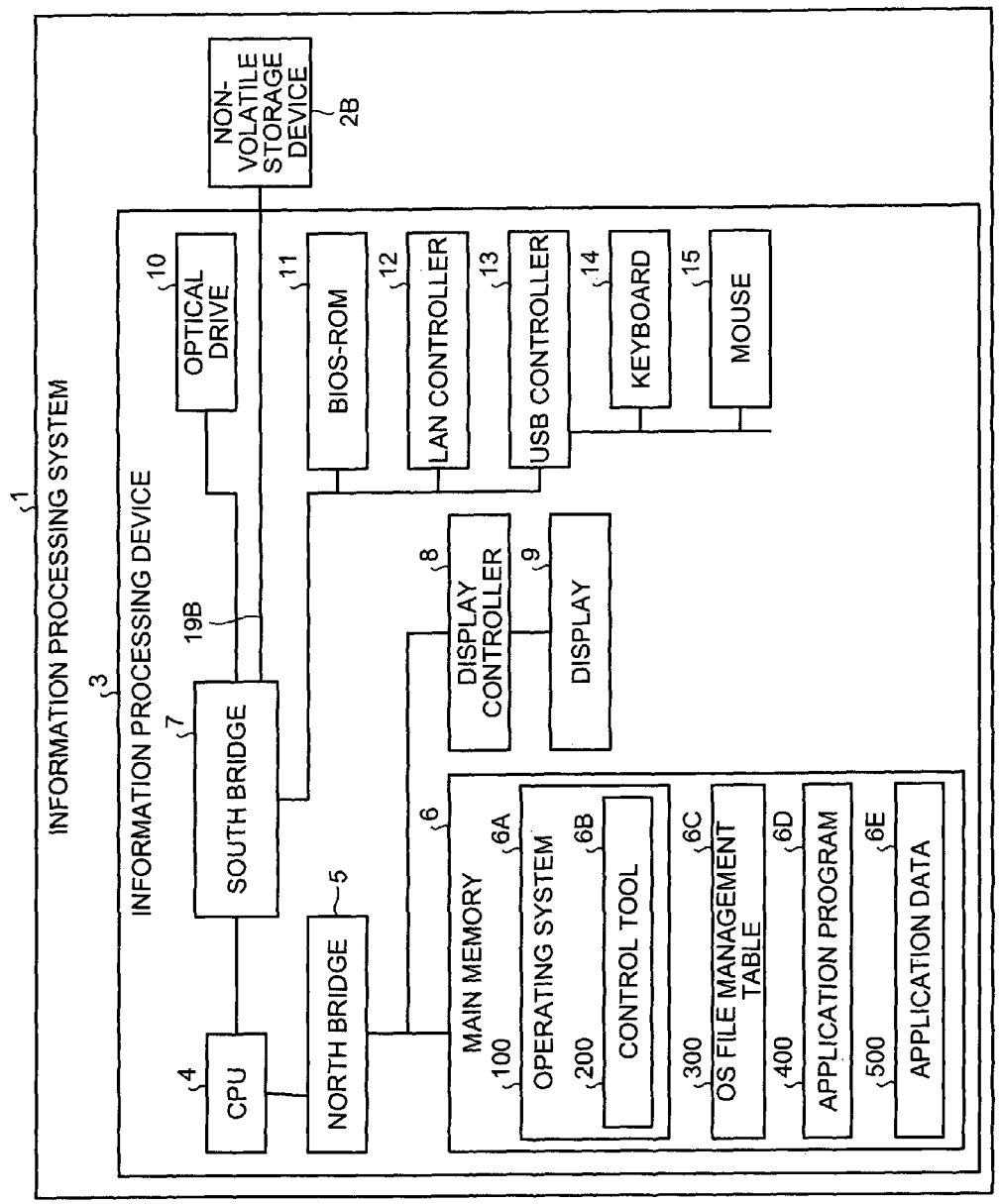
FIG. 32 is a block diagram illustrating an example of the functional configuration of an information processing system according to a sixth embodiment.
Figure 33:
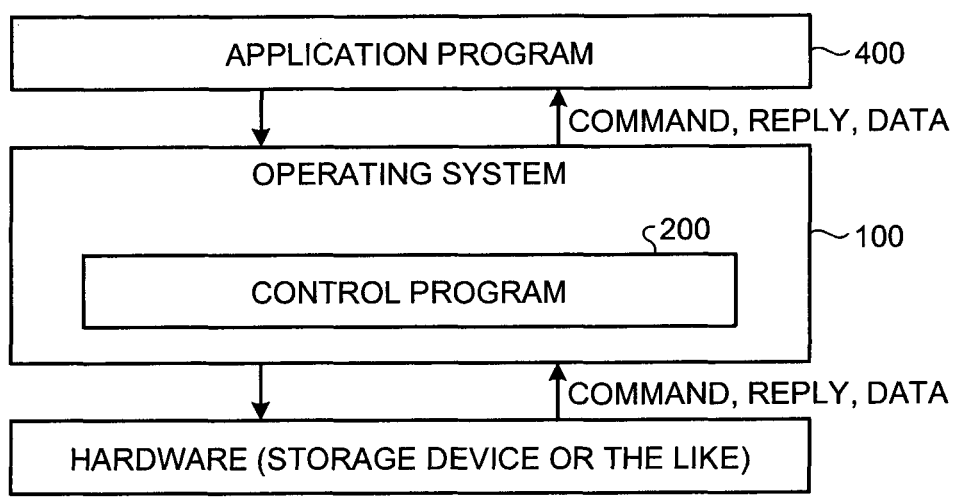
FIG. 33 is a block diagram illustrating an example of the hierarchical functional configuration of an information processing device.

FIG. 32 is a diagram illustrating the configuration of an information processing system 1 according to a sixth embodiment. In this embodiment, for example, a control tool 200 is embedded in an OS 100. However, the OS 100 and the control tool 200 may be stored in an area different from the area 6A in the main memory 6. The application program 400 is a general application program 400 such as Microsoft Word (registered trademark) or Microsoft Power Point (registered trademark) and is stored in a region 6D in the main memory 6. The application program 400 is a program that is executed by the information processing device 3. For example, when the information processing device 3 is powered on, the application program 400 is loaded from a non-volatile storage device to the area 6D in the main memory 6. The information processing device 3 performs processes of the application program 400 cooperatively with the hardware resources under the control of the CPU 4. The application program 400 uses an area 6E in the main memory 6 as a working area. For example, when a user presses down a "SAVE" button on a GUI of the application program 400 through the display 9 and the mouse 15 or an auto save function of the application program 400 is called, as illustrated in FIG. 33, the application program 400 transmits a command to the OS 100 to store application data 500 of the area 6E in the storage device 2B and the OS 100 thus backs up the data of the area 6E to the storage device 2B.

Figure 34:
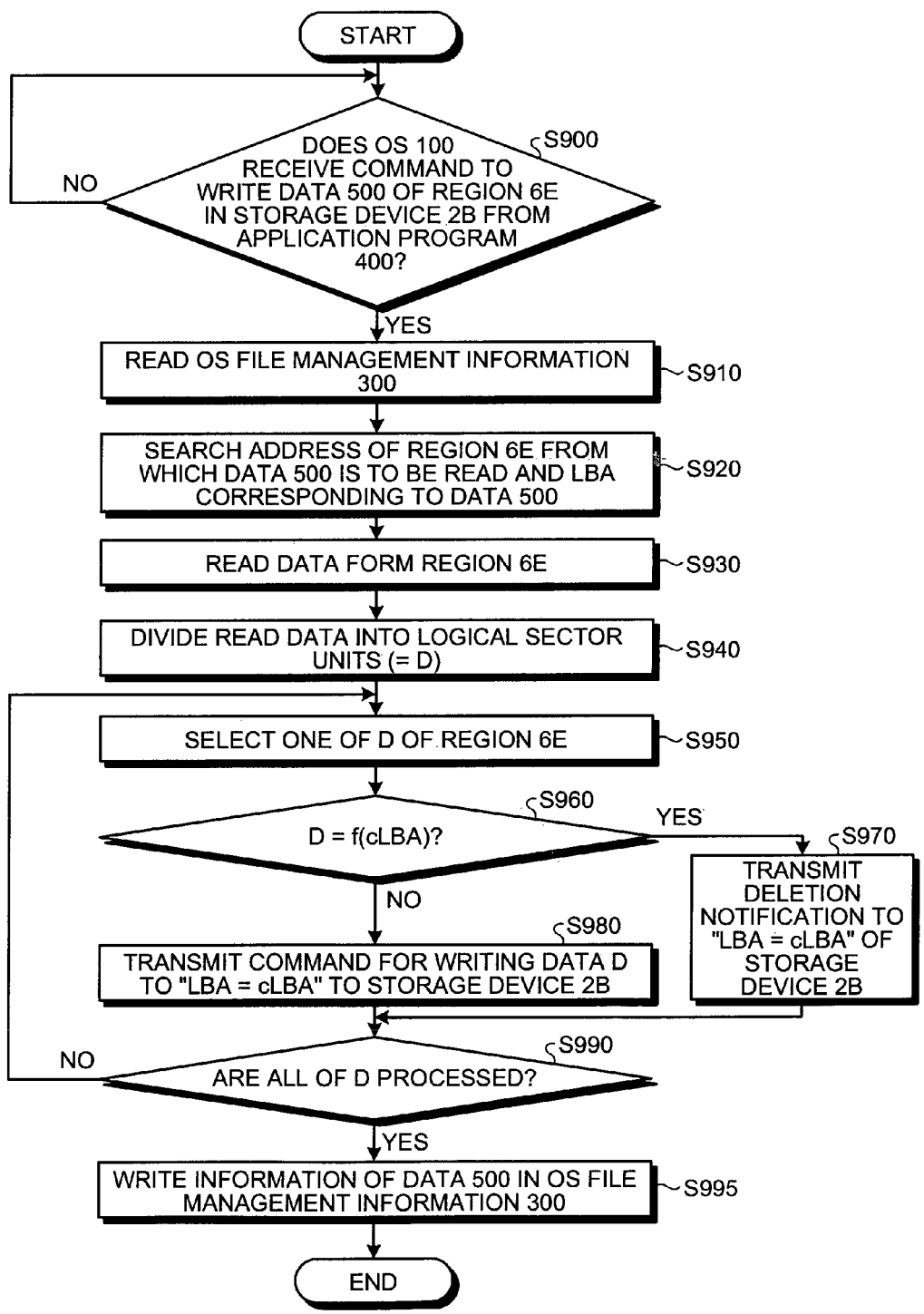
FIG. 34 is a flowchart illustrating a processing order of backup by a control program according to the sixth embodiment.

FIG. 34 is a flowchart illustrating an example of a process of the control tool 200 according to the sixth embodiment. For example, when the information processing system 1 is powered on, as illustrated in FIG. 35, the control tool 200 loads an OS file management table (metadata, OS file system) 300 from the NAND memory 16B in the non-volatile storage device 2B which is a backup destination to an area 6C in the main memory 6. When a command to store the application data 500 of the area 6E in the storage device 2B is transmitted from the application program 400 to the OS 100 (step S900), the control tool 200 reads the OS file management table (metadata) 300 stored in the area 6C in the main memory 6 (step S910). Thus, the control tool 200 (OS 100) searches the address of the area 6E of the main memory 6 from which data is to be read and LBA regions of the data to be stored in the nonvolatile storage device 2B (step S920). The OS 100 reads the application data 500 from the area 6E in the main memory 6 (step S930).

Figure 36:
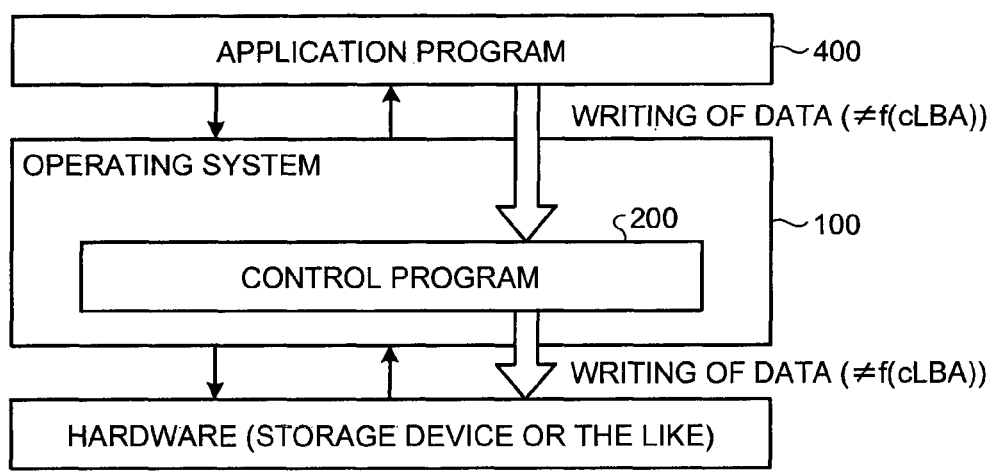
FIG. 36 is a diagram illustrating a flow of data writing in the hierarchical functional configuration of the information processing device.
Figure 37:
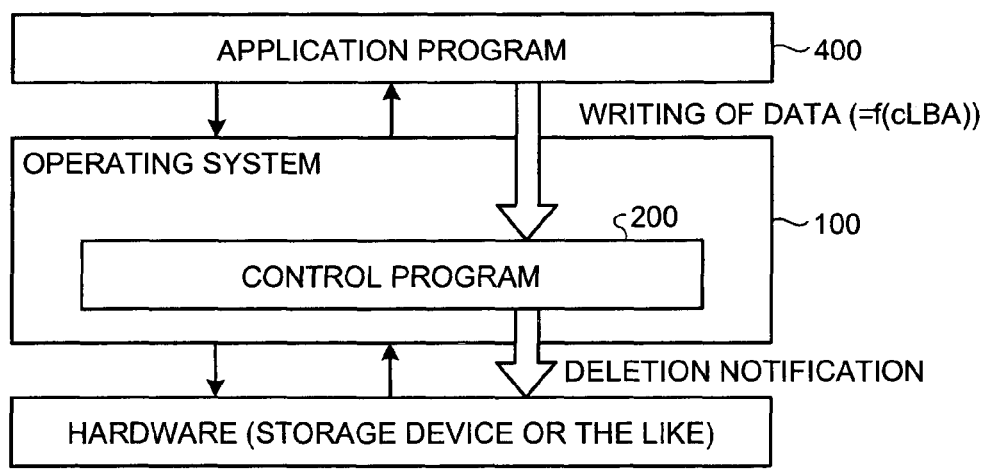
FIG. 37 is a diagram illustrating another flow of the data writing in the hierarchical functional configuration of the information processing device.

To compare the read application data 500, the read application data 500 is preferably divided into logical sector units (step S940). The control tool 200 selects one unit of the divided units (step S950) and determines whether data D of the unit is identical with a function f(cLBA) (step S960). When the data D is not identical with output data from the function f(cLBA), the control tool writes the data D in the LBA regions of the storage device 2B, for example, by using a 61h WRITE FPDMA QUEUED command or a 35h WRITE DMA EXT command described in ACS-2 of Non-Patent Document 1, a 01h Write command described in NVM Express Revision 1.1, or the like as illustrated in FIG. 36 (step S980). When the data D is identical with output data from the function f(LBA), the control tool doesn't transmits a write command to the storage device 2B and transmits a deletion notification command to the storage device 2B to unmap the LBA regions from the NAND memory 16B as illustrated in FIG. 37 (step S970). For example, a 06h DATA SET MANAGEMENT command or an SCT command described in ACS-2 of Non-Patent Document 1, Deallocate (AD) of an 11h Dataset Management command described in NVM Express Revision 1.1, or the like may be used as a deletion notification command. For example, when the SSDC 41B has the Deterministic Zeroing TRIM feature to be described below, not only on the above-mentioned commands but also a 08h Write Zeroes command described in NVM Express Revision 1.1 may be used as the deletion notification command. Further, a 42h UNMAP command described in SCSI Block Commands-3 (SBC-3), Revision 35, Dec. 7, 2012 (http://www.t10.org/) may be used as the deletion notification command.

The control program 200 repeats the processes on all of the divided units (step S950 to step S990). The control program 200 writes the LBA to which the data 500 is written in the OS file management table (metadata) 300 of the main memory 6. Further, the OS file management table 300 of the main memory 6 is backed up and stored in the NAND memory 16B in the non-volatile storage device 2B, and then the process ends (step S995).

Thus, in the sixth embodiment, the data of the main memory 6 can be copied and stored in the storage device 2B at high speed using the deletion notification command.

Seventh Embodiment

Figure 38:
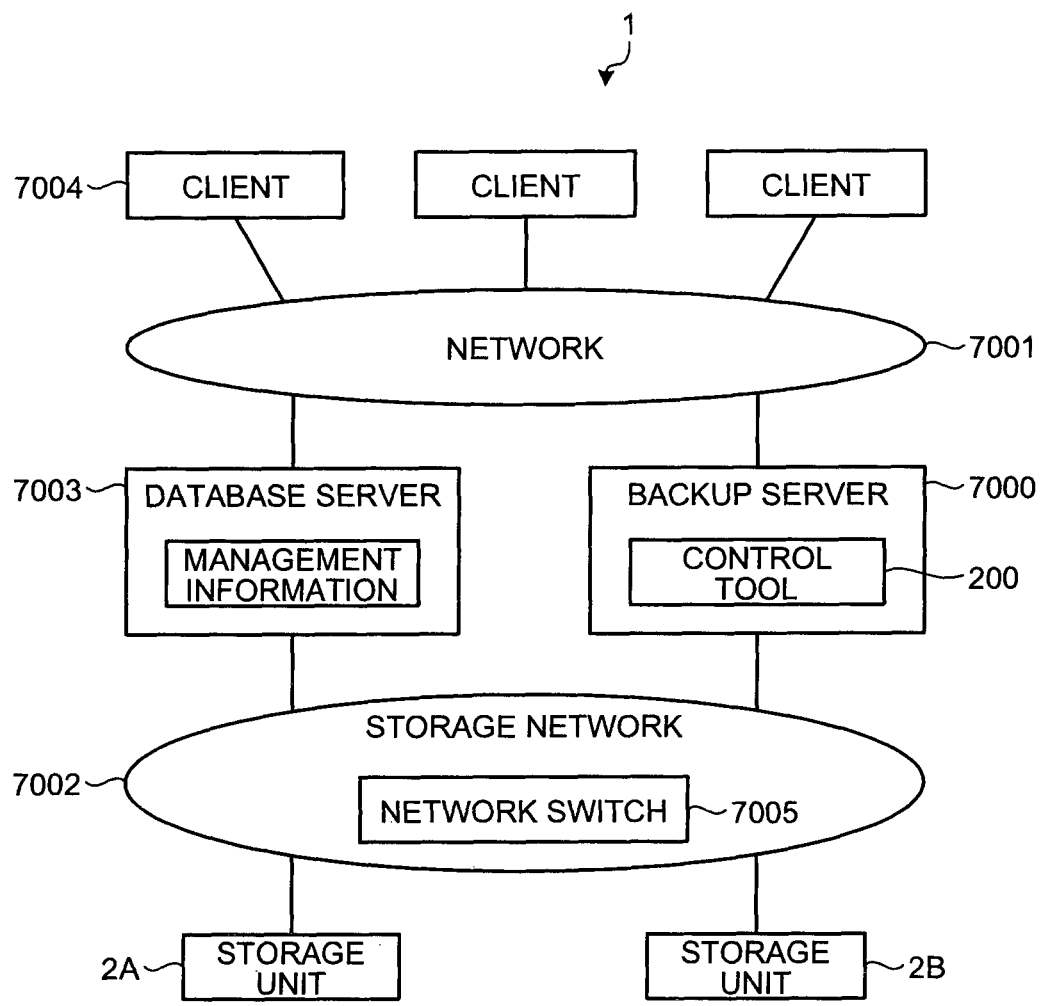
FIG. 38 is a block diagram illustrating an example of an information processing system using a network according to a seventh embodiment.

In a seventh embodiment, a case will be described in which a network 7002 is used as an interface of storage devices 2A and 2B. In this embodiment, an information processing system 1 in FIG. 38 is configured to include the network 7002 connected to the storage devices 2A and 2B.

The network 7002 is a storage network for storage access. For example, a fibre channel or an Ethernet may be used. In particular, for example, an SAN (Storage Area Network) or an NAS (Network Attached Storage) may be used as the storage network. For example, an FC-SAN (Fibre Channel Storage Area Network) or an IP-SAN (Internet Protocol Storage Area Network) is used as the SAN. For example, an SCSI (Small Computer System Interface) may be used as a high level protocol layer. In this embodiment, an example will be described in which an IP-SAN is used as the storage network 7002 will be described. Further, in this embodiment, an iSCSI (Internet Small Computer System Interface) is used as the high level protocol layer. The storage network 7002 includes a network switch 7005 and a hub (not illustrated).

A network 7001 is a network that connects one or more servers and one or more clients each other. For example, LAN (Local Area Network) or a WAN (Wide Area Network) may be used. For example, an Ethernet is used as the LAN.

A client 7004 is a computer that is connected to the network 7001 and executes a requested process. In general, the client 7004 includes hardware resources such as a processor, main memory, a communication interface, and a local input/output device and includes software resources such as a device driver, an operating system (OS), and an application program (not illustrated). Thus, the client 7004 performs processes of various programs cooperatively with the hardware resources under the control of the processor. For example, the client 7004 performs I/O access to a storage unit 2A via a database server 7003 and realizes a desired business system by executing a business application program under the control of the processor.

The database server (DB server) 7003 is a server which is connected to the network 7001 and the storage network 7002 and in which a database management system (DBMS) is running. When the database server 7003 receives a data read request from the client 7004, the database server 7003 reads data from the storage unit 2A or 2B and transmits the read data to the client 7004. When the database server 7003 receives a data write request from the client 7004, the database server 7003 receives write data from the client 7004 and writes the received data to the storage unit 2A or 2B. The database server 7003 stores management information (metadata) configured to manage the data stored in the storage unit 2A or 2B.

The storage unit 2A may provide a data storage service for the DB server 7003 singularly or may provide a data storage service for the DB server 7003 as one virtual storage device comprising a plurality of storage devices. In the storage device 2A, one or more logical devices (LDEV) are configured to be provided to the DB server 7003. The logical device may be configured as a virtual device (VDEV) comprising a plurality of hard disk drives under a RAID configuration.

The logical device (LDEV) is a logical storage device recognized by the DB server 7003. A logical unit (LU) is allocated to the logical device. The DB server 7003 recognizes the logical device configured on a physical device as the logical unit. A logical device number (LUN) is assigned to each logical unit. The logical unit is divided into logical sectors (logical blocks), and an LBA is assigned to each logical sector. The DB server 7003 can access a specific logical sector of a specific logical unit by sending a command including a logical address configured by a logical device number and an LBA to the storage device. In this embodiment in which the iSCSI is used, as described above, the DB server 7003, the storage unit 2A and the storage unit 2B are configured to function as initiators and targets as iSCSI nodes to which iSCSI names are assigned. Accordingly, the DB server 7003, the storage unit 2A, and the storage unit 2B transmit an iSCSI PDU via a network portal specified by an IP address and a TCP port number. Accordingly, the DB server 7003 can recognize the storage units 2A and 2B on the network 7002 by specifying the iSCSI name, the IP address and the TCP port number and can access the logical sector in the logical unit of the storage units. Further, the client 7004 may be connected directly to the storage network 7002 without passing through the DB server 7003.

Figure 39:
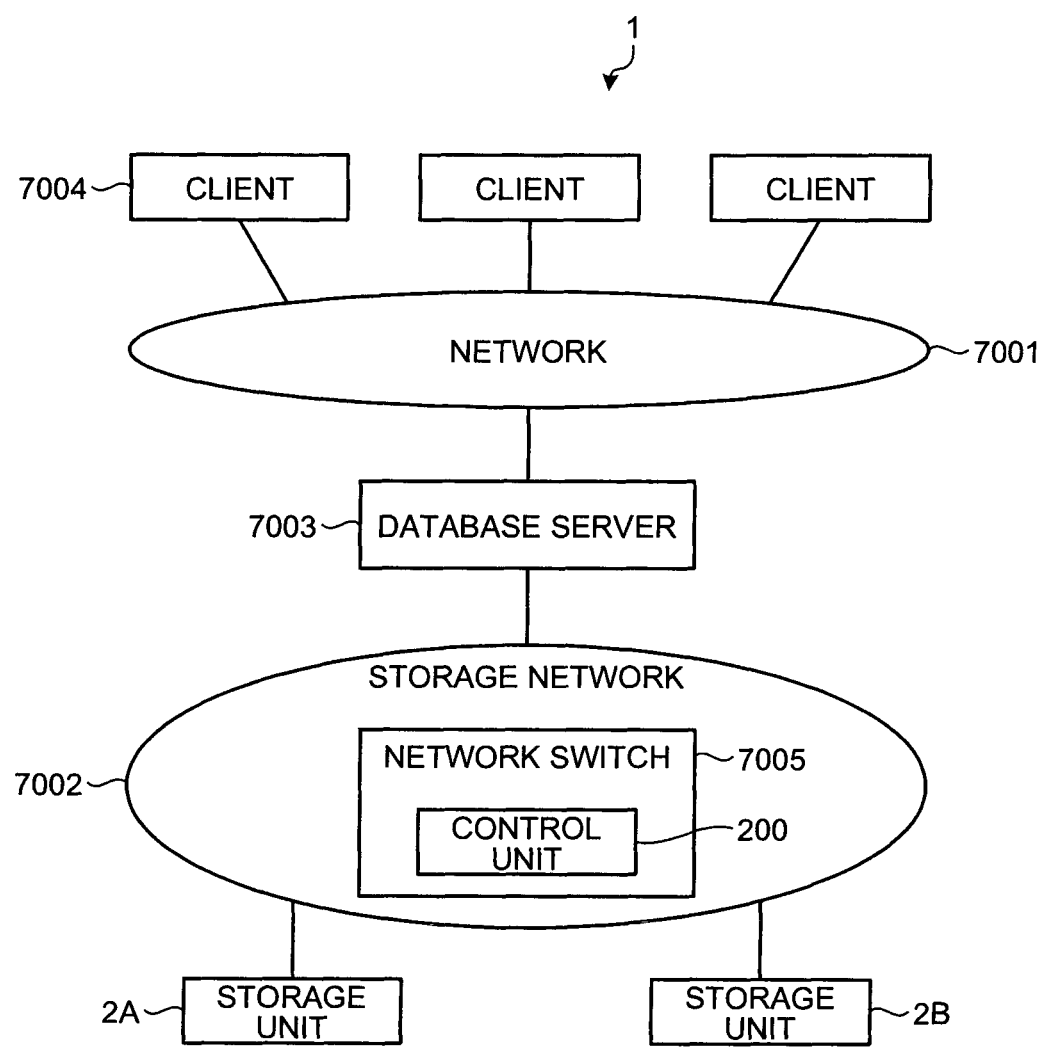
FIG. 39 is a block diagram illustrating another example of the information processing system using a network according to the seventh embodiment.
Figure 40:
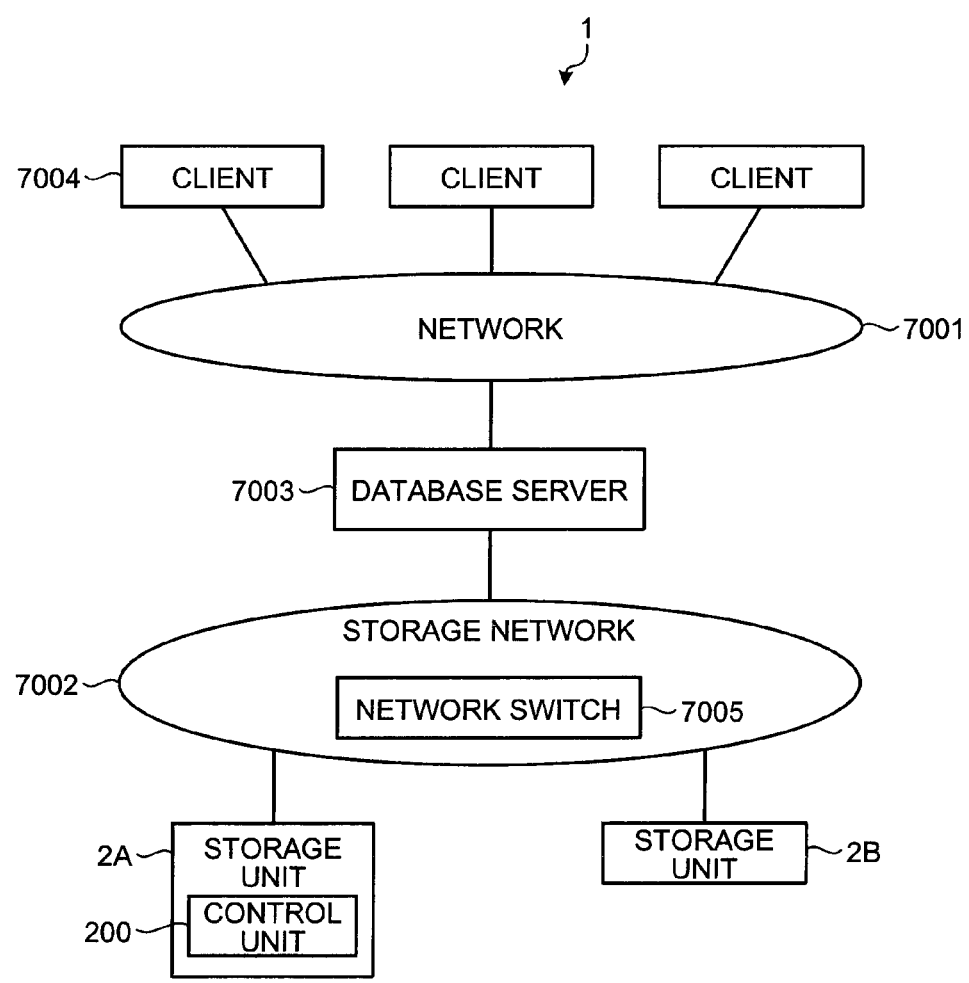
FIG. 40 is a block diagram illustrating another example of the information processing system using a network according to the seventh embodiment.

A backup server 7000 is connected to the storage network 7002, and thus the control tool 200 is stored in a main memory of the backup server 7000. The DB server 7003 may have the function of the backup server 7000. As illustrated in FIG. 39, the function of the control tool 200 may not be configured as the control tool 200 which is a part of the backup server 7000, but may be embedded in the network switch 7005 as a control unit 200. As illustrated in FIG. 40, the function of the control tool 200 may be embedded in the storage device 2A as a control unit 200. Further, the function of the control tool 200 may be embedded in the client 7004 as a control unit 200.

Figure 41:
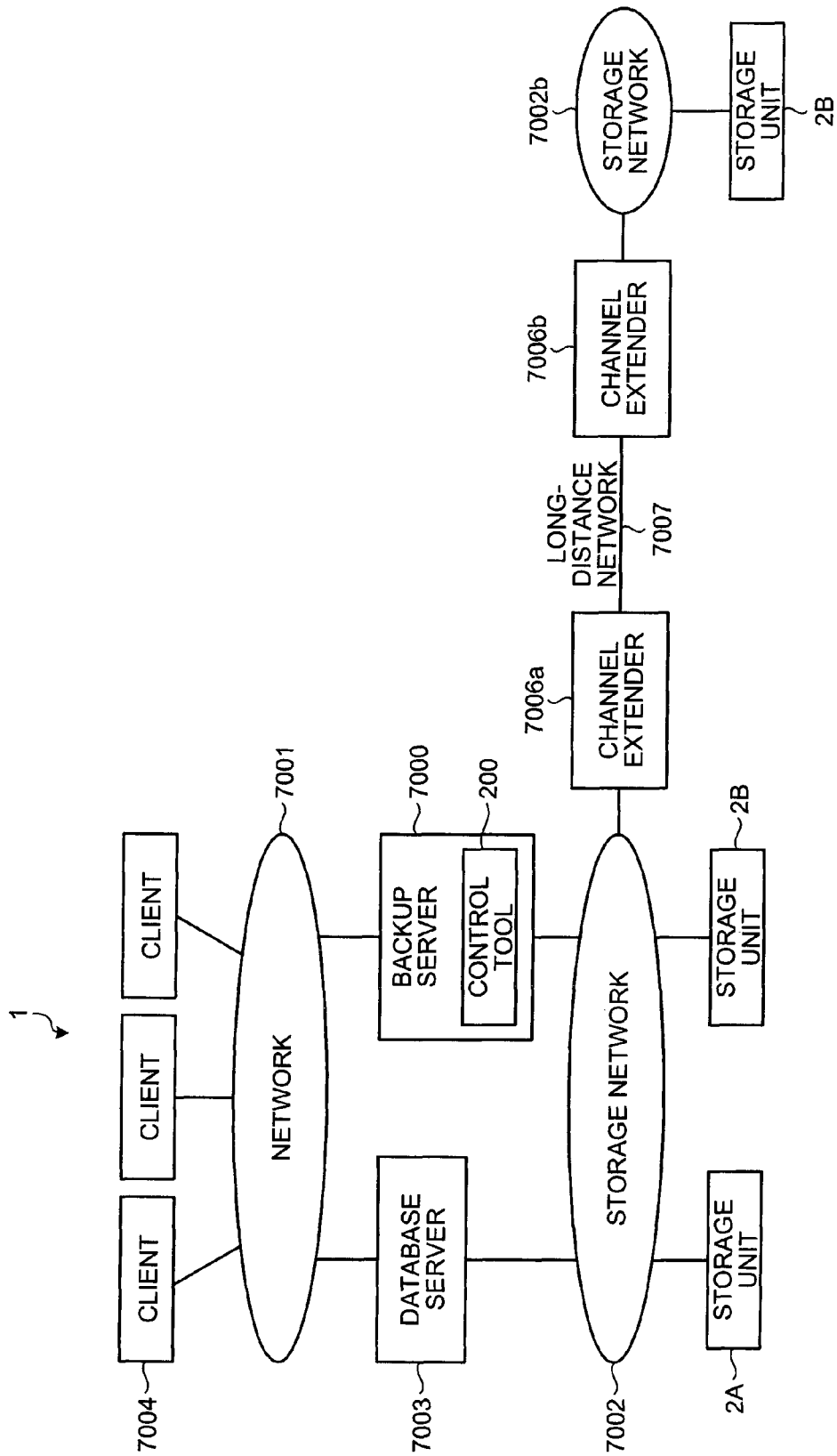
FIG. 41 is a block diagram illustrating another example of the information processing system using a network according to the seventh embodiment.

When IT managers or operators backs up data stored in the storage unit 2A to the storage unit 2B for disaster recovery, a distance between the storage units 2A and 2B is preferably equal to or more than 100 kilometers. In this case, as illustrated in FIG. 41, the storage units 2A and 2B are preferably connected to each other via channel extenders 7006a and 7006b and via a long-distance network 7007 such as a WAN (Wide Area Network) or an exclusive line.

In this embodiment, the case has been described in which the storage unit 2A which is a backup source and the storage unit 2B which is a backup destination are different storage devices. However, the invention can be applied, even when the storage units 2A and 2B are embedded in the same storage device as different storage regions. That is, the invention can be applied to a case in which a storage device comprises two or more LDEVs to which LUs are assigned and one LU is used as the storage unit 2A and another LU is used as the storage unit 2B wherein the control tool 200 (the control unit 200) copies data of the storage unit 2A to the storage unit 2B. When the control tool 200 (control unit 200) copies the data from one LU as a source to another LU as a destination, the invention can be applied to a case in which all of the LBA regions in the source LU are copied and to a case in which some of the LBA regions of the source LU are copied.

Figure 42:
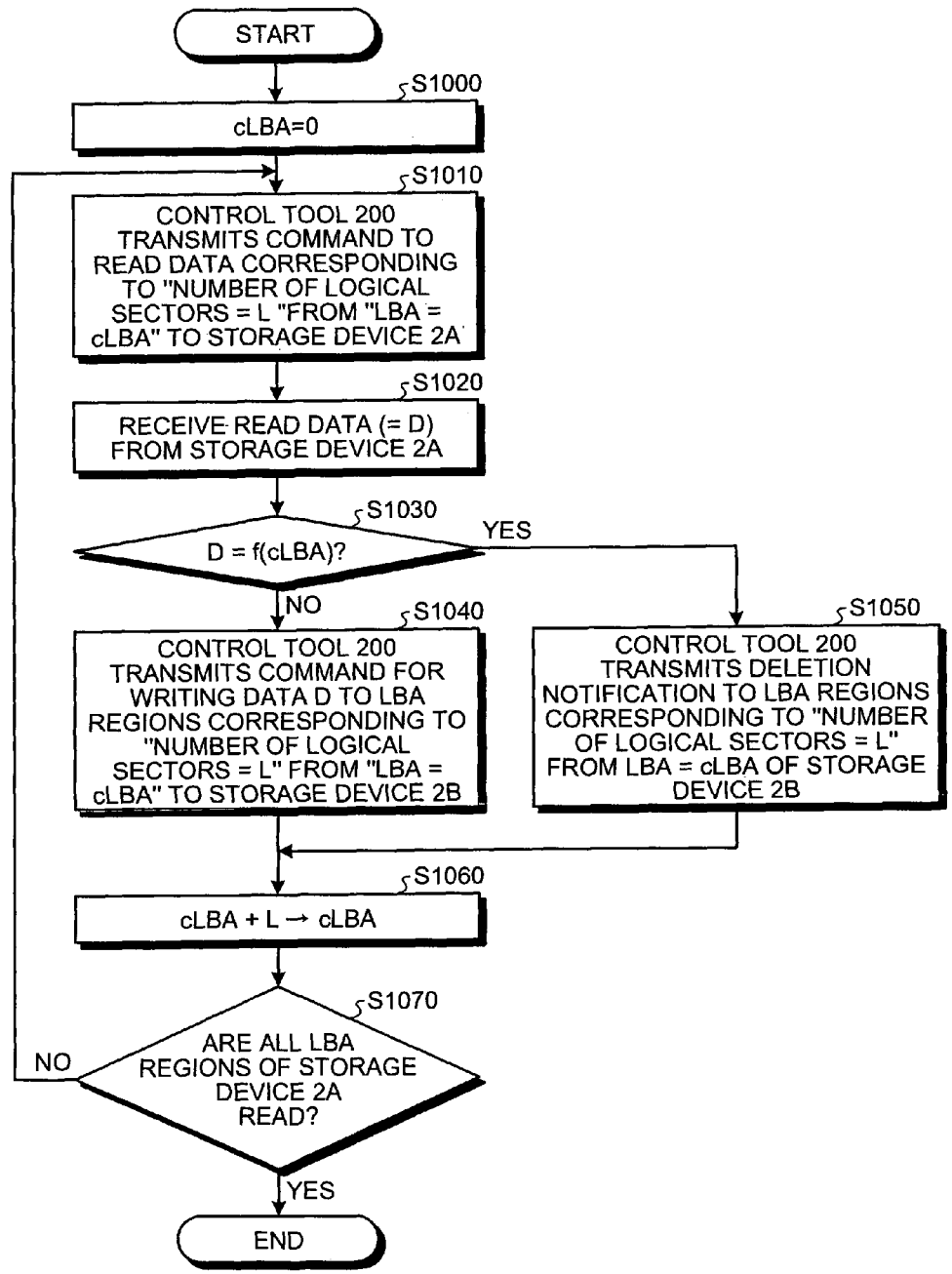
FIG. 42 is a flowchart illustrating a processing order of backup by a control program according to the seventh embodiment.

FIG. 42 is a diagram illustrating a backup process of the control tool 200 (control unit 200) according to this embodiment. When the backup starts, the control program 200 in the backup server 700 substitutes zero for cLBA which is a pointer of a data copy target LBA regions (S1000). The control program 200 transmits a command to read data of the LBA regions starting from cLBA of L length to the storage unit 2A (step S1010). As the read command from the storage unit 2A, for example, a 28h READ (10) command, an A8h READ (12) command, an 88h READ (16) command, a 7Fh READ (32) command, or the like described in SCSI Block Commands-3 (SBC-3), T10/BSR INCITS 514, Revision 35 (http://www.t10.org/) may be used. The storage unit 2A receiving the read command transmits the data (D) of the LBA regions to the backup server 7000 via the storage network 7002, and then the backup server 7000 receives the data D (step S1020).

The control program 200 compares the data D to output data from the function f(cLBA) (step S1030). When the data D is not identical with output data from the function f(cLBA) (No in step S1030), the control program 200 transmits a command to write the data D in LBA regions starting from cLBA of L length to the storage unit 2B and transmits the data D to the storage unit 2B (step S1040). Thus, the SSDC 41B writes the data D to the NAND memory 16B. As the write command sent to the storage unit 2B, for example, a 2Ah WRITE (10) command, an AAh WRITE (12) command, an 8Ah WRITE (16) command, a 7Fh WRITE (32) command, or the like described in the above-mentioned SBC-3 is used.

When D is identical with output data from the f(cLBA) (Yes in step S1030), the control program 200 transmits a deletion notification to the storage unit 2B to delete mappings of the LBA regions to the NAND memory 16B (step S1050). The SSDC 41B changes the management information 46B to delete the mappings and the data D becomes device-invalid data. As the deletion notification command sent to the storage unit 2B, for example, a 42h UNMAP command or the like described in the above-mentioned SBC-3 may be used.

When step S1040 or step S1050 is completed, the control program 200 increments the cLBA by L (step S1060) and the subroutines of step S1010 to step S1050 are performed on all of the small regions. When the cLBAs exceed the maximum accessible LBAs of the storage device 2B, the reading of all the LBA regions is assumed to be completed (Yes in step S1070), and thus the backup process is completed.

The control program 200 (the control unit 200) may back up data of the entire LBA regions of the storage unit 2A or may back up data of a part of the LBA regions of storage unit 2A as a back-up target range. When a part of the LBA regions of the storage unit 2A is backed up, for example, all of the LBAs in the logical unit (LU) of the storage unit 2A may be backed up to the storage unit 2B. In this case, a logical unit (LU) is assigned to the storage unit 2B and the data is copied from the logical unit (LU) of the storage unit 2A to the logical unit (LU) of the storage unit 2B.

As illustrated in FIG. 40, when the control unit 200 is embedded in the storage device 2A which is a backup source, the control unit 200 may process a server-free backup as the backup process of the control tool 200 (control unit 200) in this embodiment. In this case, for example, an extended copy command may be used. For example, an 83h EXTENDED COPY command described in SCSI Primary Commands-3 (SPC-3), INCITS T10/1731-D, Revision 36e (http://www.t10.org/) may be used as the extended copy command. When the backup server 7000, the database server 7003, the network switch 7005, or the client 7004 transmits the extended copy command including a backup source addresses and backup destination addresses to the storage device 2A, the control unit 200 performs the backup process as in the process illustrated in FIG. 18 on the backup source and destination regions. That is, the control unit 200 repeats the reading of the data from the source regions of the storage device 2A specified by the extended copy command and determines whether the read data D is identical with f(cLBA). When D≠f(cLBA), the control unit 200 transmits the write command and the data D to the storage device 2B via the storage network 7002. When D=f(cLBA), the control unit 200 transmits a deletion notification to the storage device 2B via the storage network 7002. Thus, the storage device 2B performs the data write process and the deletion notification process.

Eighth Embodiment

Figure 43:
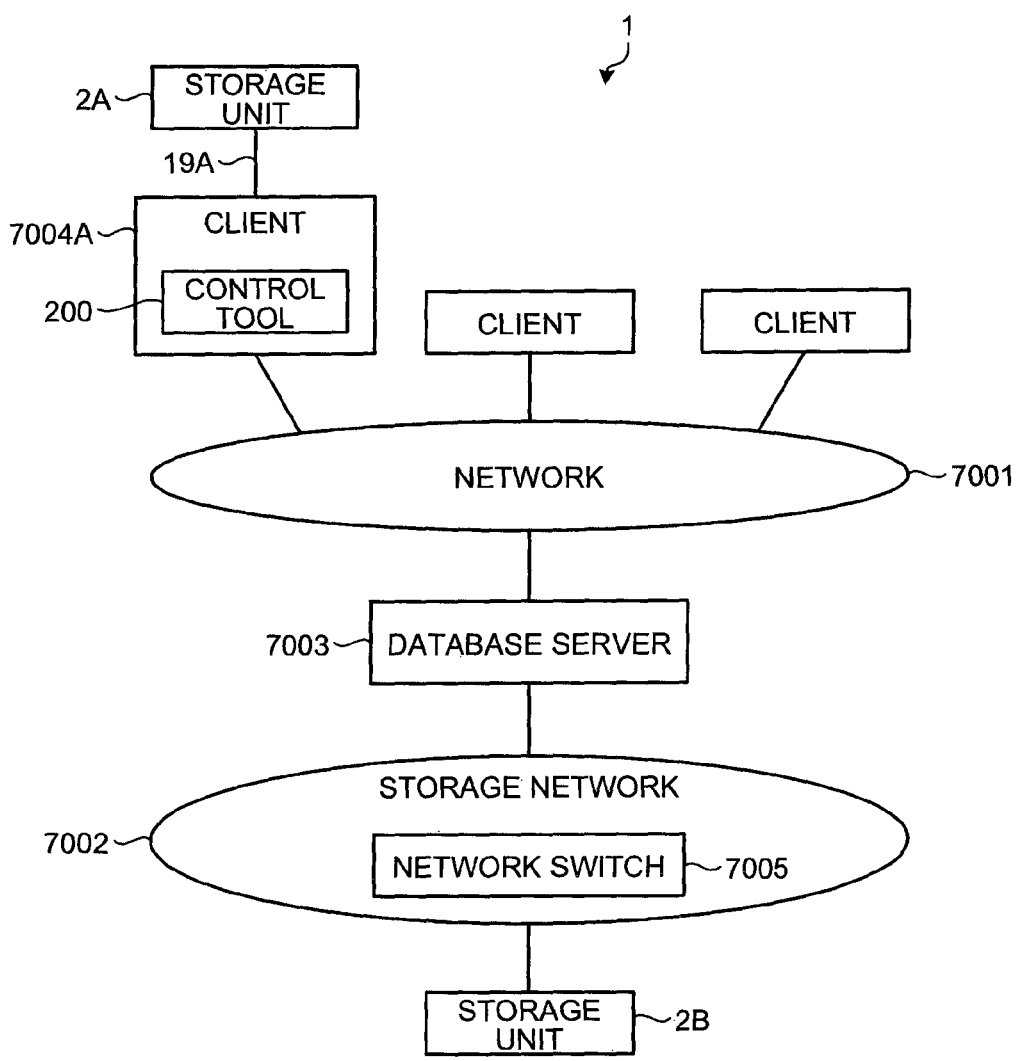
FIG. 43 is a block diagram illustrating another example of an information processing system using a network according to an eighth embodiment.

In the seventh embodiment, the case has been described in which the data is backed up via the storage network 7002. As illustrated in FIG. 43, data of a storage unit 2A connected to a client 7004A may be backed up to a storage unit 2B connected to a storage network 7002. At the time of the backup process, the control tool 200 repeats reading of the data from backup source regions of the storage unit 2A on and determines whether the read data D is identical with output data from the f(cLBA). Then, when D≠f(cLBA), the control tool 200 transmits a write command and the data D to the storage unit 2B via the storage network 7002. When D=f(cLBA), the control tool 200 transmits a deletion notification to the storage unit 2B via the storage network 7002.

Figure 44:
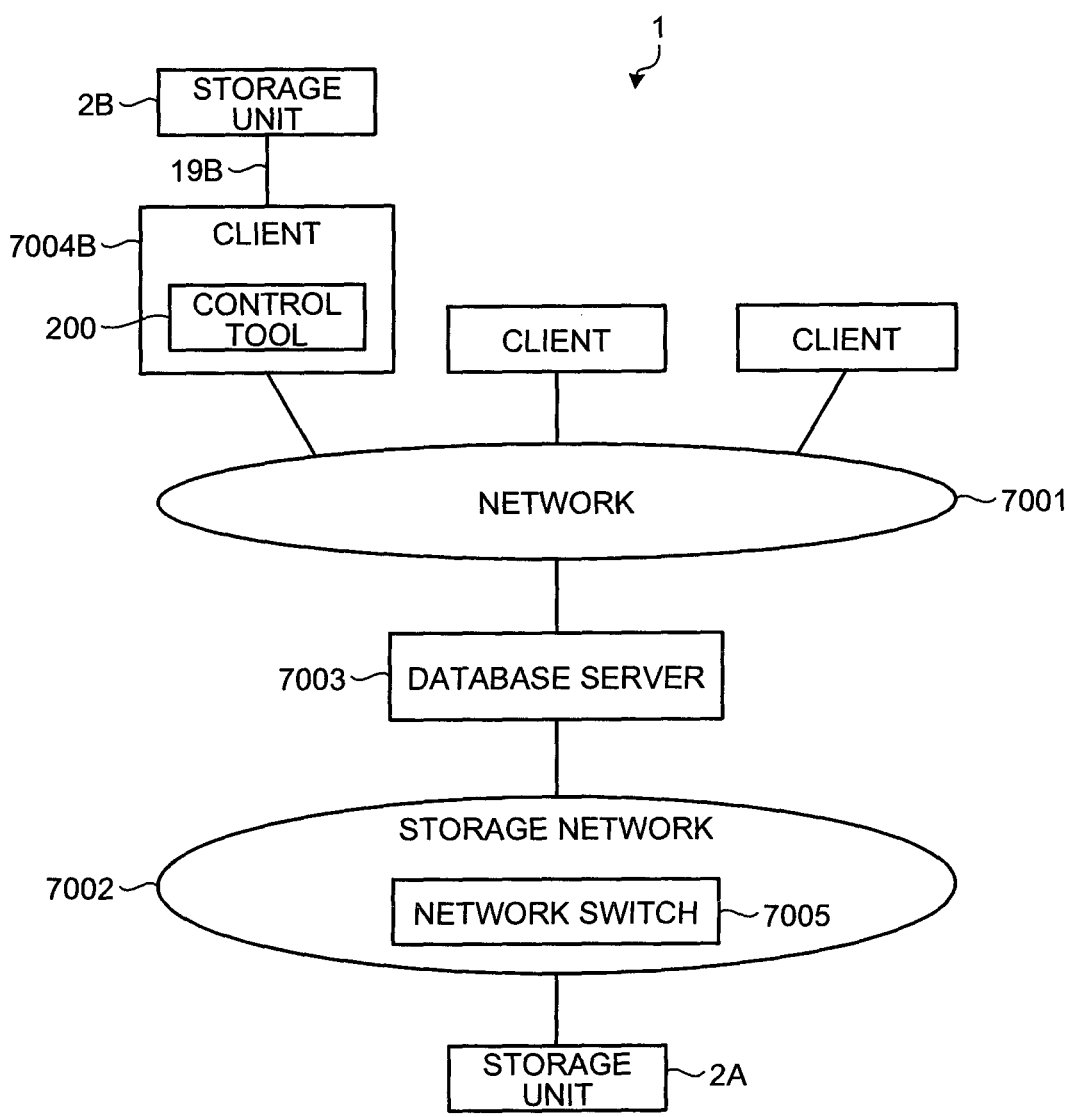
FIG. 44 is a block diagram illustrating another example of an information processing system using a network according to the eighth embodiment.

As illustrated in FIG. 44, the data of the storage unit 2A connected to the storage network 7002 may be backed up to the storage unit 2B connected to the client 7004B. At the time of the backup process, the control tool 200 repeats reading of the data from backup source regions of the storage unit 2A and determines whether the read data D is identical with output data from the f(cLBA). Then, when D≠f(cLBA), the control tool 200 transmits a write command and the data D to the storage unit 2B. When D=f(cLBA), the control tool 200 transmits a deletion notification to the storage unit 2B via the storage network 7002.

Ninth Embodiment

Figure 45:
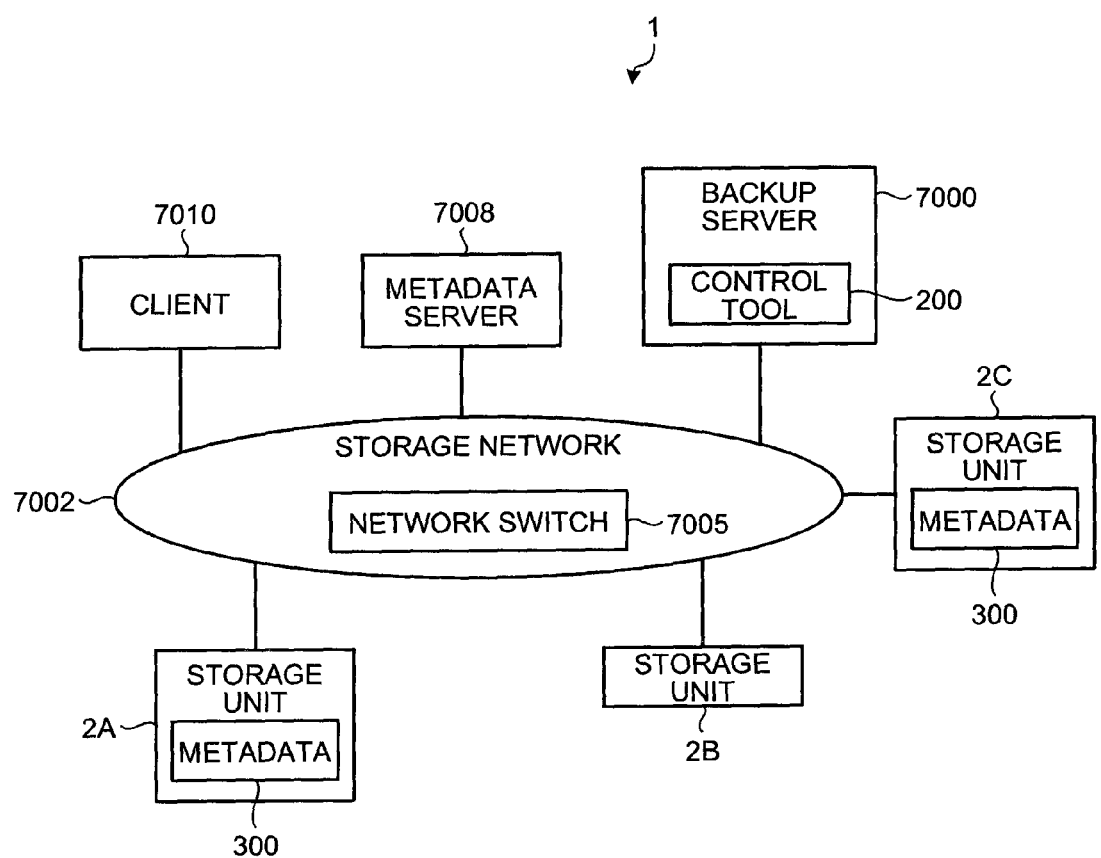
FIG. 45 is a block diagram illustrating an example of a information processing system using a network according to a ninth embodiment.

In a ninth embodiment, a case will be described in which a network 7002 is used as an interface of storage units 2A and 2B, as in the seventh embodiment, and backup is performed in units of files. A information processing system 1 in FIG. 45 is configured to include a metadata server (MDS) 7008 connected to the storage network 7002 and metadata 300 stored in a storage unit 2a as a backup source and a storage unit 2C in a distributed management method.

For example, the metadata 300 may have the same structure as the OS file management information 300 described in the second embodiment or the sixth embodiment. For example, the metadata 300 may be an OS file management table 300 illustrated in FIG. 35 or may have another structure. A block algorithm or a B+tree algorithm may be used as a management algorithm of the metadata 300. In this embodiment, a case in which the metadata 300 have a structure illustrated in FIG. 46 will be described. The metadata 300 includes a file identification ID, a storage unit identification ID used to specify a storage unit storing a file, an LBA indicating the starting LBA of LBA regions in which the file is stored, a sector count indicating a data length of the file, a file owner ID, and a latest update time of the file, and other attribute information of the file. The storage unit identification ID is preferably a number unique to each storage unit. For example, World Wide Name (WWN), an IP address, or a MAC address may be used. The metadata 300 may be stored only in the storage unit 2A which is a backup source. However, from the viewpoint of the reliability and performance improvement of the entire system, the metadata 300 is preferably stored with a distributed management method in the storage unit 2A and a storage unit 2C which is a storage unit other than the storage units 2A and 2B and is connected to the storage network 7002. Alternatively, the metadata 300 may not be stored in a storage unit on the storage network 7002, but may be stored in a local input/output device (not illustrated) directly connected to the metadata server 7008.

The metadata server (MDS) 7008 is connected to the storage network 7002 and configures a file system of the information processing system 1 by managing the metadata 300 for file data stored in the storage units 2A, 2B and 2C. The metadata 300 comprise mappings of the file IDs to the storage units 2A, 2B and 2C. For example, an SAN file system, a cluster file system, a RAIN (Redundant Array of Inexpensive/Independent Nodes) file system, a pNFS (parallel Network File System), or a Google File System (GFS) can be used as the file system. The metadata server 7008 includes hardware resources such as a processor, main memory, a communication interface, and a local input/output device and includes software resources such as a device driver, an operating system (OS), and a metadata management program (not illustrated). Thus, the metadata server 7008 performs processes of various programs cooperatively with the hardware resources under the control of the processor.

The client 7010 is a computer that is connected to the storage network 7002 and performs a desired process. The client 7010 includes hardware resources such as a processor, main memory, a communication interface, and a local input/output device and includes software resources such as a device driver, an operating system (OS), and an application program (not illustrated). Thus, the client 7010 performs processes of various programs cooperatively with the hardware resources under the control of the processor. For example, the client 7010 performs file accesses to the storage units 2A, 2B, and 2C and realizes desired processes of business systems by executing a business application program under the control of the processor.

The client 7010 searches addresses of a file in the storage units and attribute information of the file from the metadata server 7008 to access the file data. For example, when the client 7010 reads data form a file, the client 7010 transmits a file information read request and the file identification ID of the file to the metadata server 7008, the metadata server 7008 searches a storage unit identification ID, a LBA, a sector count and attribute information which are mapped from the file identification ID from the metadata 300, the metadata server 7008 transmits the storage unit identification ID, the LBA, the sector count, attribute information, or the like of the corresponding line to the client 7010, the client 7010 transmits a data read command, the LBA and the sector count to a storage unit specified by the storage unit identification ID, the specified storage unit reads data with a sector count length from the LBA and the storage unit transmits the data to the client 7010.

For example, when the client 7010 writes data of a file, the client 7010 transmits a write region allocation request, a file identification ID and a file size of the file to the metadata server 7008, the metadata server 7008 read the metadata 300, the metadata server 7008 notifies the client 7010 of a storage unit identification ID, an LBA to which the file is to be written, an attribute information of the file, or the like, the client 7010 transmits a data write command, the LBA and the sector count to a storage unit specified by the storage unit identification ID, the client 7010 sends data to be written to the storage unit, and the storage unit writes the data to LBA regions starting from the LBA of the sector count length.

Figure 47:
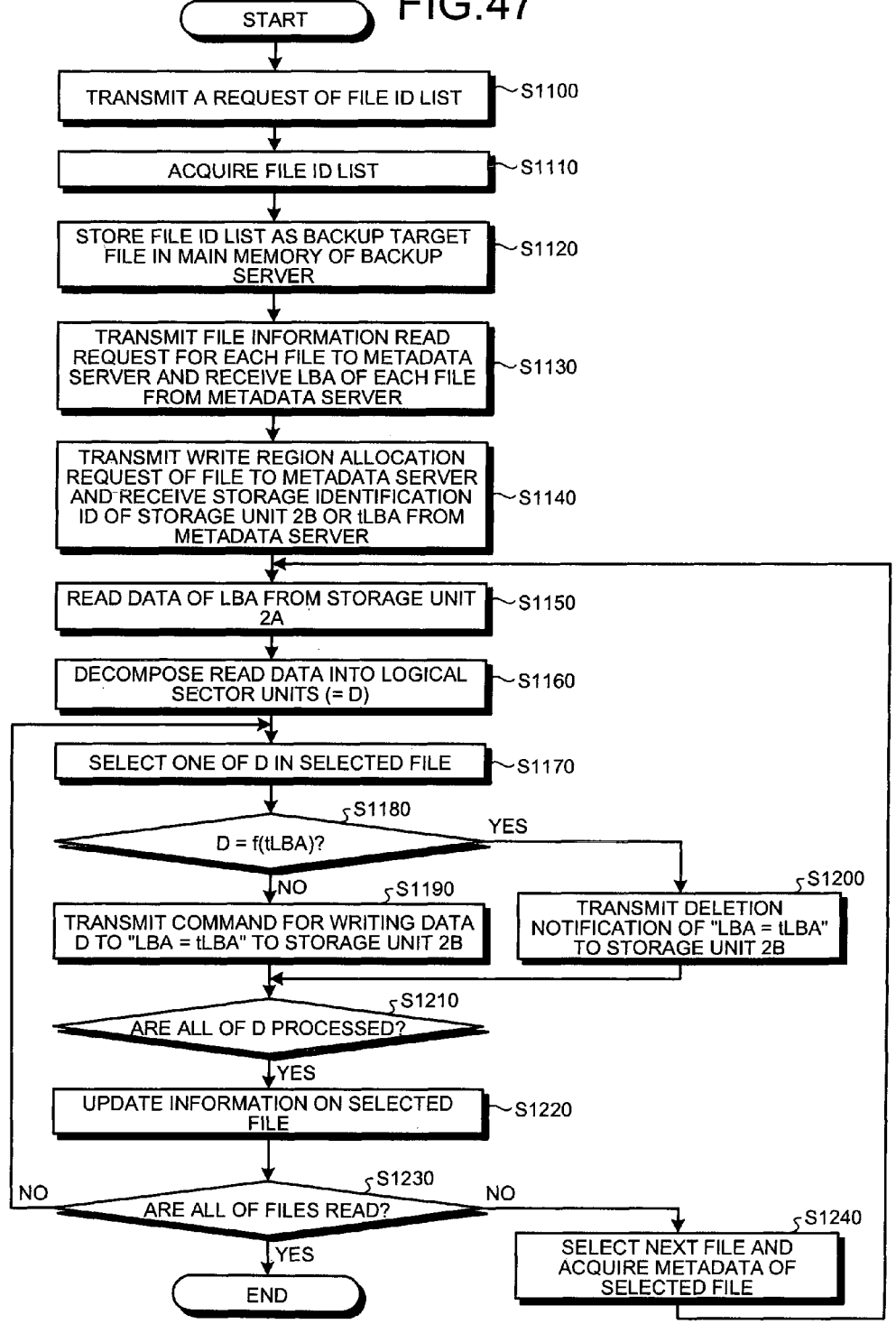
FIG. 47 is a flowchart illustrating a processing order of backup by a control program according to the ninth embodiment.

FIG. 47 is a flowchart illustrating the backup process of the control tool 200 (control unit 200) according to this embodiment. As the read command from the storage unit 2A, for example, a 28h READ (10) command, an A8h READ (12) command, an 88h READ (16) command, a 7Fh READ (32) command, or the like described in the above-mentioned SBC-3 may be used. As the write command of the storage unit 2B, for example, a 2Ah WRITE (10) command, an AAh WRITE (12) command, an 8Ah WRITE (16) command, a 7Fh WRITE (32) command, or the like described in the above-mentioned SBC-3 may be used. As the deletion notification command to the storage unit 2B, for example, a 42h UNMAP command or the like described in the above-mentioned SBC-3 may be used.

The control tool 200 transmits request of a file ID list to the metadata server 7008 (step S1100). The metadata server 7008 reads the metadata 300, creates a file ID list of files registered in the metadata 300, and transmits the file ID list to the control tool 200 (step S1110). For example, the file ID list may have an array data structure illustrated in FIG. 48. For example, the file ID list may include all the files registered in the metadata 300. For example, the file ID list may include part of the files registered in the metadata 300, such as all of the files included in the storage unit 2A, all of the files included in a specific folder and all of the files included in a specific LU. In this embodiment, a case in which all of the files included in the storage unit 2A are backed up will be described. The control tool 200 stores the received file ID list as a backup target file list in the main memory of the backup server 7000 (step S1120).

The control tool 200 transmits a request and file identification ID to read information of each file in the backup file list to the metadata server 7008. The metadata server 7008 searches the file identification ID from the metadata 300 and transmits information of LBA ranges starting from cLBA of cL length in which a file is stored to the control tool 200 (step S1130).

The control tool 200 transmits a write region allocation request, the file identification ID and the sector count cL of the file to the metadata server 7008. The metadata server 7008 retrieves a storage unit identification ID and a LBA (=tLBA) in which a file is to be written based on the metadata 300 and transmits the tLBA and the storage unit identification ID of the storage unit 2B which is a backup destination to the control tool 200 (S1140). The control tool 200 preferably explicitly request the metadata server 7008 to avoid allocating a LBA region to be written in the storage unit 2A when the control tool 200 sends the write region allocation request.

The control tool 200 transmits a data read command to read the regions starting from the cLBA of cL length to the storage unit 2A and the storage unit 2A reads data from the LBA regions and transmits the data to the control tool 200 (S1150). The control tool 200 divides the data received from the storage unit 2A into, for example, logical sector units (=D) (step S1160) and the control tool 200 determines whether each data D is identical with output data from f(tLBA) for each tLBA which is a starting LBA of each divided unit (step S1170 and step S1180).

When the D is not identical with the output data from f(tLBA), the control tool 200 transmits a write command to write the data D in LBA regions starting from the tLBA to the storage unit 2B and transmits the data D to the storage unit 2B (step S1190). When the D is identical with the output data from f(tLBA), the control tool 200 transmits a deletion notification to delete mappings of the LBA regions starting from the tLBA to the NAND memory 16B to the storage unit 2B (step S1200). When LBA ranges specified by plural write commands is continuous regions, the plurality of write commands are preferably unified and transmitted to the storage unit 2B to improve process efficiency of step S1190. Alternatively, when LBA regions specified by plural deletion notifications are continuous regions, the plurality of deletion notifications are preferably unified and transmitted to the storage unit 2B to improve process efficiency of step S1200.

The control tool 200 requests the metadata server 7008 to change the metadata 300 to update the storage unit identification ID of the backed-up file from the ID of the storage unit 2A to the ID of the storage unit 2B. A relation between the cLBA and the tLBA may be "cLBA=tLBA" or may be "cLBA≠tLBA." When cLBA≠tLBA, the control tool 200 request the metadata server 7008 to change the metadata 300 to update the LBA of the file from the cLBA of the backed-up file to the tLBA (step S1170).

Tenth Embodiment

When the methods according to the first to ninth embodiments are used, the control tool 200 can copy user data stored in the storage unit 2A to the storage unit 2B at high speed. An end user who purchased the storage unit 2A can rescue data by the control tool 200 to copy the data from the storage unit 2A to a storage device 2B purchased newly with good reliability when the reliability of the purchased storage device 2A deteriorates. On the other hand, the end user herself or himself may not recover the data, but a distributor of the storage device 2A or 2B, or a data recovery service provider may perform a rescue service which backs up user data from the storage device 2A to the storage device 2B as a free or charged service. In this embodiment, a data rescue service will be described as such a business service. The data rescue service to be described in this embodiment may use or may not use the methods according to the first to ninth embodiments. When the methods according to the first to ninth embodiments are combined, data can be rescued at higher speed and an amount of data written to the storage device 2B which is a backup destination can be reduced, and thus duration of life of the storage device 2B can be longer.

When the end user purchases the storage device 2A, the end user may connect the storage device 2A to the information processing device 3 such as a personal computer, a server, a game device, or a digital camera via the interface 2A. While the information processing device is running, the information processing device 3 writes data to the storage device 2A and reads data from the storage device 2A.

One day suddenly, the storage device 2A may fail to boot up, may fail to read and write data correctly, or may be broken down when the storage device 2A wear out over time, errors are accumulated or the storage device 2A has bugs. When the breakdown occurs, the end user may not read user data such as business documents, photos, and electronic mails stored in the storage device 2A. Accordingly, before the storage device 2A is broken down, the user data is preferably copied and rescued in advance to the storage device 2B which is a storage device with high reliability.

The data rescue service is preferably performed as quickly as possible so that the user data is not unintentionally lost at the time of the data rescue and the reliability of the storage device 2A is not further degraded after the breakdown of the storage device 2A is predicted.

In the data rescue service, the data may rescued from the storage device 2A, even after the storage device 2A is broken down. For example, when the storage device reaches a read-only mode or a write-protect mode described in US 2009/0222617 A1, the storage device 2A may not normally process a received write command, as described in US 2012/0284453 A1. Therefore, an OS such as Windows (registered trademark) does not normally recognize the storage device 2A, and thus it is difficult for the end user to rescue the user data. A data rescue service provider can rescue the user data by using, for example, the control tool 200 described in the embodiments or, for example, a control program described in US 2012/0284453 A1 on the information processing device 3 used to rescue the data, even when the storage device is broken down.

Figure 49:
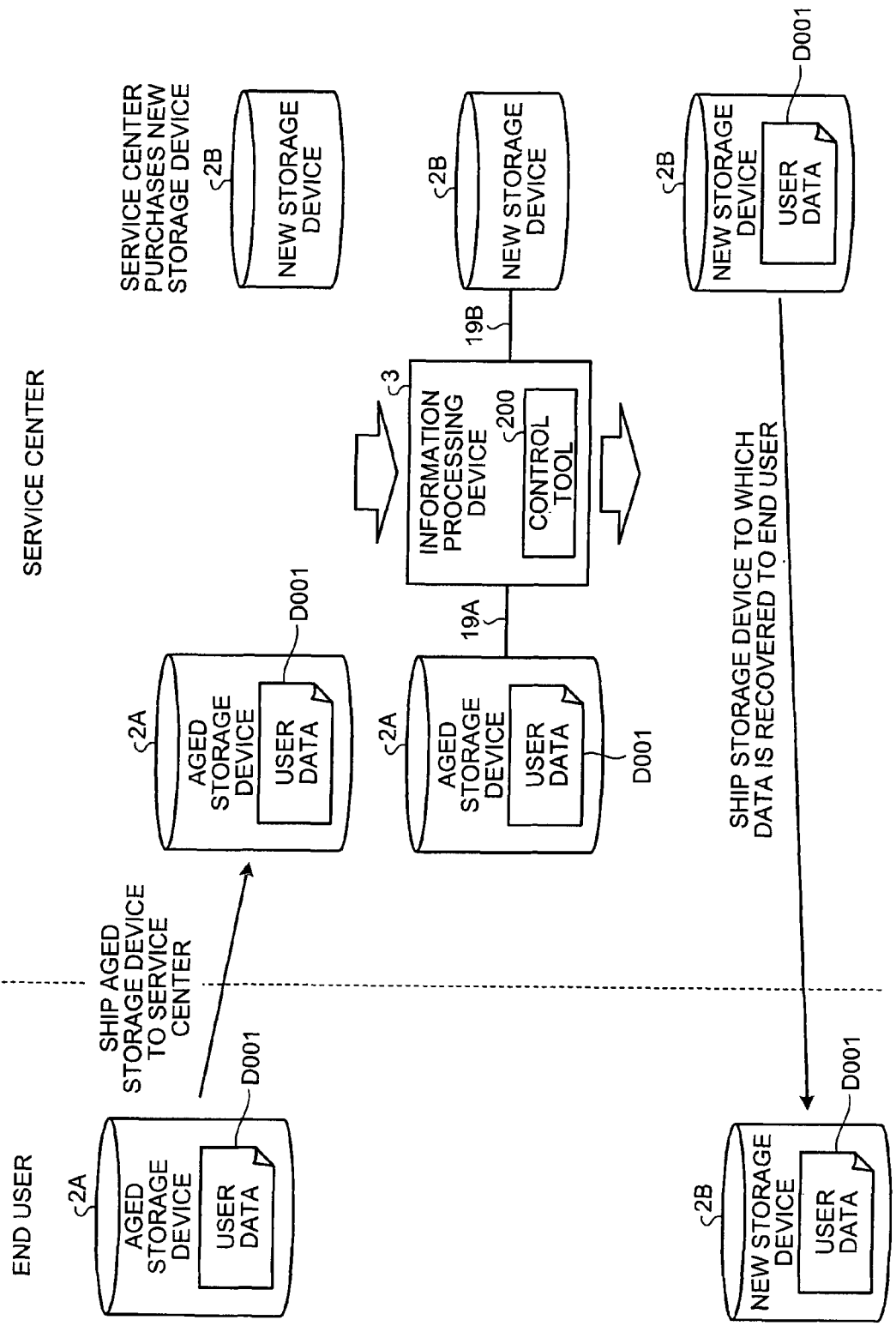
FIG. 49 is a diagram illustrating a system configuration according to a tenth embodiment.

FIG. 49 is a diagram illustrating a process flow from a step of a failure prediction time (or a breakdown time) of the storage device 2A to a step of completing rescuing user data to the storage device 2B in the user data rescue service. For example, the user data rescue service may be performed as a free service or a charged service by a distributor of the storage device 2A or 2B, or the user data rescue service may be performed as a charged service by a data rescue service provider.

The breakdown of the storage device 2A can be predicted in advance or can be known, for example, by collecting statistic information such as S.M.A.R.T information from the storage device 2A. The breakdown of the storage device 2A can be predicted in advance by breakdown prediction software using the technology disclosed in, for example, US 2012/0284453 A1, US 2010/0250450 A1, or US 2011/0239045 A1.

When the end user is notified of breakdown prediction or breakdown via, for example, the display 9 by the breakdown prediction software, the end user detaches the storage device 2A from the information processing device 3 and ships the storage device 2A to a data rescue service center (to data rescue service provider).

The service center receives the storage device 2A from the user. The service center prepares the storage device 2B which is a storage device having good reliability as a backup destination (rescue destination) of the data of the stored device 2A. For example, the service center may newly manufacture the storage device 2B as a data copy destination of the storage device 2A or may newly purchases the storage device 2B.

Operators of the service center attaches the storage device 2A which is a backup source and the storage device 2B which is a backup destination to the information processing device 3 which is a device for the data rescue service and is used to rescue the data. The operators controls the information processing device 3 to copy user data D001 from the storage device 2A to the storage device 2B. The copy process is preferably performed as the copy process (the backup process) described in the first to ninth embodiments. The information processing device 3 used to rescue the data preferably may include the control tool 200 described in the embodiments or, for example, the control program described in US 2012/0284453 A1.

To prevent the reliability of the storage device 2A from being deteriorated further, the information processing device preferably avoid transmitting the write commands to the storage device 2A. When the reliability of a interface controller of the storage device 2A deteriorates, there is a concern that a communication error such as a CRC error or an R error occurs in the interface 19A through which the information processing device 3 communicates with the storage device 2A. Therefore, the information processing device 3 for the data rescue service preferably limit a linked speed of the interface 19A. For example, when the interface 19A or the interface controller of the storage device 2A supports a bit rate of 6.0 Gbps which is the maximum linked speed of Generation3 of Serial ATA, the information processing device 3 preferably communicates with the storage device 2A at 3.0 Gbps which is lower linked speed or, more preferably, at 1.5 Gbps which is a minimum linked speed of Serial ATA. When the interface 19A supports to multi-lane communication such as PCI Express and the reliability of the interface controller of the storage device 2A deteriorates, there is a concern that a communication error such as a failure in inter-lane deskewing occurs during communication with the information processing device 3. Therefore, the information processing device 3 for the data rescue service preferably limits the number of linked lanes. For example, when the interface 19A or the interface controller of the storage device 2A supports a 4-lane link of PCI Express, the information processing device 3 preferably communicates with storage device 2A at a 2-lane link which is the smaller number of lanes or, more preferably, 1-lane link which is the minimum number of lanes. After the backup process ends, the information processing device 3 for the data rescue reads the user data D001 stored in the storage device 2B and compares the user data D001 to the data read from the storage device 2A to verify whether the user data D001 is correctly written in the storage device 2B (verification process).

The service center ships the storage device 2B which is a backup destination to the end user. Alternatively, the service center may transmit the rescued data D001 to the user by an electronic mail or may upload the rescued data D001 to a cloud storage to electronically transmit the rescued data D001 to the user.

The user obtains the rescued data D001.

Modification Examples

In each embodiment described above, the example has been described in which a SSD is used as the non-volatile storage device 2A which is a backup source. Each embodiment can be applied broadly to non-volatile storage devices other than an SSD. For example, each embodiment can be also applied to a hard disk drive (HDD) using a magnetic medium (platter) and a hybrid hard disk drive (hybrid HDD) using both of NAND-type flash memory and a magnetic medium (platter). Since a transmission destination of a deletion notification command is not the non-volatile storage device 2A which is a backup source but the non-volatile storage device 2B which is a backup destination, the invention can be applied to a case in which the non-volatile storage device 2A which is a backup source does not support a deletion notification command.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A non-transitory storage medium storing a control program to be loaded to an information processing device to which first and second storage units are connectable,
    the first storage unit includes a first memory that is at least readable, and
    the second storage unit includes a readable and writable second non-volatile memory, and a control unit configured to invalidate one or more mappings of a logical address region specified by a received deletion notification to the second non-volatile memory and transmit data indicated by a first function to the information processing device when a logical address region specified by a received read command is not mapped to the second non-volatile memory, wherein
    the control program causing the information processing device to perform:
    a first process of reading data from a first logical address region of the first storage unit;
    a second process of determining whether data read from the first logical address region is identical with the data indicated by the first function;
    a third process of writing the read data to a second logical address region of the second storage unit when the read data is not identical with the data indicated by the first function; and
    a fourth process of sending the deletion notification to the second storage unit to invalidate one or more mappings of the second logical address region to the second non-volatile memory without sending the read data to the second storage unit when the read data is identical with the data indicated by the first function.

2. The storage medium storing the control program according to claim 1, wherein the first function indicates fixed data independent from logical addresses sent to the second storage unit.

3. The storage medium storing the control program according to claim 1, wherein the first function indicates different data for at least two different logical addresses sent to the second storage unit.

4. The storage medium storing the control program according to claim 1, wherein the first storage unit is a non-volatile storage unit, and the first and second storage units are included in different non-volatile storage devices.

5. The storage medium storing the control program according to claim 1,
    wherein the first storage unit is a non-volatile storage unit, and the first and second storage units are included in the same non-volatile storage device, and
    logical addresses of the first and second logical address regions do not overlap each other.

6. The storage medium storing the control program according to claim 1, wherein the information processing device is caused to perform a fifth process of receiving information of the first function from the second storage unit before the second process.

7. The storage medium storing the control program according to claim 1, wherein the first storage unit is a volatile storage unit and the control program processes the first process after the control program receives a request to store the data of the first logical address region in the second storage unit from a program.

8. A method of controlling an information processing device to which first and second storage units are connectable, the first storage unit includes a first memory that is at least readable, and the second storage unit includes a readable and writable second non-volatile memory, and a control unit configured to invalidate one or more mappings of a logical address region specified by a received deletion notification to the second non-volatile memory and transmit data indicated by a first function to the information processing device when a logical address region specified by a received read command is not mapped to the second non-volatile memory, the method comprising:

reading data from a first logical address region of the first storage unit;

determining whether data read from the first logical address region is identical with the data indicated by the first function;

writing the read data to a second logical address region of the second storage unit when the read data is not identical with the data indicated by the first function; and sending the deletion notification to the second storage unit to invalidate one or more mappings of the second logical address region to the second non-volatile memory without sending the read data to the second storage unit when the read data is identical with the data indicated by the first function.

9. The method of controlling the information processing device according to claim 8, wherein the first function indicates fixed data independent from logical addresses sent to the second storage unit.

10. The method of controlling the information processing device according to claim 8, wherein the first function indicates different data for at least two different logical addresses sent to the second storage unit.

11. The method of controlling the information processing device according to claim 8, wherein the first storage unit is a non-volatile storage unit, and the first and second storage units are included in different non-volatile storage devices.

12. The method of controlling the information processing device according to claim 8, wherein the first storage unit is a non-volatile storage unit, and the first and second storage units are included in the same non-volatile storage device, and logical addresses of the first and second logical address regions do not overlap each other.

13. The method of controlling the information processing device according to claim 8, wherein before the determining is performed, information of the first function is received from the second storage unit.

14. An information processing system comprising:

a first storage unit that includes a first memory that is at least readable;

a second storage unit that includes a readable and writable second non-volatile memory, and a control unit configured to invalidate one or more mappings of a logical address region specified by a received deletion notification to the second non-volatile memory and transmit data indicated by a first function to an information processing device when a logical address region specified by a received read command is not mapped to the second non-volatile memory; and the information processing device that is connectable to the first and second storage units, wherein the information processing device is configured to perform reading data from a first logical address region of the first storage unit, determining whether data read from the first logical address region is identical with the data indicated by the first function, writing the read data to a second logical address region of the second storage unit when the read data is not identical with the data indicated by the first function, and sending the deletion notification to the second storage unit to invalidate one or more mappings of the second logical address region to the second non-volatile memory without sending the read data to the second storage unit when the read data is identical with the data indicated by the first function.

15. The information processing system according to claim 14, wherein the first function indicates fixed data independent from logical addresses sent to the second storage unit.

16. The information processing system according to claim 14, wherein the first function indicates different data for at least two different logical addresses sent to the second storage unit.

17. The information processing system according to claim 14, wherein the first storage unit is a non-volatile storage unit, and the first and second storage units are included in different non-volatile storage devices.

18. The information processing system according to claim 14, wherein the first storage unit is a non-volatile storage unit, and the first and second storage units are included in the same non-volatile storage device, and logical addresses of the first and second logical address regions do not overlap each other.

19. The information processing system according to claim 14, wherein the information processing device further performs receiving information of the first function from the second storage unit before the second control unit determines whether the data read from the first logical address region is identical with the data indicated by the first function.

20. The information processing system according to claim 14, wherein the first storage unit is a volatile storage unit and the the data reading from the first logical address region is performed after receiving a request to store the data of the first logical address region in the second storage unit from a program.

21. An information processing device to which first and second storage units are connectable, the first storage unit includes a first memory that is at least readable, and the second storage unit includes a readable and writable second non-volatile memory, and a control unit configured to invalidate one or more mappings of a logical address region specified by a received deletion notification to the second non-volatile memory and transmit data indicated by a first function to the information processing device when a logical address region specified by a received read command is not mapped to the second non-volatile memory, the information processing device is configured to perform reading data from a first logical address region of the first storage unit;

determining whether data read from the first logical address region is identical with the data indicated by the first function;

writing the read data to a second logical address region of the second storage unit when the read data is not identical with the data indicated by the first function; and sending the deletion notification to the second storage unit to invalidate one or more mappings of the second logical address region to the second non-volatile memory without sending the read data to the second storage unit when the read data is identical with the data indicated by the first function.

22. The information processing device according to claim 21, wherein the first function indicates fixed data independent from logical addresses sent to the second storage unit.

23. The information processing device according to claim 21, wherein the first function indicates different data for at least two different logical addresses sent to the second storage unit.

24. The information processing device according to claim 21, wherein the first storage unit is a non-volatile storage unit, and the first and second storage units are included in different non-volatile storage devices.

25. The information processing device according to claim 21, wherein the first storage unit is a non-volatile storage unit, and the first and second storage units are included in the same non-volatile storage device, and logical addresses of the first and second logical address regions do not overlap each other.

26. The information processing device according to claim 21, wherein the information processing device further performs receiving information of the first function from the second storage unit before the second control unit determines whether the data read from the first logical address region is identical with the data indicated by the first function.

27. The information processing device according to claim 21, wherein the first storage unit is a volatile storage unit and the data reading from the first logical address region is performed after receiving a request to store the data of the first logical address region in the second storage unit from a program.

* * * * *